US011356889B2

(12) United States Patent
Li et al.

(10) Patent No.: US 11,356,889 B2
(45) Date of Patent: *Jun. 7, 2022

(54) QUALITY OF SERVICE QOS PARAMETER PROCESSING METHOD AND NETWORK ELEMENT, SYSTEM, AND STORAGE MEDIUM

(71) Applicant: Huawei Technologies Co., Ltd., Shenzhen (CN)

(72) Inventors: Yexing Li, Shanghai (CN); Yan Wang, Shanghai (CN); Qi Su, Shanghai (CN); Zhongping Chen, Shanghai (CN); Fang Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,323

(22) Filed: Nov. 4, 2020

(65) Prior Publication Data

US 2021/0051514 A1 Feb. 18, 2021

Related U.S. Application Data

(63) Continuation of application No. 16/986,696, filed as application No. PCT/CN2018/121443 on Dec. 17, 2018.

(30) Foreign Application Priority Data

Feb. 14, 2018 (CN) .......................... 201810152278.9
Aug. 7, 2018 (CN) .......................... 201810892877.4

(51) Int. Cl.
*H04W 28/02* (2009.01)
*H04W 72/12* (2009.01)

(52) U.S. Cl.
CPC ... *H04W 28/0268* (2013.01); *H04W 72/1257* (2013.01)

(58) Field of Classification Search
None
See application file for complete search history.

(56) References Cited

U.S. PATENT DOCUMENTS 10,447,597 B1 10/2019 Kim et al.
2012/0327807 A1 12/2012 Eric
(Continued)

FOREIGN PATENT DOCUMENTS

CN 102892145 A 1/2013
CN 102783209 B 1/2016
(Continued)

OTHER PUBLICATIONS

3GPP TR 22.804 V1.0.0, 3rd Generation Partnership Project;Technical Specification Group Services and System Aspects;Study on Communication for Automation in Vertical Domains;(Release 16), Dec. 2017, 137 pages.
(Continued)

*Primary Examiner* — Mohammad S Adhami
(74) *Attorney, Agent, or Firm* — Conley Rose, P.C.

(57) ABSTRACT

A quality of service (QoS) parameter processing method and a system, where the method includes obtaining, by a control plane device, a core network (CN) packet delay budget (PDB) between a first access network device and a first user plane function device, sending, by the control plane device, the CN PDB to the first access network device, determining, by the first access network device, an access network (AN) PDB between a terminal device and the first access network device based on the CN PDB and an end-to-end PDB between the terminal device and the first user plane function device, and scheduling, by the first access network device,
(Continued)

an air interface resource between the terminal device and the first access network device based on the AN PDB.

19 Claims, 21 Drawing Sheets

(56) References Cited

U.S. PATENT DOCUMENTS

| | | | |
|---|---|---|---|
| 2013/0021941 | A1 | 1/2013 | Zheng et al. |
| 2013/0215755 | A1 | 8/2013 | Liu et al. |
| 2015/0016265 | A1 | 1/2015 | Ahmadi |
| 2015/0029950 | A1 | 1/2015 | Rath et al. |
| 2015/0117205 | A1 | 4/2015 | Lyi et al. |
| 2015/0264707 | A1 | 9/2015 | Golderer et al. |
| 2016/0205693 | A1 | 7/2016 | Lu et al. |
| 2016/0295449 | A1 | 10/2016 | Seenappa et al. |
| 2018/0042036 | A1 | 2/2018 | Sadeh et al. |
| 2018/0279319 | A1* | 9/2018 | Yu ................ H04W 72/085 |
| 2019/0082417 | A1* | 3/2019 | Bolle ................ H04W 88/14 |
| 2019/0098544 | A1 | 3/2019 | Han et al. |
| 2019/0124578 | A1 | 4/2019 | Nieh et al. |
| 2019/0215724 | A1 | 7/2019 | Talebi Fard et al. |
| 2019/0215731 | A1 | 7/2019 | Qiao et al. |
| 2019/0222489 | A1* | 7/2019 | Shan ................ H04L 12/1407 |
| 2019/0335392 | A1* | 10/2019 | Qiao ................ H04W 48/18 |
| 2020/0359274 | A1 | 11/2020 | Zhu et al. |
| 2020/0367094 | A1* | 11/2020 | Eriksson ........ H04W 72/1242 |

FOREIGN PATENT DOCUMENTS

| | | |
|---|---|---|
| EP | 3461209 A1 | 3/2019 |
| RU | 2553075 C2 | 6/2015 |
| WO | 2015043395 A1 | 4/2015 |
| WO | 2017202334 A1 | 11/2017 |

OTHER PUBLICATIONS

3GPP TS 23.501 V15.0.0, 3rd Generation Partnership Project;Technical Specification Group Services and System Aspects;System Architecture for the 5G System;Stage 2(Release 15); Dec. 2017, 181 pages.

3GPP TR 23.793 V0.2.0, 3rd Generation Partnership Project;Technical Specification Group Services and System Aspects;Study on Access Traffic Steering, Switching and Splitting support in the 5G system architecture(Release 16); Jan. 2018, 18 pages.

3GPP TS 38.413 V0.6.0, 3rd Generation Partnership Project;Technical Specification Group Radio Access Network; NG-RAN;NG Application Protocol (NGAP)(Release 15); Jan. 2018, 94 pages.

Samsung, "QoS parameter—Packet Delay Budget",SA WG2 Meeting #116 S2-163704, Jul. 11-15, 2016, Vienna, Austria, 9 pages.

Nokia, et al., "TS 23.502 call flow for EPC—> 5GC interworking," SA WG2 Meeting #120, S2-173161, Mar. 27-31, 2017, Busan, Korea, 3 pages.

Ameigeiras, et al., "3GPP QoS-based scheduling framework for LTE," EURASIP Journal on Wireless Communications and Networking, 2016, Article No. 78 (2016), 14 pages.

* cited by examiner

Feature of a best effort service data packet

Feature of a deterministic service data packet

QUALITY OF SERVICE QOS PARAMETER PROCESSING METHOD AND NETWORK ELEMENT, SYSTEM, AND STORAGE MEDIUM

CROSS-REFERENCE TO RELATED APPLICATIONS

This application is a continuation of U.S. patent application Ser. No. 16/986,696 filed on Aug. 6, 2020, which is a continuation of International Patent Application No. PCT/CN2018/121443 filed on Dec. 17, 2018, which claims priority to Chinese Patent Application No. 201810152278.9 filed on Feb. 14, 2018 and to Chinese Patent Application No. 201810892877.4 filed on Aug. 7, 2018. The disclosures of the aforementioned applications are hereby incorporated by reference in their entireties.

TECHNICAL FIELD

This application relates to the field of communications technologies, and in particular, to a quality of service (QoS) parameter processing method and network element, a system, and a storage medium.

BACKGROUND

In a conventional 3rd Generation Partnership Project (3GPP) network, an access network (AN) device and a user plane function (UPF) network element schedule and forward a data packet based on a priority of the data packet. This may cause a large end-to-end latency and jitter (a latency variation value) of the data packet. Therefore, a mechanism of forwarding a data packet based on a priority cannot satisfy a requirement of a deterministic service, and the data packet cannot be precisely scheduled in other approaches, deteriorating user experience.

SUMMARY

This application provides a QoS parameter processing method and network element, a system, and a storage medium, to improve data packet scheduling accuracy and improve user experience.

According to a first aspect, this application provides a QoS parameter processing method, and the method includes obtaining, by a control plane network element, a first QoS parameter between a terminal device and a UPF network element, and obtaining, by the control plane network element, capability information of a first network domain, determining a second QoS parameter of the first network domain based on the capability information of the first network domain and the first QoS parameter, and sending first information of the second QoS parameter to the first network domain. The first network domain includes at least one of a radio access network (RAN), a backhaul network, and a UPF network element. The backhaul network may also be referred to as a transmission network. For example, the second QoS parameter includes at least one of a latency parameter, a jitter parameter, and a reliability parameter.

According to the method, the control plane network element determines the second QoS parameter of the first network domain (that is, determines a QoS parameter of at least one network domain) based on the capability information of the first network domain and the first QoS parameter, to be specific, separately assigns a proper QoS parameter to each network domain, and then separately delivers the QoS parameter to each network domain, ensuring that the QoS parameter obtained by each network domain is a QoS parameter of the corresponding network domain. Compared with an existing mechanism in which each network domain can schedule a data packet based on only an end-to-end indicator, in this embodiment of this application, a communications apparatus in each network domain can perform precise scheduling based on the QoS parameter of the corresponding network domain, ensuring deterministic transmission and improving user experience. In addition, because the QoS parameter of each network domain may be dynamically assigned, resource utilization of a mobile network can be improved.

For example, a procedure in which the control plane network element determines the second QoS parameter of the first network domain and delivers the first information may occur in a procedure in a session establishment phase, or may occur in procedure in a handover phase. In addition, the determining of the second QoS parameter may refer to the first division of the QoS parameter, or may be subsequent re-division of the QoS parameter.

Based on the first aspect, in a first implementation, when the first network domain includes the RAN or the UPF network element, obtaining, by the control plane network element, capability information of a first network domain includes sending, by the control plane network element, a transmit frequency and a size of a data packet to the first network domain, and receiving the capability information of the first network domain from the first network domain, where the capability information of the first network domain is associated with the transmit frequency and the size of the data packet.

Based on the first aspect or the first implementation of the first aspect, in a second implementation, when the first network domain includes the RAN or the UPF network element, the first information includes a correspondence between a flow identifier and the second QoS parameter, and the flow identifier is used to identify a QoS flow between the terminal device and the UPF network element.

Based on the first aspect, in a third implementation, when the first network domain includes the backhaul network, obtaining, by the control plane network element, capability information of a first network domain includes receiving, by the control plane network element, from a network management network element, capability information of the backhaul network, or obtaining, by the control plane network element, from a data management network element, capability information of the backhaul network.

The capability information of the backhaul network includes a stream identifier of a service flow in the backhaul network, a quantity of available service flows, and a QoS parameter of the service flow. For example, the QoS parameters of the service flow may include a bandwidth parameter and reliability of the service flow.

Based on the first aspect or the third implementation, in a fourth implementation, when the first network domain includes the backhaul network, the first information may include a correspondence between a flow identifier and a stream identifier, the flow identifier is used to identify a QoS flow between the terminal and the UPF network element, and the stream identifier is used to identify a stream that is in the backhaul network and that satisfies the second QoS parameter.

The correspondence between a flow identifier and a stream identifier can be used for forwarding and resource scheduling of a downlink data packet when the UPF network element sends the downlink data packet to the access network device, or can be used for forwarding and resource scheduling of an uplink data packet when the access network device sends the uplink data packet to the UPF network element.

Based on any one of the first aspect or the first to the fourth implementations of the first aspect, in a fifth implementation, the method further includes obtaining, by the control plane network element, subscription data of the terminal device. For example, the subscription data of the terminal device is data corresponding to a service subscribed to by the terminal device, and may include a QoS parameter, account information, a service type, a service level, and the like that correspond to the service subscribed to by the terminal device. Determining a second QoS parameter of the first network domain based on the capability information of the first network domain and the first QoS parameter includes, when the subscription data includes the second information used to indicate that the service of the terminal device includes a deterministic service, that is, the control plane network element may determine that the service of the terminal device includes the deterministic service, a corresponding QoS parameter needs to be assigned to the first network domain in which the terminal device is located. Therefore, the control plane network element may determine the second QoS parameter of the first network domain based on the capability information of the first network domain and the first QoS parameter.

It can be learned that, whether the control plane network element needs to divide a first QoS parameter corresponding to a service can be determined using an explicit indication in the subscription data. In this way, the first QoS parameter can be divided pertinently, reducing an unnecessary QoS parameter division procedure.

Based on the fifth implementation of the first aspect, in a sixth implementation, the second information includes a jitter parameter. If the subscription data includes the jitter parameter, the deterministic service of the terminal device has a relatively high requirement on transmission stability, and the control plane network element needs to specially assign a corresponding second QoS parameter to the first network domain in which the terminal device is located. In this way, stability of the deterministic service of the terminal device can be ensured subsequently.

Based on any one of the first aspect or the first to the sixth implementations of the first aspect, in a seventh implementation, determining a second QoS parameter of the first network domain based on the capability information of the first network domain and the first QoS parameter includes determining, by the control plane network element, the second QoS parameter for the first network domain based on the capability information of the first network domain, the first QoS parameter, and a priority of the first network domain. For example, a capability of the RAN may be preferentially satisfied such that a minimum quantity of resources is reserved for the RAN. It can be learned that, according to this division principle, a resource in the first network domain can be more properly used, and subsequent QoS parameter reassignment caused by reasons such as improper allocation of a resource and terminal device handover is reduced, reducing an unnecessary procedure of the control plane network element.

According to a second aspect, this application provides a QoS parameter processing method. The method may be used for a communications apparatus in a first network domain. The method may include sending, by the communications apparatus in the first network domain, capability information of the first network domain to a control plane network element, and receiving, from the control plane network element, first information of the QoS parameter of the first network domain. The capability information of the first network domain is used to determine a QoS parameter of the first network domain, and the first network domain includes a RAN or a UPF network element.

According to the method, the communications apparatus in the first network domain provides the capability information of the first network domain for the control plane network element such that the control plane network element can accurately determine the QoS parameter of the first network domain, and the communications apparatus of the first network domain obtains, from the control plane network element, the QoS parameter of the first network domain. Therefore, a communications apparatus in a network domain can perform precise scheduling based on a QoS parameter of this network domain, ensuring the deterministic transmission and improving user experience. In addition, resource utilization of a mobile network can be improved.

Based on the second aspect, in a first implementation, the communication apparatus may further report the capability information of the first network domain to the control plane network element, which may include one of the following manners periodically reporting, by the communications apparatus, the capability information of the first network domain to the control plane network element, or after receiving a request message from the control plane network element, feeding back, by the communications apparatus, the capability information of the first network domain to the control plane network element. For example, after receiving a transmit frequency and a size of a data packet from the control plane network element, the communications apparatus obtains the capability information of the first network domain based on the transmit frequency and the size of the data packet, and then feeds back the capability information to the control plane network element.

It can be learned that the capability information of the first network domain is dynamically fed back to the control plane network element such that the control plane network element can more precisely and more properly divide the QoS parameter between a terminal device and the UPF network element, ensuring the stability of the deterministic service of the terminal device.

Based on the second aspect or the first implementation of the second aspect, in a second implementation, the first information may include a correspondence between a flow identifier and the QoS parameter, and the flow identifier is used to identify a QoS flow between the terminal device and the UPF network element. For example, when the first network domain includes the RAN, the first information includes a correspondence between the flow identifier and a QoS parameter of the RAN. When the first network domain includes the UPF network element, the first information includes a correspondence between the flow identifier and a QoS parameter of the UPF network element.

In this way, after an access network device in the RAN and the UPF network element receive QoS parameters of respective domains, the access device in the RAN can find, based on the correspondence between the flow identifier and a QoS parameters of the RAN, a QoS parameter corresponding to the data packet, and forward an uplink/downlink data packet based on the QoS parameter, and the UPF network element can find, based on the correspondence between the flow identifier and a QoS parameter of the UPF network element, a QoS parameter corresponding to the data packet, and forward an uplink/downlink data packet based on the QoS parameter.

The following separately describes, based on a type of the first network domain, procedures for forwarding the uplink/downlink data packet by the access network device and the UPF network element.

Based on the second implementation of the second aspect, in a third implementation, when the first network domain includes the RAN, the communications apparatus is a first access network device in the RAN. The method further includes at least one of receiving, by the first access network device, a downlink data packet from the UPF network element, where the downlink data packet includes a first flow identifier, and sending, by the first access network device, the downlink data packet to the terminal device based on a QoS parameter that is in the first information and that corresponds to the first flow identifier, or receiving, by the first access network device, an uplink data packet from the terminal device, where the uplink data packet includes a second flow identifier, and sending, by the first access network device through a backhaul network, the uplink data packet to the UPF network element based on a QoS parameter that is in the first information and that corresponds to the second flow identifier.

Based on the third implementation of the second aspect, in a fourth implementation, the first access network device may further receive, from the control plane network element, a correspondence between the second flow identifier and a stream identifier of a first stream. Correspondingly, when forwarding an uplink data packet, the first access network device may send, based on the correspondence between the second flow identifier and the stream identifier of the first stream, the uplink data packet to the UPF network element using the first stream in the backhaul network.

It can be learned that the first access network device can implement precise resource scheduling and data packet forwarding operations based on a correspondence between a flow identifier and a stream identifier, ensuring running of the deterministic service of the terminal device.

Based on any one of the second aspect or the first and the second implementations of the second aspect, in a fifth implementation, when the first network domain includes the UPF network element, the communications apparatus is the UPF network element, and the UPF network element may further forward the uplink/downlink data packet based on an assigned QoS parameter. The method further includes at least one of the following receiving, by the UPF network element, a downlink data packet from an application server, obtaining a first flow identifier included in the downlink data packet, and sending, through the backhaul network, the downlink data packet to a first access network device based on a QoS parameter that is in the first information and that corresponds to the first flow identifier, or receiving, by the UPF network element, an uplink data packet from a first access network device, obtaining a second flow identifier included the uplink data packet, and sending the uplink data packet to an application server based on a QoS parameter that is in the first information and that corresponds to the second flow identifier.

Based on any implementation in the fifth implementation of the second aspect, in a sixth implementation, the UPF network element may further receive, from the control plane network element, a correspondence between the first flow identifier and a stream identifier of a second stream, when forwarding the downlink data packet, the UPF network element may send the downlink data packet to the access network device based on the correspondence between the first flow identifier and the stream identifier of the second stream using the second stream in the backhaul network, after encapsulating the stream identifier of the second stream into the data packet.

It can be learned that the UPF network element can implement the precise resource scheduling and data packet forwarding operations based on the correspondence between a flow identifier and a stream identifier, ensuring running of the deterministic service of the terminal device.

According to a third aspect, this application provides a QoS parameter processing method, and the method includes obtaining, by a session management function network element, from a data management network element, subscription data of a terminal device, and when the subscription data includes information used to indicate that a service of the terminal device includes a deterministic service, sending, by the session management function network element, a request message to a control plane network element, where the request message is used to request to determine a QoS parameter of a first network domain, and the first network domain includes at least one of a RAN, a backhaul network, and a UPF network element. According to the method, the session management function network element obtains the subscription data from the data management network element, determines, based on the subscription data, whether the terminal device has the deterministic service, and then determines whether to send, to the control plane network element, the request message for determining the QoS parameter of the first network domain. In this way, work load of the control plane network element can be reduced, and a work division mechanism can also be optimized.

Based on the third aspect, in a first implementation of the third aspect, the method further includes obtaining, by the session management function network element, from the data management network element, capability information of the backhaul network, or receiving, by the session management function network element, from a network management network element, capability information of the backhaul network.

According to a fourth aspect, this application provides a network management method, and the method includes sending, by a network management network element, a configuration request to a backhaul network configuration network element, where the configuration request is used to request to configure capability information of a backhaul network, and receiving, by the network management network element, from the backhaul network configuration network element, the capability information of the backhaul network, and sending the capability information of the backhaul network to a data management network element. According to the method, interaction between the network management network element, the backhaul network configuration network element, and the data management network element ensures that the capability information of the backhaul network can be transmitted to the data management network element, and subsequently a control plane network element uses the capability information of the backhaul network as a basis for determining a QoS parameter of each network domain.

According to a fifth aspect, this application provides a network management method, and the method includes receiving, by a backhaul network configuration network element, a configuration request from a network management network element, configuring capability information of a backhaul network based on the configuration request, and sending the capability information of the backhaul network to the network management network element. According to the method, after the backhaul network configuration network element receives the configuration request from the network management network element, the backhaul network configuration network element interacts with the network management network element such that the capability information of the backhaul network can be transmitted to the network management network element, and the control plane network element subsequently uses the capability information of the backhaul network, obtained from the data management network element, as a basis for determining a QoS parameter of each network domain.

Based on the fifth aspect, in a first implementation of the fifth aspect, the configuration request may include an expected value of a QoS parameter of a first network domain, an Internet Protocol (IP) address of an access network device, and an IP address of a UPF network element.

According to a sixth aspect, this application provides a control plane network element for processing a QoS parameter, and the control plane network element has a function of implementing the corresponding QoS parameter processing method according to the first aspect. The function may be implemented by hardware, or implemented by hardware executing corresponding software. The hardware or software includes one or more modules corresponding to the function. The module may be software and/or hardware.

According to a seventh aspect, this application provides a communications apparatus for processing a QoS parameter, and the communications apparatus has a function of implementing the corresponding QoS parameter processing method according to the second aspect. The function may be implemented by hardware, or implemented by hardware executing corresponding software. The hardware or software includes one or more modules corresponding to the function. The module may be software and/or hardware.

According to an eighth aspect, this application provides a session management function network element, and the session management function network element has a function of implementing the corresponding QoS parameter processing method according to the third aspect. The function may be implemented by hardware, or implemented by hardware executing corresponding software. The hardware or software includes one or more modules corresponding to the function. The module may be software and/or hardware.

According to a ninth aspect, this application provides a network management network element, and the network management network element has a function of implementing the corresponding network management method according to the fourth aspect. The function may be implemented by hardware, or implemented by hardware executing corresponding software. The hardware or software includes one or more modules corresponding to the function. The module may be software and/or hardware.

According to a tenth aspect, this application provides a network configuration network element for managing a network, and the network configuration network element has a function of implementing the corresponding network management method according to the fifth aspect. The function may be implemented by hardware, or implemented by hardware executing corresponding software. The hardware or software includes one or more modules corresponding to the function. The module may be software and/or hardware. The network configuration network element may be a backhaul network management network element.

According to an eleventh aspect, this application provides a QoS parameter processing method, and the method includes obtaining, by a control plane network element, a first QoS parameter between a first access network device and a first UPF network element, and determining, by the control plane network element, a third QoS parameter between a terminal device and the first access network device based on the first QoS parameter and a second QoS parameter that is between the terminal device and the first UPF network element, and sending the third QoS parameter to the first access network device, or sending, by the control plane network element, the first QoS parameter to the first access network device, where the first QoS parameter is used to determine a QoS parameter between the terminal device and the first access network device.

Therefore, compared with that, in the other approaches, the first access network device performs air interface resource scheduling based on an end-to-end QoS parameter between user equipment (UE) and a UPF, in the method according to this embodiment of this application, the first access network device may perform air interface resource scheduling based on a more precise QoS parameter, namely, a QoS parameter between the UE and an AN, optimizing usage of an air interface resource.

In a possible design, the obtaining, by a control plane network element, a first QoS parameter between a first access network device and a first UPF network element includes obtaining, by the control plane network element, the first QoS parameter from the first UPF network element, obtaining, by the control plane network element, the first QoS parameter from a network element discovery function device, obtaining, by the control plane network element, the first QoS parameter from a network management system, or obtaining, by the control plane network element, the first QoS parameter from a network data analytics function device.

In a possible design, the obtaining, by the control plane network element, the first QoS parameter from the first UPF network element includes sending, by the control plane network element, identifier information of the first access network device to the first UPF network element, and receiving, from the first UPF network element, the first QoS parameter between the first access network device and the first UPF network element. Further, in a possible design, the step further includes sending, by the control plane network element, flow information that identifies a first flow to the first UPF network element, where the first QoS parameter indicates a QoS parameter that is between the first access network device and the first UPF network element and that corresponds to the first flow.

In a possible design, the obtaining, by the control plane network element, the first QoS parameter from a network element discovery function device includes sending, by the control plane network element, identifier information of the first access network device and identifier information of the first UPF network element to the network element discovery function device, and receiving, from the network element discovery function device, the first QoS parameter between the first access network device and the first UPF network element.

In another possible design, the obtaining, by the control plane network element, the first QoS parameter from a network element discovery function device includes sending, by the control plane network element, identifier information of the first access network device and service area information of the control plane network element to the network element discovery function device, receiving, from the network element discovery function device, identifier information of at least one UPF network element located in an area indicated by the service area information, and a QoS parameter between each of the at least one UPF network element and the first access network device, and determining, by the control plane network element, the first QoS parameter in the QoS parameter, or sending, by the control plane network element, service area information of the control plane network element to the network element discovery function device, receiving, from the network element discovery function device, identifier information of at least one UPF network element located in an area indicated by the service area information, identifier information of an access network device that communicates with each of the at least one UPF network element, and a QoS parameter between each of the at least one UPF network element and the access network device, and determining, by the control plane network element, the first QoS parameter in the QoS parameter based on identifier information of the first access network device.

With reference to the foregoing possible designs, the method may further include determining, by the control plane network element, the first UPF network element based on the QoS parameter that is between each of the at least one UPF network element and the access network device and that is received from the network element discovery function device.

According to a twelfth aspect, this application provides a QoS parameter processing method, and the method includes obtaining, by a control plane network element, a first QoS parameter between a first access network device and a first UPF network element, and determining, by the control plane network element, a third QoS parameter between a terminal device and the first access network device based on the first QoS parameter and a second QoS parameter that is between the terminal device and the first UPF network element, and sending the third QoS parameter to a second access network device, or sending, by the control plane network element, the first QoS parameter to a second access network device, where the first QoS parameter is used to determine a QoS parameter between the terminal device and the first access network device, where the first access network device is a target access network device that serves the terminal device after handover, and the second access network device is a source access network device that serves the terminal device before handover.

Therefore, compared with that in the other approaches, the first access network device performs air interface resource scheduling based on an end-to-end QoS parameter between UE and a UPF, in the method according to this embodiment of this application, in a handover scenario, the second access network device can receive the first QoS parameter or the third QoS parameter from the control plane network element, and then send the first QoS parameter or the third QoS parameter to the first access network device such that the first access network device may perform air interface resource scheduling based on the more precise QoS parameter, namely, the QoS parameter between the UE and an AN, optimizing the usage of the air interface resource.

In a possible design, the obtaining, by a control plane network element, a first QoS parameter between a first access network device and a first UPF network element includes obtaining, by the control plane network element, the first QoS parameter from the first UPF network element, obtaining, by the control plane network element, the first QoS parameter from a network element discovery function device, obtaining, by the control plane network element, the first QoS parameter from a network management system, or obtaining, by the control plane network element, the first QoS parameter from a network data analytics function device.

In a possible design, the obtaining, by the control plane network element, the first QoS parameter from the first UPF network element includes sending, by the control plane network element, identifier information of the first access network device to the first UPF network element, and receiving, from the first UPF network element, the first QoS parameter between the first access network device and the first UPF network element. Further, in a possible design, the step further includes sending, by the control plane network element, flow information that identifies a first flow to the first UPF network element, where the first QoS parameter indicates a QoS parameter that is between the first access network device and the first UPF network element and that corresponds to the first flow.

In a possible design, the obtaining, by the control plane network element, the first QoS parameter from a network element discovery function device includes sending, by the control plane network element, identifier information of the first access network device and identifier information of the first UPF network element to the network element discovery function device, and receiving, from the network element discovery function device, the first QoS parameter between the first access network device and the first UPF network element.

In another possible design, the obtaining, by the control plane network element, the first QoS parameter from a network element discovery function device includes sending, by the control plane network element, identifier information of the first access network device and service area information of the control plane network element to the network element discovery function device, receiving, from the network element discovery function device, identifier information of at least one UPF network element located in an area indicated by the service area information, and a QoS parameter between each of the at least one UPF network element and the first access network device, and determining, by the control plane network element, the first QoS parameter in the QoS parameter, or sending, by the control plane network element, service area information of the control plane network element to the network element discovery function device, receiving, from the network element discovery function device, identifier information of at least one UPF network element located in an area indicated by the service area information, identifier information of an access network device that communicates with each of the at least one UPF network element, and a QoS parameter between each of the at least one UPF network element and the access network device, and determining, by the control plane network element, the first QoS parameter in the QoS parameter based on identifier information of the first access network device.

With reference to the foregoing possible designs, the method may further include determining, by the control plane network element, the first UPF network element based on the QoS parameter that is between each of the at least one UPF network element and the access network device and that is received from the network element discovery function device.

According to a thirteenth aspect, this application provides a QoS parameter processing method, and the method includes obtaining, by a first access network device, a QoS parameter between a terminal device and the first access network device, and scheduling, by the first access network device, an air interface resource between the terminal device and the first access network device based on the QoS parameter.

Therefore, compared with that, in the other approaches, the first access network device performs air interface resource scheduling based on an end-to-end QoS parameter between UE and a UPF, in the method according to this embodiment of this application, the first access network device may perform air interface resource scheduling based on a more precise QoS parameter, namely, a QoS parameter between the UE and an AN, optimizing usage of an air interface resource.

In a possible design, the obtaining, by a first access network device, a QoS parameter between a terminal device and the first access network device includes receiving, by the first access network device, from a control plane network element, a first QoS parameter between the first access network device and a first UPF network element, and determining the QoS parameter between the terminal device and the first access network device based on the first QoS parameter and a second QoS parameter that is between the terminal device and the first UPF network element.

In another possible design, obtaining, by a first access network device, a QoS parameter between a terminal device and the first access network device includes receiving, by the first access network device, the QoS parameter from a control plane network element.

In still another possible design, obtaining, by a first access network device, a QoS parameter between a terminal device and the first access network device includes receiving, by the first access network device, the QoS parameter from a second access network device. In this case, the method further includes performing, by the first access network device, handover admission control on the terminal device based on the QoS parameter, where the first access network device is a target access network device that serves the terminal device after handover, and the second access network device is a source access network device that serves the terminal device before handover.

According to a fourteenth aspect, this application provides a QoS parameter processing method, and the method includes receiving, by a second access network device, from a control plane network element, a first QoS parameter between the first access network device and a first UPF network element, and determining a third QoS parameter between a terminal device and the first access network device based on the first QoS parameter and a second QoS parameter that is between the terminal device and the first UPF network element, or receiving, by a second access network device, from a control plane network element, a third QoS parameter between a terminal device and the first access network device, and sending, by the second access network device, the third QoS parameter to the first access network device, where the first access network device is a target access network device that serves the terminal device after handover, and the second access network device is a source access network device that serves the terminal device before handover.

Therefore, compared with that in the other approaches, the first access network device performs air interface resource scheduling based on an end-to-end QoS parameter between UE and a UPF, in the method according to this embodiment of this application, in a handover scenario, the second access network device can receive the first QoS parameter or the third QoS parameter from the control plane network element, and then send the first QoS parameter or the third QoS parameter to the first access network device such that the first access network device may perform air interface resource scheduling based on the more precise QoS parameter, namely, the QoS parameter between the UE and an AN, optimizing the usage of the air interface resource.

According to a fifteenth aspect, this application provides a control plane network element for processing a QoS parameter, and the control plane network element has a function of implementing the corresponding QoS parameter processing method according to the eleventh or the twelfth aspect. The function may be implemented by hardware, or implemented by hardware executing corresponding software. The hardware or software includes one or more modules corresponding to the function. The module may be software and/or hardware.

According to a sixteenth aspect, this application provides an access network device, and the access network device has a function of implementing the first access network device in the corresponding QoS parameter processing method according to the thirteenth aspect. The function may be implemented by hardware, or implemented by hardware executing corresponding software. The hardware or software includes one or more modules corresponding to the function. The module may be software and/or hardware.

According to a seventeenth aspect, this application provides an access network device, and the access network device has a function of implementing the second access network device in the corresponding QoS parameter processing method according to the fourteenth aspect. The function may be implemented by hardware, or implemented by hardware executing corresponding software. The hardware or software includes one or more modules corresponding to the function. The module may be software and/or hardware.

According to an eighteenth aspect, this application provides a computer storage medium, including an instruction. When the instruction is run on a computer, the computer is enabled to perform the method according to any one of the first to the fifth aspects or any one of the eleventh to the fourteenth aspects.

According to a nineteenth aspect, this application provides a computer apparatus, including at least one connected processor, a memory, and a transceiver. The memory is configured to store program code, and the processor is configured to invoke the program code in the memory to perform the method according to any one of the first to the fifth aspects or any one of the eleventh to the fourteenth aspects.

According to a twentieth aspect, this application provides a communications system, and the communications system may include a terminal device, the control plane network element according to the sixth aspect, and the communications apparatus according to the seventh aspect.

Based on the twentieth aspect, in a first implementation of the twentieth aspect, the communications system may further include the network management network element according to the ninth aspect, the network configuration network element according to the tenth aspect, and a data management network element. The data management network element is configured to store the capability information, of the backhaul network, from the network configuration network element according to the tenth aspect.

Based on the twentieth aspect or the first implementation of the twentieth aspect, in a second implementation of the twentieth aspect, the communications system may further include the session management function network element according to the ninth aspect.

DESCRIPTION OF EMBODIMENTS

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device.

Figure 1A:
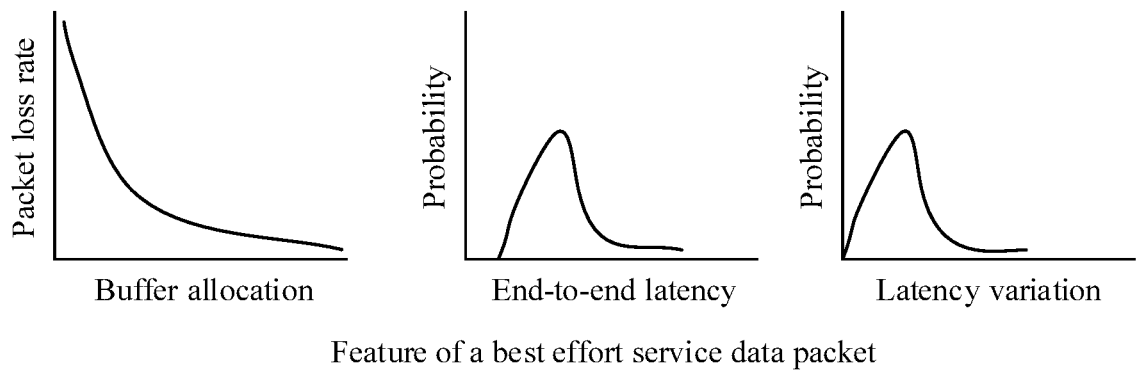
FIG. 1A is a schematic diagram of a feature of a best effort service data packet.
Figure 1B:
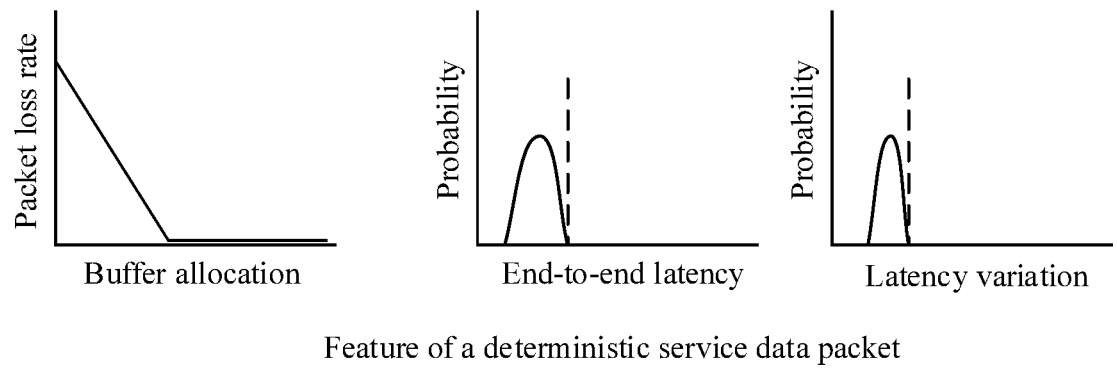
FIG. 1B is a schematic diagram of a feature of a deterministic service data packet.

In a 5th generation (5G) communications network, an application scenario of Ultra-Reliable Low-Latency Communications (URLLC) is proposed. FIG. 1A is a schematic diagram of a feature of a conventional best effort service data packet. Compared with the conventional best effort service, in the application scenario of the URLLC, an end-to-end latency and jitter of a service may be required to have strict boundaries. A service satisfying this requirement is referred to as a deterministic service. FIG. 1B is a schematic diagram of a feature of a deterministic service data packet. FIG. 1B shows that three features, namely, buffer allocation, an end-to-end latency, and an end-to-end latency variation value, of the deterministic service data packet each have a bounded boundary.

For example, a deterministic service may be applied to a field such as an industrial control network, the internet of vehicles, telemedicine, or a smart grid. The industrial control network is a computer network that has a real-time digital communication capability, may be a network or a heterogeneous network in which a plurality of field buses are integrated, and can implement information exchange between interconnected devices or systems. For example, for a service on the industrial control network, an end-to-end latency needs to not exceed 1 millisecond (ms), an end-to-end jitter needs to not exceed 1 microseconds (μs), and end-to-end reliability needs to be at least 99.9999%. For the service of the industrial control network, even if only several packets are not delivered as required, a serious problem may occur.

It can be learned that the deterministic service requires a 5G communications network to be capable of satisfying, in any case, a requirement for a bounded end-to-end latency and jitter and high reliability. A network that can satisfy such a requirement may be referred to as a Deterministic Networking (DetNet). The DetNet has constraint features such as a latency, a jitter, bandwidth, and reliability that are controlled. The DetNet is a Time-Sensitive Networking (TSN).

This application provides a QoS parameter processing solution, and the solution may be used to process a QoS parameter of the foregoing deterministic service. The solution may be used for a communications system shown in FIG. 1C.

For example, the communications system includes an access network device 1, a UPF network element 2, and a deterministic coordinator (DC) 3, a data management network element 4, a backhaul network configuration network element 5, a network management network element 6, a session management function (SMF) network element 7, and an application server 8.

The access network device 1 may be a communications apparatus in a RAN, and is a communications infrastructure that provides a wireless communications service. The access network device is configured to connect the terminal device to a core network using the RAN, and schedule the terminal device. For example, the access network device 1 (for example, a base station) provides a signal for the terminal device, and is responsible for sending downlink data to the terminal device or sending uplink data of the terminal device to the UPF network element. The access network device 1 may include base stations in various forms, for example, a macro base station, a micro base station (also referred to as a small cell), a relay node, and an access point. In systems using different radio access technologies, names of devices having a base station function may be different. For example, in a 3rd generation system, the device is referred to as a NodeB. In a Long-Term Evolution (LTE) system, the system is referred to as an evolved NodeB (eNB or eNodeB). In a 5G system, the device is referred to as a gNB (gNodeB).

The UPF network element 2 is responsible for sending downlink data to the access network device or sending uplink data of the access network device to the application server.

The data management network element 4 is configured to store subscription data of the terminal device. For example, the data management network element may include a unified data management (UDM) network element.

The backhaul network configuration network element 5 is configured to configure a backhaul network between the RAN and the UPF network element. The backhaul network is a transmission network between the access network device and the UPF network element. The backhaul network may also be referred to as a transmission network. The backhaul network may include a switching network constituted by forwarding devices such as a switch and a router. For example, the backhaul network configuration network element may be a centralized network configuration (CNC) unit.

The network management network element 6 is configured to manage a mobile network and the backhaul network. For example, the network management network element may be configured to manage the forwarding devices, such as the switch and the router, in the backhaul network. The network management network element can interact with the backhaul network configuration network element.

The session management function network element 7 may be responsible for establishing, deleting, or modifying a session.

The application server 8 is responsible for sending downlink data to the UPF network element or receiving uplink data sent by the UPF network element.

In the foregoing communications system, a data packet is forwarded through a plurality of network domains. For example, the network domains that the data packet passes through may include the RAN, the backhaul network, and the UPF network element 2. In a process in which the data packet is forwarded through the plurality of network domains, a communications apparatus of each network domain forwards the data packet. For example, in the network domain of the RAN, the communications apparatus is an access network device (for example, the access network device 1) in the RAN. In the network domain of the backhaul network, the communications apparatus is a forwarding device in the backhaul network. In the network domain of the UPF network element 2, the communications apparatus is the UPF network element.

Figure 1C:
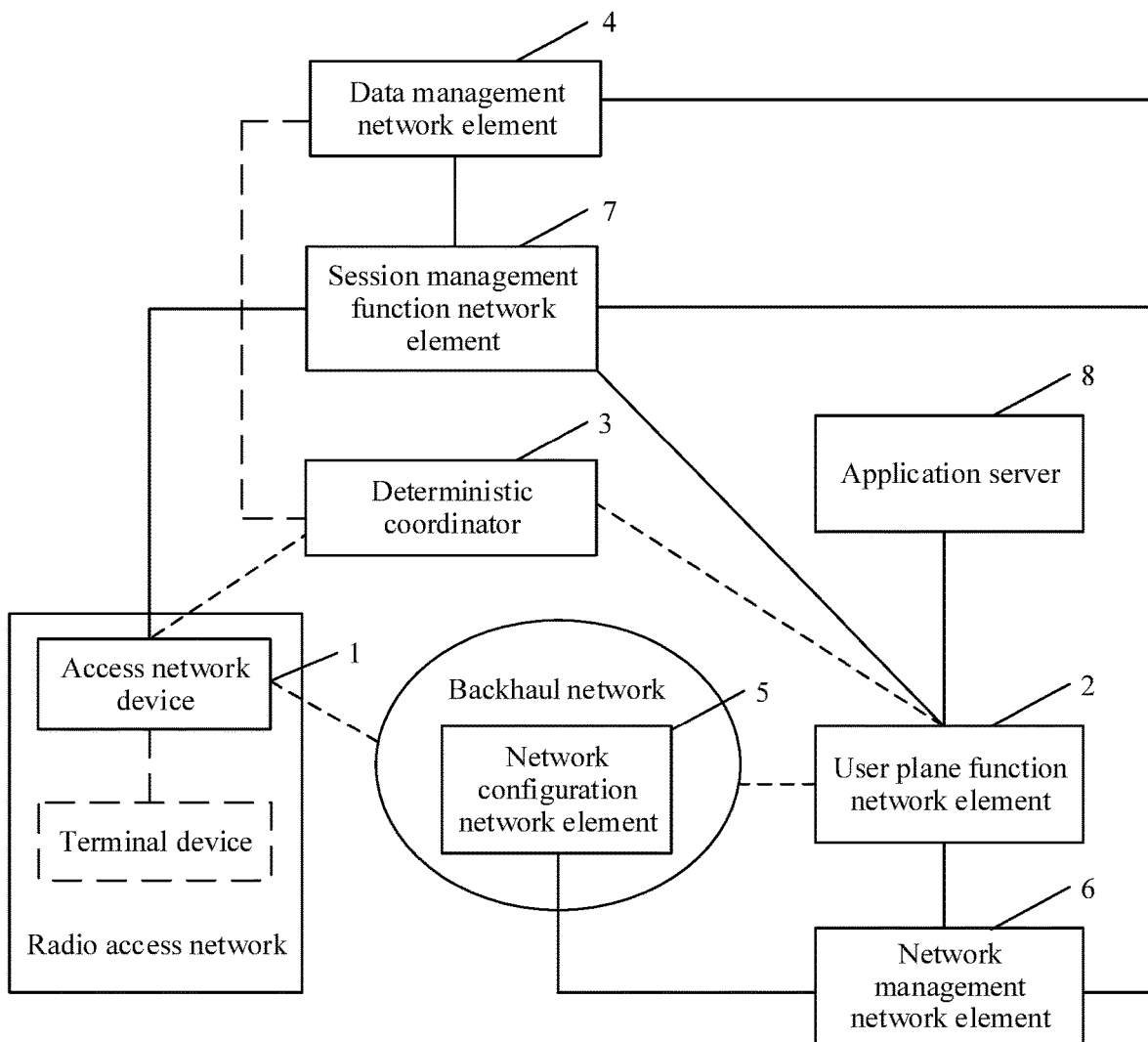
FIG. 1C is a schematic structural diagram of a communications system according to an embodiment of this application.

In this embodiment of this application, a deterministic coordinator 3 is introduced into the communications system shown in FIG. 1C. The deterministic coordinator 3 may be an independently deployed network element, or may be a logical network element integrated in the session management function network element 7 (where, it may alternatively be considered that a deterministic coordination function is integrated in the session management function network element 7). When the deterministic coordinator 3 is integrated in the session management function network element 7, the session management function network element 7 can implement all functions that are the same as or similar to those of the deterministic coordinator 3. The deterministic coordinator 3 may be responsible for assigning QoS parameters to the three network domains: the RAN, the UPF network element, and the backhaul network. In the following description, the deterministic coordinator 3 configured to assign the QoS parameters to the network domains or the session management function network element 7 in which the deterministic coordination function is integrated is referred to as a control plane network element.

Based on the communications system shown in FIG. 1C, this application provides the following technical solution.

In a session establishment phase or a handover phase, the control plane network element may divide a QoS parameter (that is, an end-to-end QoS parameter) between the terminal device and the UPF network element based on capability information of the backhaul network, capability information of the RAN, and capability information of the UPF network element, to obtain a QoS parameter of each network domain, sends first information related to the QoS parameter of each network domain to each network domain. For example, for the two network domains the RAN and the UPF network element, the control plane network element may deliver a correspondence between each QoS parameter obtained after division and a flow identifier such that the access network device and the UPF network element can complete data packet forwarding based on the QoS parameter corresponding to the flow identifier. For the network domain of the backhaul network, the control plane network element may deliver a correspondence between a flow identifier and a stream identifier such that the forwarding device in the backhaul network completes data packet forwarding based on the correspondence between a flow identifier and a stream identifier. In this way, resource scheduling can be precisely performed on each network domain, ensuring that transmission of the deterministic service satisfies a requirement.

Figure 2:
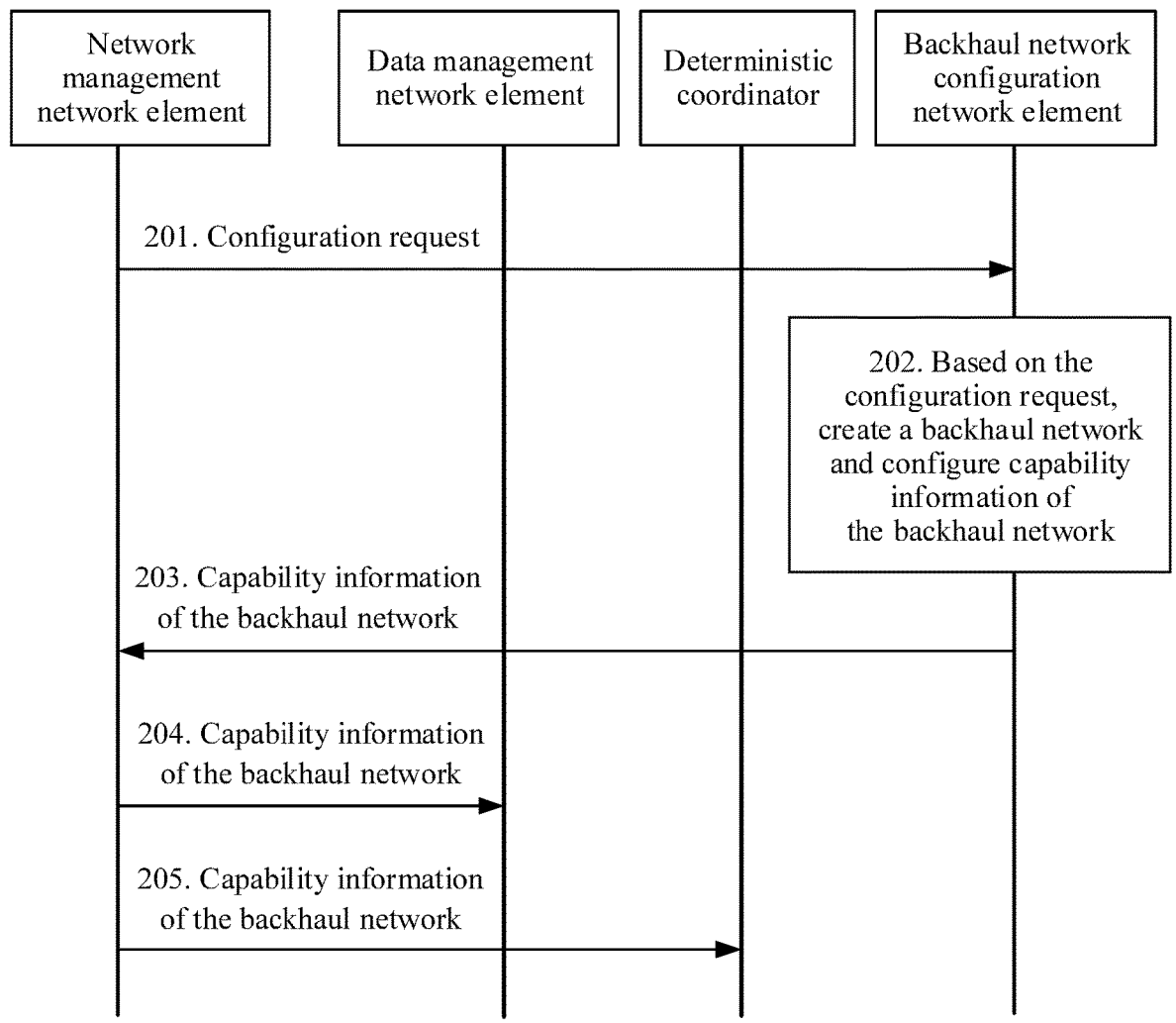
FIG. 2 is a schematic flowchart for configuring a backhaul network according to an embodiment of this application.

Before a procedure of a QoS parameter processing method is described, the following first describes a method for configuring a backhaul network. Capability information of a network domain of the backhaul network may be obtained using the method in FIG. 2. As shown in FIG. 2, this method may include the following steps.

201. A network management network element sends a configuration request to a backhaul network configuration network element.

For example, the network management network element may be the network management network element 6 in FIG. 1C. The backhaul network configuration network element may be the backhaul network configuration network element 5 in FIG. 1C.

The configuration request is used to request to configure capability information of the backhaul network. For example, the configuration request may include an expected value of a QoS parameter of the backhaul network, an IP address of an access network device, and an IP address of a UPF network element. The expected value of the QoS parameter of the backhaul network may include at least one of an expected value of a latency parameter, an expected value of a jitter parameter, and an expected value of reliability of the backhaul network. The IP address of the access network device and the IP address of the UPF network element may be used to identify the backhaul network.

202. Based on the configuration request, the backhaul network configuration network element creates a backhaul network and configures capability information of the backhaul network.

For example, the backhaul network configuration network element configures the capability information of the backhaul network based on an idle network resource in the backhaul network and the expected value of the QoS parameter of the backhaul network. In a possible implementation, if the backhaul network configuration network element can configure, based on a current idle network resource, the backhaul network that satisfies the expected value of the QoS parameter, the backhaul network configuration network element may configure the capability information of the backhaul network based on the expected value of the QoS parameter in the configuration request. In another possible implementation, if a current idle network resource cannot satisfy the expected value of the QoS parameter, the backhaul network configuration network element may configure the capability information of the backhaul network in a manner in which the expected value of the QoS parameter is satisfied as much as possible.

The capability information of the backhaul network includes a stream identifier of a service flow in the backhaul network, a quantity of available service flows, and a QoS parameter of the service flow. For example, the QoS parameter of the service flow may include a latency parameter and a jitter parameter of the service flow. Further, the QoS parameter of the service flow may further include a bandwidth parameter and reliability. For example, for the capability information of the backhaul network, refer to content in the following Table 1.

TABLE 1

| | Stream identifier | Latency parameter | Jitter parameter | Quantity of available service flows |
|---|---|---|---|---|
| Stream 1 | 001 | 1 ms | 10 μs | 50 |
| Stream 2 | 002 | 5 ms | 100 μs | 100 |
| Stream 3 | 003 | 10 ms | 1 ms | 200 |

In Table 1, the stream 1, the stream 2, and the stream 3 are streams, for transmitting service data, in the backhaul network, and the stream identifiers are used to identify the streams for transmitting the service data. The latency parameter is a maximum value of the latency parameter when service data is transmitted on a stream, and the jitter parameter is a maximum value of the jitter parameter when the service data is transmitted on the stream. Each stream may carry a plurality of service flows used to transmit service data. The quantity of available service flows indicates a quantity of service flows that remain in a stream and are available for transmitting service data. When one service flow of a stream is used to transmit service data, a quantity of available service flows of the stream is decreased by 1, and the capability information of the backhaul network shown in Table 1 is synchronously updated. When the quantity of available service flows is 0, it indicates that the stream has no service flow available for transmitting service data.

In the example in Table 1, the backhaul network includes three streams: the stream 1, the stream 2, and the stream 3. The stream 1 corresponds to the stream identifier 001, the latency parameter is 1 ms, the jitter parameter is 10 μs, and there are 50 available service flows. The stream 2 corresponds to the stream identifier 002, the latency parameter is 5 ms, the jitter parameter is 100 μs, and there are 100 available service flows. The stream 3 corresponds to the stream identifier 003, the latency parameter is 10 ms, the jitter parameter is 1 ms, and there are 200 available service flows.

203. The backhaul network configuration network element sends the capability information of the backhaul network to the network management network element.

204. The network management network element receives, from the backhaul network configuration network element, the capability information of the backhaul network, and sends the capability information of the backhaul network to a data management network element.

For example, the data management network element may be the data management network element 4 in FIG. 1C. After receiving the capability information of the backhaul network, the data management network element may store the capability information of the backhaul network in the data management network element.

In another possible implementation, step 204 may be replaced with step 205. The network management network element receives, from the backhaul network configuration network element, the capability information of the backhaul network, and sends the capability information of the backhaul network to a deterministic coordinator. For example, the deterministic coordinator may be the deterministic coordinator 3 in FIG. 1C. Correspondingly, after receiving the capability information of the backhaul network, the deterministic coordinator may store the capability information of the backhaul network in the deterministic coordinator.

It can be learned that, when the backhaul network configuration network element cannot interact with a control plane (for example, the data management network element or the deterministic coordinator) of the 3GPP because there is no interface therebetween, the network management network element in this embodiment of this application may serve as a relay between the backhaul network and the control plane of the 3GPP, to be specific, the backhaul network configuration network element sends, through forwarding by the network management network element, the capability information of the backhaul network to be transmitted to the data management network element or the deterministic coordinator, and subsequently the control plane network element (that may alternatively be the deterministic coordinator) may determine a QoS parameter of each network domain based on the capability information of the backhaul network.

Figure 3A:
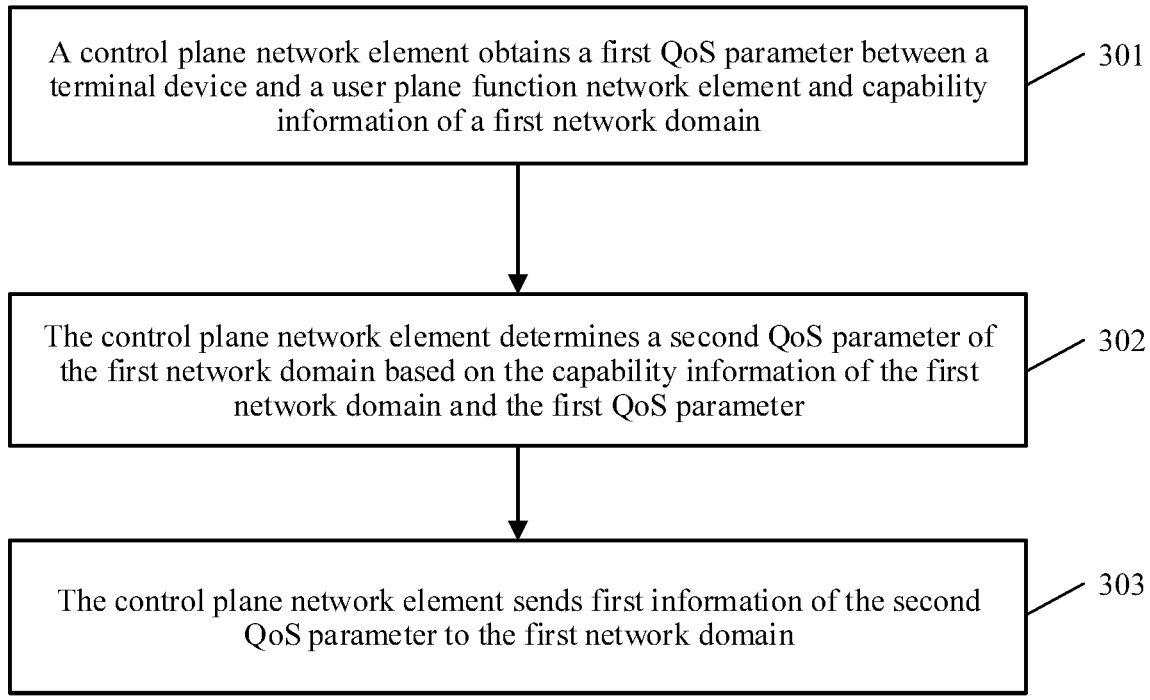
FIG. 3A is a schematic flowchart of a QoS parameter processing method according to an embodiment of this application.

This application further provides a QoS parameter processing method that is performed after the backhaul network is configured. Refer to FIG. 3A. The method includes the following steps.

301. A control plane network element obtains a first QoS parameter between a terminal device and a UPF network element and capability information of a first network domain.

The first QoS parameter is a QoS parameter between the terminal device and the UPF network element. For example, the first QoS parameter includes at least one of a latency parameter, a jitter parameter, and a reliability parameter. The first QoS parameter defines the QoS parameter between the terminal device and the UPF network element. It should be noted that the first QoS parameter does not limit a specific UPF network element that establishes a session with the terminal device, and the first QoS parameter does not change due to a change of the UPF network element that establishes a session connection to the terminal device.

For example, the control plane network element may obtain subscription data of the terminal device. For example, the subscription data of the terminal device is data corresponding to a service subscribed to by the terminal device. That is, the subscription data of the terminal device may include a QoS parameter, account information, a service type, a service class, a transmit frequency and a size of a data packet, and the like that correspond to the service subscribed to by the terminal device. The control plane network element may obtain the first QoS parameter from the subscription data.

The first network domain includes at least one of a RAN, a backhaul network, and the UPF network element. The following separately describes, based on a type of the first network domain, an implementation of obtaining, by the control plane network element, the capability information of the first network domain.

1. When the first network domain includes the RAN or the UPF network element, the implementation of obtaining, by the control plane network element, the capability information of the first network domain includes either of the following two:

(a) The control plane network element sends a request message to the first network domain, after receiving the request message from the control plane network element, a communications apparatus in the first network domain feeds back the capability information of the first network domain to the control plane network element. For example, the request message includes the transmit frequency and the size of the data packet, and the capability information of the first network domain is associated with the transmit frequency and the size of the data packet. For example, the control plane network element may obtain the transmit frequency and the size of the data packet from the subscription data of the terminal device. After receiving the transmit frequency and the size of the data packet from the control plane network element, the communications apparatus in the first network domain may determine the capability information of the first network domain based on the transmit frequency and the size of the data packet, and feed back the determined capability information of the first network domain to the control plane network element.

For example, the communications apparatus may determine, based on the transmit frequency and the size of the data packet, a channel that needs to serve a service flow, determine a transmit time-slot (a time required for sending one data packet) based on the size of the data packet, and determine a time interval of the transmit time-slot based on the transmit frequency of the data packet, and determine, based on the time interval of the transmit time-slot, the earliest and latest sending time points after the data packet arrives at the communications apparatus. In this way, a latency parameter and a jitter parameter in the capability information are determined. In addition, the communications apparatus may further determine a reliability parameter based on quality of a channel.

For example, if the transmit frequency of the data packet is 10/ms (that is, 10 data packets are sent every 1 ms), and the size of the data packet is 40 bytes, a value of the transmit time-slot is 1 ms (that is, 1 ms needs to be spent on sending one data packet). Because a retransmission latency needs to be considered, a maximum latency is 1+1+1=3 ms. Therefore, a value range of the latency parameter is 1 ms to 3 ms. A minimum time interval of a transmit time-slot of the communications apparatus is 0.025 ms. Because a transmit frequency of a service flow is 10/ms, a maximum time interval of a transmit time-slot reserved for the service flow is 0.1 ms. Therefore, a value range of the jitter parameter is 25 μs to 100 ms. A reliability parameter of the channel is 99.9% to 99.9999%.

(b) The communications apparatus of the first network domain may periodically report the capability information of the first network domain to the control plane network element, and the control plane network element may receive, from the first network domain, the capability information periodically reported by the first network domain.

In addition, when the first network domain includes the RAN, in addition to the foregoing periodic reporting manner, an access network device in the RAN may further report the capability information of the first network domain to the control plane network element after receiving a handover request from another access network device.

For the manner (a) and the manner (b), a communications apparatus in a network domain of the RAN may refer to the access network device. A communications apparatus in a network domain of the UPF network element may refer to the UPF network element.

It can be learned that in the foregoing manner (a) or (b), the control plane network element may obtain capability information of the network domain of the RAN (capability information of the RAN) or capability information of the network domain of the UPF network element (capability information of the UPF network element). In addition, because a possible change of a service flow accessed by the RAN is considered in the manner (a) or (b), the control plane network element can more precisely and properly assign a corresponding QoS parameter to each network domain based on the capability information, of the network domain, obtained in the foregoing manner, further ensuring transmission of a deterministic service.

For example, Table 2 and Table 3 are respectively a representation form of the capability information reported by the UPF network element and a representation form of the capability information reported by the access network device.

TABLE 2

| Latency | Jitter | Reliability |
|---|---|---|
| 0.5 ms to 5 ms | 10 μs to 50 μs | 99.9% to 99.9999% |

TABLE 3

| Latency | Jitter | Reliability |
|---|---|---|
| 1 ms to 5 ms | 10 μs to 50 μs | 99.9% to 99.9999% |

Table 2 indicates that the latency that can be implemented by the network domain of the UPF network element is 0.5 ms to 5 ms, the jitter is 10 μs to 50 μs, and the reliability is 99.9999% to 99.9%.

Table 3 indicates that the latency that can be implemented by the network domain of the access network device is 1 ms to 5 ms, the jitter is 10 μs to 50 μs, and the reliability is 99.9999% to 99.9%.

A manner and an occasion of obtaining the capability information of the first network domain are not limited in this application.

2. When the first network domain includes the backhaul network, the control plane network element may obtain capability information of the backhaul network in either of the following two manners.

The control plane network element may receive, from the network management network element, the capability information of the backhaul network, in a configuration phase of the backhaul network (for example, using step 205 in FIG. 2).

The data management network element may receive, from the network management network element, the capability information of the backhaul network, in the configuration phase of the backhaul network (for example, using step 204 in FIG. 2). Subsequently, the control plane network element may obtain, from the data management network element, the capability information of the backhaul network.

For the capability information of the backhaul network, refer to the description of step 202 in FIG. 2. Details are not described herein again.

302. The control plane network element determines a second QoS parameter of the first network domain based on the capability information of the first network domain and the first QoS parameter.

For example, the second QoS parameter includes at least one of a latency parameter, a jitter parameter, and a reliability parameter.

By performing step 302, the control plane network element may divide the first QoS parameter between the terminal device and the UPF network element. For example, the control plane network element may divide the first QoS parameter into three QoS parameters respectively for the network domain of the RAN, a network domain of the backhaul network, and the network domain of the UPF network element. The three QoS parameters respectively correspond to the network domain of the RAN, the network domain of the backhaul network, and the network domain of the UPF network element. That is, a QoS parameter obtained after division corresponds to the network domain. Alternatively, the control plane network element may divide the first QoS parameter into two QoS parameters. For example, after the first QoS parameter is divided, any two of the foregoing three network domains correspond to one QoS parameter, and the remaining network domain corresponds to the other QoS parameter.

That is, the first network domain may be the RAN, the backhaul network, or the UPF network element, or may be any two of the RAN, the backhaul network, or the UPF network element.

In addition, a type of the second QoS parameter corresponds to a parameter type in the first QoS parameter. For example, when the first QoS parameter includes the latency parameter, a QoS parameter obtained after division also includes the latency parameter. When the first QoS parameter includes the latency parameter, the jitter parameter, and the reliability parameter, the QoS parameter obtained after division also includes the latency parameter, the jitter parameter, and the reliability parameter.

After division, a sum of latency parameters of the network domains does not exceed an end-to-end latency parameter in the first QoS parameter. A sum of jitter parameters of the network domains does not exceed an end-to-end jitter parameter in the first QoS parameter. A product of reliability parameters of the network domains does not exceed an end-to-end reliability parameter in the first QoS parameter.

For example, before division, the first QoS parameter includes a latency, a jitter, and reliability, as shown in Table 4. A flow identifier of a QoS flow corresponding to the QoS parameter is 005. For example, the flow identifier may be a QoS flow identifier (QFI). The control plane network element may divide the first QoS parameter based on the first QoS parameter and the capability information of the network domains shown in Table 1, Table 2, and Table 3. QoS parameters obtained after division each include a latency, a jitter, and reliability. After division, the QoS parameters of the RAN, the backhaul network, and the UPF network element are shown in Table 5.

TABLE 4

| Latency | Jitter | Reliability |
|---|---|---|
| 10 ms | 100 μs | 99.999% |

TABLE 5

| | Latency | Jitter | Reliability |
|---|---|---|---|
| RAN | 5 ms | 50 μs | 99.9999% |
| Backhaul network | 3 ms | 10 μs | 99.999% |
| UPF network element | 2 ms | 40 μs | 99.9999% |

In Table 4, the end-to-end first QoS parameter includes the 10 ms latency, the 100 μs jitter, and the 99.999% reliability. After division, as shown in Table 5, the QoS parameter of the RAN includes the 5 ms latency, the 50 μs jitter, and the 99.9999% reliability, the QoS parameter of the backhaul network includes the 3 ms latency, the 10 μs jitter, and the 99.999% reliability, and the QoS parameter of the UPF network element includes the 2 ms latency, the 40 μs jitter, and the 99.9999% reliability. After division, the QoS parameter of the backhaul network corresponds to the QoS parameter of the stream 1 whose stream identifier is 001 in the backhaul network in Table 1. That is, a result of the division shows that, the QoS parameter of the backhaul network can be satisfied by transmitting a data packet using the stream 1 whose stream identifier is 001 in the backhaul network.

Based on a comparison between Table 4 and Table 5, it can be learned that, in the other approaches, originally the UPF network element can perform data packet forwarding and resource scheduling only based on the QoS parameter in Table 4. After the QoS parameter in Table 4 is divided using a solution in this application, the UPF network element can perform data packet forwarding and resource scheduling based on the 2 ms latency, the 40 μs jitter, and the 99.9999% reliability. It is similar for the two network domains: the RAN and the backhaul network. It can be learned that, compared with the end-to-end QoS parameter in Table 4, the QoS parameter, of each network domain, obtained after division and shown in Table 5 in this application enables the communications apparatus in the first network domain to more precisely complete data packet forwarding and resource scheduling.

In some implementations, when determining the second QoS parameter, the control plane network element may determine the second QoS parameter for the first network domain based on the capability information of the first network domain, the first QoS parameter, and a priority of the first network domain.

For example, when dividing the QoS parameter, the control plane network element may preferentially assign a QoS parameter to the RAN, and may allocate, to the RAN based on the capability information of the RAN, fewest (or as-few-as-possible) resources required to satisfy a QoS parameter of the deterministic service. For example, a latency that can be provided by the RAN is 1 to 6 ms. On the premise that a requirement of the QoS parameter of the deterministic service is satisfied, the control plane network element may assign a 5 ms latency to the RAN. When the latency is 5 ms, not only the requirement of the QoS parameter of the deterministic service can be satisfied, but also relatively few resources in the RAN are occupied. If a 2 ms latency is assigned (where, a requirement on the latency is higher), relatively many resources in the RAN are occupied. It can be learned that, according to this division principle, a QoS parameter of the first network domain can be more properly assigned, and subsequent QoS parameter re-division caused by reasons such as improper allocation of a resource and terminal device handover is reduced, reducing an unnecessary procedure of the control plane network element.

In some implementations, before determining the second QoS parameter, the control plane network element may further determine whether the first QoS parameter satisfies a division condition.

For example, when the control plane network element is a session management function network element in which a deterministic coordination function is integrated, the control plane network element may determine, based on subscription data of the terminal device, whether to divide the first QoS parameter. For example, when the subscription data includes second information used to indicate that a service of the terminal device includes a deterministic service, the control plane network element may determine that the service of the terminal device includes the deterministic service, and the control plane network element needs to divide the first QoS parameter. In this way, the control plane network element may determine a second QoS parameter of the first network domain based on the capability information of the first network domain and the first QoS parameter.

When the control plane network element is an independently deployed deterministic coordinator, the session management function network element may determine, based on the subscription data of the terminal device, whether to divide the first QoS parameter. Similarly, when the subscription data includes the second information used to indicate that the service of the terminal device includes the deterministic service, the session management function network element may determine that the service of the terminal device includes the deterministic service, and request the control plane network element to divide the first QoS parameter. After receiving the request, the control plane network element may determine the second QoS parameter of the first network domain based on the capability information of the first network domain and the first QoS parameter.

Optionally, the second information may include a jitter parameter or a flow identifier of a service flow of the deterministic service. That is, if the subscription data includes the jitter parameter or the flow identifier of the service flow of the deterministic service, the service of the terminal device includes the deterministic service having a relatively high requirement for transmission stability. Therefore, the control plane network element needs to assign a QoS parameter to each network domain of the terminal device. In this way, it can be ensured that transmission of the deterministic service of the terminal device satisfies a requirement.

It can be learned that, whether the control plane network element needs to divide a QoS parameter corresponding to a service can be determined using an explicit indication in the subscription data. In this way, the QoS parameter can be divided pertinently. For a terminal device that does not have a requirement for a deterministic service or has a deterministic service with a relatively low requirement, an unnecessary QoS parameter division procedure may be reduced.

In some implementations, the control plane network element may further update capability information of the backhaul network. For example, after the service QoS parameter is divided, on the premise that deterministic transmission is ensured, the control plane network element may update a quantity of available service flows in the capability information of the backhaul network. For example, an original quantity of available service flows that can be supported by the backhaul network can be reduced. The capability information of the backhaul network is dynamically adjusted such that a stream resource in the backhaul network can be accurately controlled, optimizing the backhaul network.

303. The control plane network element sends first information of the second QoS parameter to the first network domain.

The following separately describes, based on the type of the first network domain, implementations of delivering the first information by the control plane network element.

When the first network domain includes the RAN or the UPF network element, the first information of the second QoS parameter may include a correspondence between a flow identifier and the second QoS parameter, and the flow identifier is used to identify a QoS flow between the terminal device and the UPF network element.

For example, when the first network domain includes the RAN, the first information may include a correspondence between a flow identifier and a QoS parameter of the RAN. When the first network domain includes the UPF network element, the first information may include a correspondence between a flow identifier and a QoS parameter of the UPF network element.

With reference to the example mentioned in step 302, the flow identifier is 005. Therefore, for the RAN, the first information may be that shown in Table 6. For the UPF network element, the first information may be that shown in Table 7.

TABLE 6

|  | Latency | Jitter | Reliability | Flow identifier |
|---|---|---|---|---|
| RAN | 5 ms | 50 μs | 99.9999% | 005 |

TABLE 7

|  | Latency | Jitter | Reliability | Flow identifier |
|---|---|---|---|---|
| UPF network element | 2 ms | 40 μs | 99.9999% | 005 |

In this way, after receiving a data packet, the communications apparatus in the first network domain may determine, based on a flow identifier in the data packet and a correspondence between the received flow identifier and the second QoS parameter, the second QoS parameter for forwarding the data packet. How the communications apparatus in the first network domain forwards the data packet based on the correspondence between a flow identifier and a QoS parameter of the UPF network element is further described with reference to FIG. 4 or FIG. 5 below.

When the first network domain includes the backhaul network, the first information of the second QoS parameter includes a correspondence between a flow identifier and a stream identifier, the flow identifier is used to identify a QoS flow between the terminal and the UPF network element, and the stream identifier is used to identify a stream that is in the backhaul network and that satisfies the second QoS parameter.

For example, with reference to the example mentioned in step 302, the flow identifier is the 005, and the QoS parameter of the backhaul network after the division corresponds to the QoS parameter of the stream 1 whose stream identifier is 001 in the backhaul network in Table 1. Therefore, the first information is a correspondence between the flow identifier 005 and the stream identifier 001.

In this way, after receiving an uplink data packet, the access network device may determine, based on a flow identifier in the uplink data packet and a correspondence between the received flow identifier and a stream identifier, a stream that is in the backhaul network and that can satisfy the second QoS parameter, and encapsulate the stream identifier into the uplink data packet. In this way, after receiving the uplink data packet, the communications apparatus (a forwarding device such as a switch or a router) in the backhaul network may transmit the uplink data packet through the stream. Similarly, the UPF network element may forward a downlink data packet based on the correspondence between a flow identifier and a stream identifier through a stream in the backhaul network. How the communications apparatus in the backhaul network forwards the data packet based on the correspondence between a flow identifier and a stream identifier is further described with reference to FIG. 4 or FIG. 5 below.

In this embodiment of this application, the control plane network element determines the second QoS parameter of the first network domain (that is, determines a QoS parameter of at least one network domain) based on the capability information of the first network domain and the first QoS parameter, to be specific, separately assigns a proper QoS parameter to each network domain, and then separately delivers the QoS parameter to each network domain, ensuring that the QoS parameter obtained by each network domain is a QoS parameter of the corresponding network domain. Compared with an existing mechanism in which each network domain can be scheduled based on only an end-to-end indicator, in this embodiment of this application, a communications apparatus in each network domain can perform precise scheduling based on the QoS parameter of the corresponding network domain, ensuring deterministic transmission and improving user experience. In addition, because the QoS parameter of each network domain may be dynamically assigned, resource utilization can be improved.

It should be noted that, the determining, of the second QoS parameter, implemented using the method shown in FIG. 3A may refer to the first division of the QoS parameter, or may be subsequent re-division of the QoS parameter.

For example, the foregoing step 302 and step 303 may be the first division that occurs in a procedure in a session establishment phase, or may be re-division that occurs in a procedure in a handover phase. The first division that occurs in the procedure in the session establishment phase is further described with reference to FIG. 6 below. The re-division that occurs in the procedure in the handover phase is further described with reference to FIG. 7 or FIG. 8 below.

In addition, when the first network domain includes the RAN, the capability information of the RAN may change, and the control plane network element may further update the QoS parameter of the first network domain based on changed capability information of the RAN.

For example, in a possible implementation, the communications apparatus (for example, a first access network device) in the RAN may periodically send the capability information of the RAN to the control plane network element. When the control plane network element determines that a data radio bearer in the first network domain does not satisfy any one of the QoS parameter of the first network domain, and a transmit frequency and a size of a data packet, the control plane network element may re-divide the QoS parameter of the first network domain based on changed capability information of the RAN, and send QoS parameters obtained after the re-division to the first network domain.

In another possible implementation, when a first access network device determines that a QoS parameter of a RAN in which the first access network device is located does not satisfy any one of the QoS parameter of the RAN in which the first access network device is located, a size of a data packet, and a transmit frequency, the first access network device may send the capability information of the RAN in which the first access network device is located to the control plane network element, and request the control plane network element to re-divide the QoS parameter of the first network domain. After receiving the request, the control plane network element responds to the request for re-dividing the QoS parameter of the first network domain, and re-divides the QoS parameter of the first network domain based on changed capability information of the RAN.

In addition, when the subscription data of the terminal device changes, if determining, based on the updated subscription data, that a condition for dividing the QoS parameter is still satisfied, the session management function network element may alternatively request the deterministic coordinator to re-divide the QoS parameter. Details of this procedure are not described.

Figure 3B:
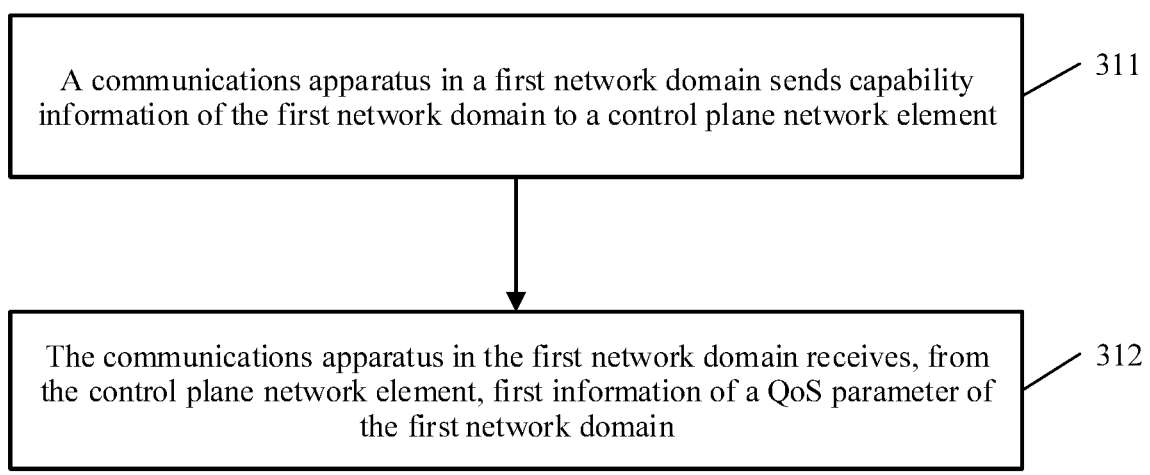
FIG. 3B is another schematic flowchart of a QoS parameter processing method according to an embodiment of this application.

FIG. 3B shows a method on a communications apparatus side of a first network domain. The method includes the following steps.

311. A communications apparatus in the first network domain sends capability information of the first network domain to a control plane network element.

The capability information of the first network domain is used to determine a QoS parameter of the first network domain, and the first network domain includes a RAN or a UPF network element.

A communications apparatus in a network domain of the RAN may refer to an access network device. A communications apparatus in a network domain of the UPF network element may refer to the UPF network element.

Before step 311, the method may further include receiving, by the communication device in the first network domain, a request message from the control plane network element. For example, the request message includes a transmit frequency and a size of a data packet, and the capability information of the first network domain is associated with the transmit frequency and the size of the data packet. After receiving the transmit frequency and the size of the data packet from the control plane network element, the communications apparatus in the first network domain may determine the capability information of the first network domain based on the transmit frequency and the size of the data packet.

After the communications apparatus in the first network domain sends the capability information of the first network domain to the control plane network element, the control plane network element may divide an end-to-end QoS parameter between a terminal device and the UPF network element based on capability information of each network domain.

For the capability information of the first network domain, refer to the description of step 301 in FIG. 3A. Details are not described herein again.

312. The communications apparatus receives, from the control plane network element, first information of the QoS parameter of the first network domain.

For a feature of the first information, refer to the description of the first information in step 303 in FIG. 3A. Details are not described herein again.

According to the method in FIG. 3B, the communications apparatus in the first network domain provides the capability information of the first network domain for the control plane network element such that the control plane network element can accurately determine the QoS parameter of the first network domain, and the communications apparatus of the first network domain obtains, from the control plane network element, the QoS parameter of the first network domain. Therefore, a communications apparatus in a network domain can perform precise scheduling based on a QoS parameter of this network domain, ensuring the deterministic transmission and improving user experience and resource utilization of a mobile network.

Figure 4:
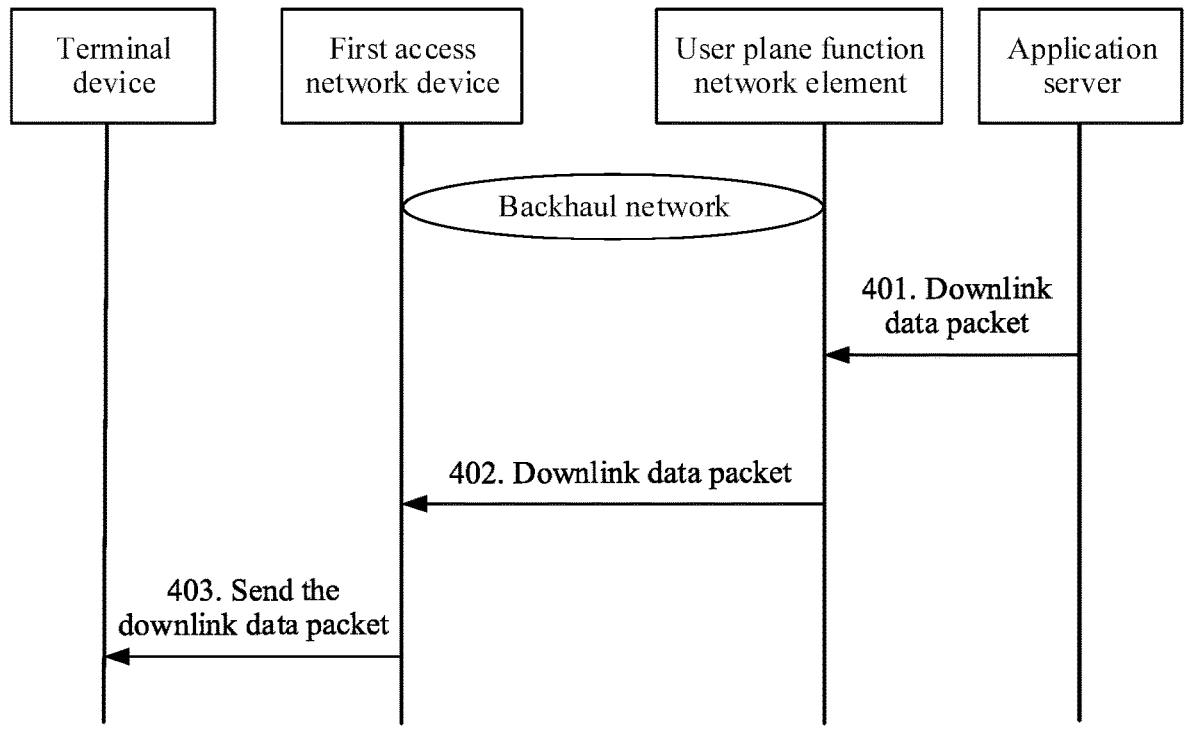
FIG. 4 is a schematic processing flowchart for forwarding an uplink data packet based on a QoS parameter by a forwarding plane network element according to an embodiment of this application.
Figure 5:
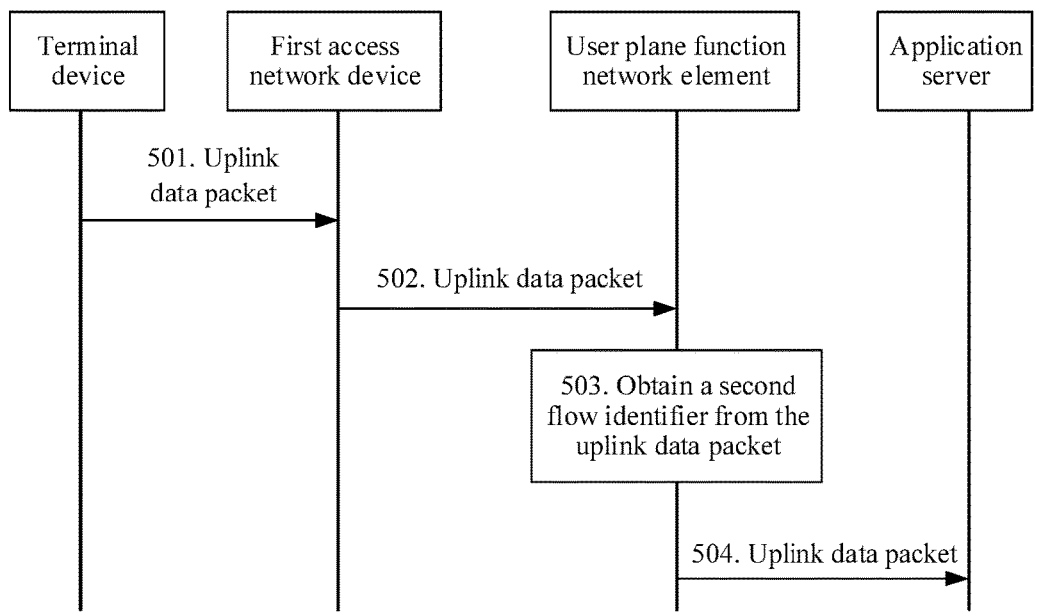
FIG. 5 is a schematic processing flowchart for forwarding a downlink data packet based on a QoS parameter by a forwarding plane network element according to an embodiment of this application.

FIG. 4 shows how a communications apparatus in each network domain implements downlink data packet forwarding after receiving a QoS parameter after division. FIG. 5 shows how a communications apparatus in each network domain implements uplink data packet forwarding after receiving a QoS parameter after division. In FIG. 4 and FIG. 5, a communications apparatus in a network domain of a RAN is a first access network device in the RAN, a communications apparatus in a network domain of a UPF network element is the UPF network element. For example, in FIG. 4 or FIG. 5, the first access network device may be the access network device 1 deployed in the RAN in FIG. 1C, the UPF network element may be the UPF network element 2 in FIG. 1C, and an application server may be the application server 8 in FIG. 1C. As shown in FIG. 4, a procedure for forwarding a downlink data packet includes the following steps.

401. The UPF network element receives a downlink data packet from the application server.

The downlink data packet includes a first flow identifier. For example, the flow identifier may be a QFI. For example, if the downlink data packet includes the first flow identifier, the downlink data packet may be transmitted between a terminal device and the UPF network element using a QoS flow identified by the first flow identifier. The user plane network element may obtain the first flow identifier corresponding to the downlink data packet.

402. The UPF network element sends the downlink data packet to the first access network device through a backhaul network based on a QoS parameter that is in first information and that corresponds to the first flow identifier.

As described above, the UPF network element has obtained first information of a QoS parameter of the domain using the foregoing method, and the first information of the QoS parameter of the domain includes a correspondence between the first flow identifier and a QoS parameter of the network domain of the UPF network element, for example, as shown in Table 7. Therefore, the UPF network element may determine a QoS parameter of the network domain of the UPF network element based on the first flow identifier in the downlink data packet and the correspondence between the first flow identifier and the QoS parameter of the network domain of the UPF network element, and send the downlink data packet based on the QoS parameter of the network domain of the UPF network element.

For example, a time point of receiving the downlink data packet is T1, and the QoS parameter that is in the first information and that corresponds to the first flow identifier includes a latency parameter T2 and a jitter parameter T3. In this case, the UPF network element may send the downlink data packet within a time range of $T=T1+T2(\pm)T3$. Alternatively, the QoS parameter that is in the first information and that corresponds to the first flow identifier includes a latency parameter T4. In this case, the UPF network element may calculate a new bandwidth value based on the latency parameter T4 and with reference to a bandwidth parameter BW, and then send the downlink data packet based on the new bandwidth value. For example, the new bandwidth value is BW':

$$BW'=\max(BW,(2\times BW\times T4)/(2\times BW+T4)).$$

In addition, the UPF network element has obtained first information of a QoS parameter of a network domain of the backhaul network using the foregoing method. The first information of the QoS parameter of the network domain of the backhaul network may include a correspondence between the first flow identifier and a stream identifier of a second stream. The second stream is a stream that is in the backhaul network and that satisfies the QoS parameter of the network domain of the backhaul network. When forwarding the downlink data packet through the backhaul network, the UPF network element may add the first flow identifier and the stream identifier of the second stream to the downlink data packet based on the correspondence between the first flow identifier and the stream identifier of the second stream.

In this way, after receiving the downlink data packet to which the first flow identifier and the stream identifier of the second stream are added, the communications apparatus in the backhaul network sends, based on the first flow identifier and the stream identifier of the second stream, the downlink data packet to the access network device through the second stream in the backhaul network.

Correspondingly, after receiving the downlink data packet from the UPF network element, the communications apparatus in the backhaul network may find a corresponding QoS parameter based on the stream identifier of the second stream, and forward the downlink data packet based on the QoS parameter.

403. The first access network device receives the downlink data packet from the backhaul network, and sends the downlink data packet to the terminal device based on a QoS parameter that is of the network domain of the RAN and that corresponds to the first flow identifier.

As described above, the first access network device has obtained, using the foregoing method, first information of a QoS parameter of the RAN (subsequently, each RAN in which the first access network device is located is briefly referred to as a first RAN) in which the first access network device is located, and establishes a corresponding data radio bearer (DRB) for the terminal device. The data radio bearer may schedule a physical resource based on a time-slot. The first information of the QoS parameter of the first RAN includes a correspondence between the first flow identifier and a QoS parameter of a first RAN, for example, as shown in the foregoing Table 6. After receiving the downlink data packet, the first access network device may determine the QoS parameter of the first RAN based on the first flow identifier in the downlink data packet and the correspondence between the first flow identifier and the QoS parameter of the first RAN, and send the downlink data packet to the terminal device based on the QoS parameter of the first RAN.

Therefore, for the two network domains, the UPF network element and the RAN, precise resource scheduling can be implemented in a corresponding network domain based on a correspondence between a flow identifier and a QoS parameter of the corresponding network domain. For the network domain of the backhaul network, precise resource scheduling may also be implemented in the backhaul network based on a correspondence between a flow identifier and a stream identifier that satisfies a QoS parameter of the domain. Therefore, data packet transmission of a deterministic service of the terminal device can be ensured.

As shown in FIG. 5, a procedure for forwarding an uplink data packet includes the following steps.

501. A terminal device sends an uplink data packet to the first access network device.

The uplink data packet includes a second flow identifier.

502. The first access network device receives the uplink data packet from the terminal device, and sends, through a backhaul network, the uplink data packet to the UPF network element based on a QoS parameter that is in first information and that corresponds to the second flow identifier.

As described above, the first access network device has obtained first information of a QoS parameter of the first RAN using the foregoing method, and first information of the QoS parameter of the domain includes a correspondence between the second flow identifier and a QoS parameter of a first RAN. Therefore, the first access network device may determine the QoS parameter of the first RAN based on the second flow identifier in the uplink data packet and the correspondence between the second flow identifier and the QoS parameter of the first RAN, and send the uplink data packet based on the QoS parameter of the first RAN.

In addition, the first access network device has obtained first information of a QoS parameter of the backhaul network using the foregoing method. The first information of the QoS parameter of the backhaul network may include a correspondence between the second flow identifier and a stream identifier of a first stream. The first stream is a stream that is in the backhaul network and that satisfies the QoS parameter of the network domain of the backhaul network. Therefore, when forwarding the uplink data packet through the backhaul network, the first access network device may determine the first stream based on the correspondence between the second flow identifier and the stream identifier of the first stream, and then add the stream identifier of the first stream to the uplink data packet. In this way, after receiving the uplink data packet, a communications apparatus in the backhaul network may send the uplink data packet to the UPF network element based on the second flow identifier and the stream identifier of the first stream using the first stream in the backhaul network.

It can be learned that the UPF network element can implement precise resource scheduling and data packet forwarding operations based on a correspondence between a flow identifier and a stream identifier.

503. The UPF network element receives the uplink data packet from the first access network device, and obtains the second flow identifier from the uplink data packet.

504. The UPF network element sends the uplink data packet to the application server based on the QoS parameter that is in the first information and that corresponds to the second flow identifier.

As described above, the UPF network element has obtained first information of a QoS parameter of the network domain of the UPF network element using the foregoing method, and the first information of the QoS parameter of the domain includes a correspondence between the second flow identifier and a QoS parameter of the network domain of the UPF network element. Therefore, the UPF network element may determine the QoS parameter of the network domain of the UPF network element based on the second flow identifier in the uplink data packet and the correspondence between the second flow identifier and the QoS parameter of the network domain of the UPF network element, and send the uplink data packet based on the QoS parameter of the network domain of the UPF network element.

It can be learned from the embodiments corresponding to FIG. 4 and FIG. 5 that, based on the QoS parameter delivered by the control plane network element, both the first access network device and the UPF network element can forward an uplink/downlink data packet based on a precise QoS parameter, to ensure deterministic transmission.

The following uses an example in which a control plane network element is an independently deployed deterministic coordinator and capability information of a backhaul network is stored in a data management network element (for example, a UDM), to describe how to assign a QoS parameter to each network domain in a session establishment process. As shown in the FIG. 6, the procedure may include the following steps.

601. A session management function network element receives a session establishment request from a terminal device.

602. The session management function network element sends a subscription request to the data management network element, to request to obtain subscription data of the terminal device.

603. The data management network element sends the subscription data of the terminal device to the session management function network element based on the subscription request.

Correspondingly, the session management function network element obtains, from the data management network element, the subscription data of the terminal device. For example, for a feature of the subscription data, refer to the description of the subscription data in FIG. 3A. Details are not described herein again.

604. Execute a session authorization procedure.

For example, the session management function network element may interact with another network element on a 3GPP control plane, to perform the session authorization procedure.

605. The session management function network element determines whether a QoS parameter needs to be divided.

For example, when determining that the subscription data includes jitter information or a flow identifier of a service flow of a deterministic service, the session management function network element determines that the QoS parameter needs to be divided. For step 605, refer to the description of step 302 in FIG. 3A. Details are not described herein again.

606. The session management function network element sends a division request to the deterministic coordinator.

The division request carries a first QoS parameter, an IP address of an access network device, and an IP address of a UPF network element.

Accordingly, the deterministic coordinator receives the division request from the session management function network element.

607a. The deterministic coordinator sends a backhaul network capability request to the data management network element, to request to obtain the capability information of the backhaul network.

608a. The deterministic coordinator receives the capability information of the backhaul network from the data management network element.

In another embodiment, if a network management network element sends the capability information of the backhaul network to the deterministic coordinator in a configuration phase of the backhaul network, step 607a and step 608a may be omitted.

607b. The deterministic coordinator separately sends a request message to a first access network device and the UPF network element, where the request message carries a transmit frequency and a size of a data packet.

608b. The deterministic coordinator receives capability information of a wireless network domain from the first access network device.

608c. The deterministic coordinator receives, from the UPF network element, capability information of the UPF network element.

For the capability information of the backhaul network, capability information of the RAN, and the capability information of the UPF network element that are obtained in the foregoing steps, refer to descriptions in FIG. 3A. Similar content is not described in detail again.

609. The deterministic coordinator divides the first QoS parameter based on the capability information of the RAN, the capability information of the UPF network element, and the capability information of the backhaul network, to obtain a QoS parameter corresponding to each network domain, where the QoS parameter obtained after the division corresponds to one network domain (or two network domains).

610. The deterministic coordinator sends first information of the QoS parameter obtained after the division.

For step 610, refer to the description of step 303 in FIG. 3A. Details are not described herein again.

For example, for the RAN, the deterministic coordinator may send, using a session establishment response, the first information of the QoS parameter obtained after the division. However, this application is not limited thereto. The deterministic coordinator may alternatively transmit, using another message, the first information of the QoS parameter obtained after the division. In addition, for the UPF network element, the deterministic coordinator may alternatively transmit, using a newly added message or any existing message, the first information of the QoS parameter obtained after the division.

Figure 6:
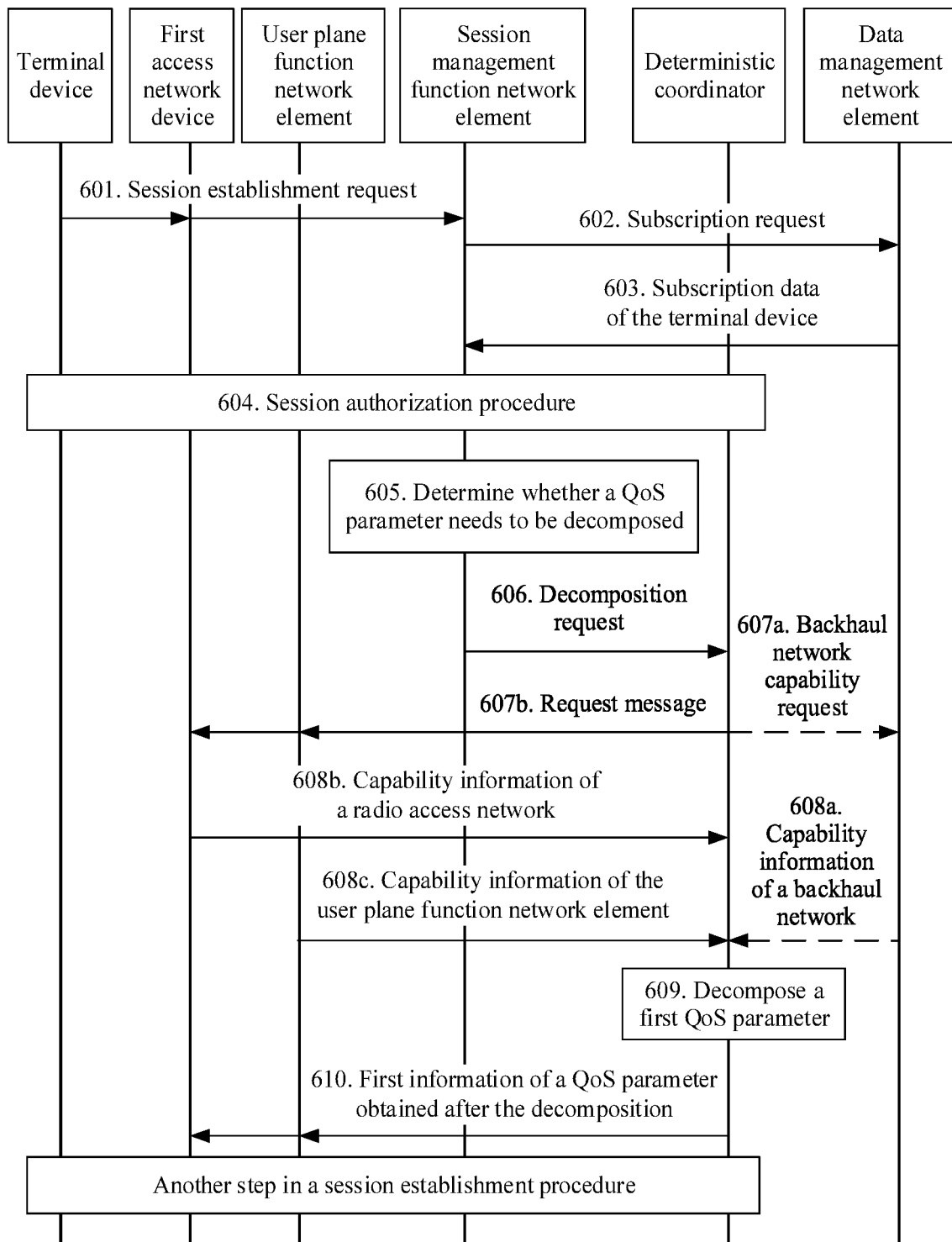
FIG. 6 is another schematic flowchart of a QoS parameter processing method according to an embodiment of this application.

It should be noted that, if the control plane network element is an SMF into which a deterministic coordination function is integrated, the control plane network element may implement all steps that are the same as or similar to those of the session management function network element and the deterministic coordinator in FIG. 6, and interaction between the session management function network element and the deterministic coordinator (for example, step 606) may be omitted.

With reference to the example in FIG. 6, the communications apparatus, in the first network domain, that performs the method in FIG. 3B may be a first RAN or the UPF network element. Therefore, in the session establishment phase, the deterministic coordinator may divide an end-to-end QoS parameter between the terminal device and the UPF network element based on capability information of each network domain.

For example, after the deterministic service of the terminal device has been running for a period of time, a QoS parameter of a network domain may not satisfy the current deterministic service. For example, when capability information of the access network device or the UPF network element fluctuates (for example, a quantity of accessed terminal devices changes or a location of the terminal device changes), the access network device cannot provide the terminal device with a data radio bearer that satisfies a QoS parameter corresponding to the service. The access network device needs to switch the deterministic service of the terminal device to a new access network device. Because the backhaul network between the terminal device and the UPF network element changes before the switching, the deterministic coordinator further needs to dynamically adjust the QoS parameter. For example, the deterministic coordinator re-divides the QoS parameter for each network domain. For example, the new access network device may obtain an updated more loose QoS parameter (for example, a latency indicator or a jitter indicator) from the deterministic coordinator, ensuring stability of the deterministic service after the switching. The following describes, based on a scenario of handover between access network devices, a process in which a deterministic coordinator dynamically adjusts a QoS parameter of a first network domain.

Figure 7:
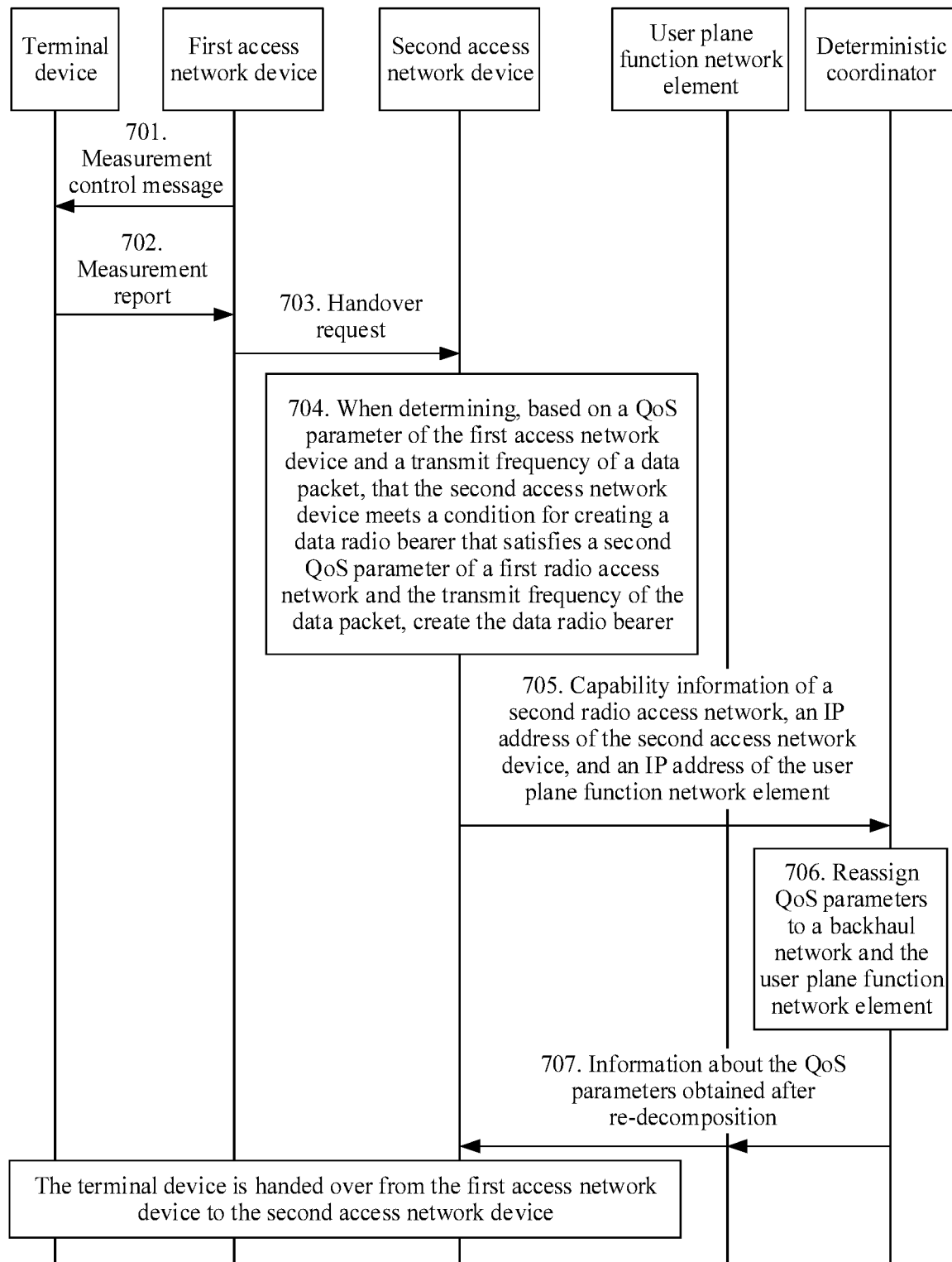
FIG. 7 is a schematic flowchart for re-dividing a first QoS parameter in a handover scenario according to an embodiment of this application.
Figure 8:
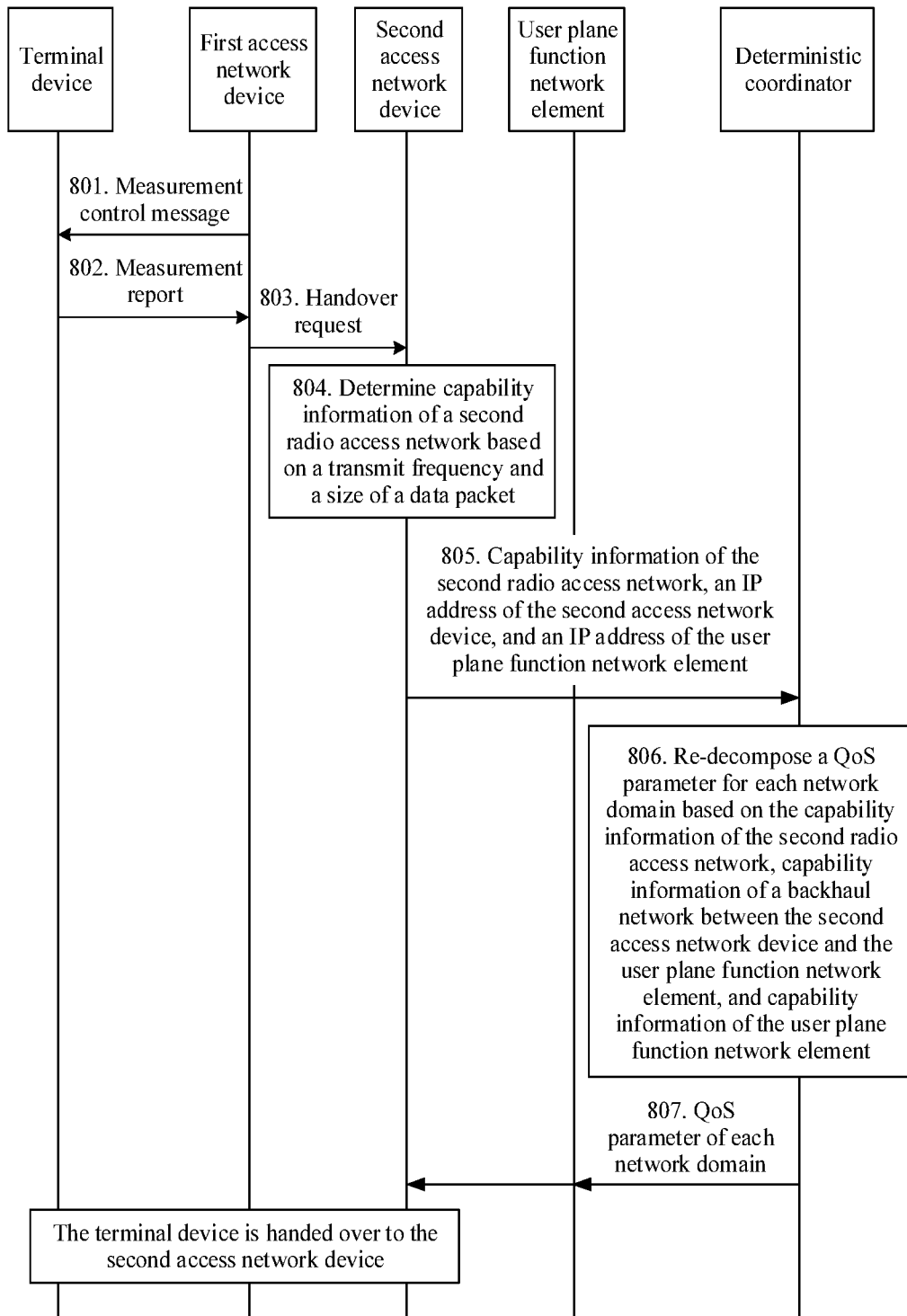
FIG. 8 is a schematic flowchart for re-dividing a first QoS parameter in a handover scenario according to an embodiment of this application.

FIG. 7 and FIG. 8 each describe a process in which a deterministic coordinator determines a QoS parameter of each network domain in a handover scenario in which a terminal device is handed over from a first access network device to a second access network device. Before the handover, the terminal device accesses a core network using the first access network device, after the handover, the terminal device accesses the core network using the second access network device. Before the terminal device is handed over from the first access network device to the second access network device, capability information of a first RAN in which the first access network device is located is considered for dividing a QoS parameter between the terminal device and a UPF network element by the deterministic coordinator. For example, according to the method shown in FIG. 6, the deterministic coordinator divides the QoS parameter between the terminal device and the UPF network element based on the capability information of the first RAN and capability information of another network domain. If the terminal device needs to be handed over to the second access network device, the second access network device sends capability information of a second RAN to a control plane network element, to trigger the deterministic coordinator to re-divide the QoS parameter between the terminal device and the UPF network element based on the capability information fed back by the second access network device.

In an example in FIG. 7, the method includes the following steps.

701. The first access network device sends a measurement control message to the terminal device.

After receiving the measurement control message, the terminal device performs measurement and generates a measurement report.

702. The first access network device receives a measurement report sent by the terminal device, where the measurement report includes signal quality of a neighboring cell.

703. The first access network device sends a handover request to the second access network device when determining, based on the measurement report, that the terminal device satisfies a handover condition.

The handover request carries a QoS parameter of the first RAN and a transmit frequency and a size of a data packet.

704. When the second access network device determines, based on the QoS parameter of the first RAN and the transmit frequency and the size of the data packet, that the second access network device currently meets a condition for creating a data radio bearer that satisfies the QoS parameter of the first RAN and the transmit frequency and the size of the data packet, the second access network device creates the data radio bearer that satisfies the QoS parameter of the first RAN and the transmit frequency and the size of the data packet.

For example, the second access network device learns, based on the transmit frequency and the size of the data packet, of the capability information of the second RAN in which the second access network device is located, and determines, based on the capability information of the second RAN and the QoS parameter of the first RAN, whether a capability of the second RAN after handover can satisfy the QoS parameter of the first RAN before handover. If the capability satisfies the QoS parameter, the data radio bearer that satisfies the QoS parameter of the first RAN and the transmit frequency and the size of the data packet is created.

If the capability of the second RAN after handover can satisfy the QoS parameter of the first RAN before handover, it indicates that the second RAN after handover may use a QoS parameter the same as that of the first RAN before handover, that is, the QoS parameter of the first RAN is the QoS parameter of the second RAN.

705. The second access network device sends the QoS parameter of the second RAN, an IP address of the second access network device, and an IP address of the UPF network element to the deterministic coordinator.

The IP address of the second access network device and the IP address of the UPF network element are used to identify a backhaul network between the second access network device and the UPF network element. After receiving the IP address of the second access network device and the IP address of the UPF network element, the deterministic coordinator may determine the backhaul network between the second access network device and the UPF network element, to obtain, locally or from a data management network element, capability information of the backhaul network.

Optionally, in step 705, the second access network device may further send the transmit frequency and the size of the data packet to the deterministic coordinator. After receiving the transmit frequency and the size of the data packet, the deterministic coordinator may send the transmit frequency and the size of the data packet to the UPF network element based on the IP address of the UPF network element, to request to obtain capability information of the UPF network element. In another embodiment, the second access network device may alternatively locally obtain previously stored capability information of the UPF network element. In this case, the transmit frequency and the size of the data packet may not be sent in step 705.

In addition, because the second access network device can create the data radio bearer, and the second RAN in which the second access network device is located can satisfy a requirement of the terminal device, the second access network device may request the control plane network element to reassign only a QoS parameter of the backhaul network and a QoS parameter of the UPF network element.

706. The deterministic coordinator reassigns QoS parameters to the backhaul network and the UPF network element based on the QoS parameter of the second RAN, the capability information of the backhaul network between the second access network device and the UPF network element, and the capability information of the UPF network element.

The QoS parameter may alternatively be re-divided in the manner in step 302 in FIG. 3A. Details are not described herein again.

707. The deterministic coordinator delivers information about the QoS parameters obtained after re-division.

The information about the QoS parameters obtained after division may be implemented in a manner similar to that for the first information of the second QoS parameter in FIG. 3A. Details are not described herein again.

In addition, a transmission stream between the terminal device and the UPF network element changes after the terminal device is handed over from the first access network device to the second access network device. Therefore, to ensure normal running of the deterministic service of the terminal device, the control plane network element may further update a correspondence between a flow identifier and a QoS parameter, and separately deliver an updated correspondence to the second access network device and the UPF network element.

Then, the terminal device is handed over from the first access network device to the second access network device.

It can be learned that, considering that the transmission stream between the terminal device and the UPF network element changes after the terminal device is handed over from the first access network device to the second access network device, the deterministic coordinator can re-divide corresponding QoS parameters for the second RAN in which the second access network device is located, the UPF network element, and the backhaul network between the second access network device and the UPF network element. Therefore, after the terminal device is handed over to the second access network device, each network domain can still perform pertinent and precise determining and scheduling.

FIG. 8 shows another method. A difference between FIG. 8 and FIG. 7 lies in that, in the example in FIG. 8, the second access network device does not need to determine whether the second RAN in which the second access network device is located satisfies the QoS parameter of the first RAN. For example, the method includes the following steps.

801. The first access network device sends a measurement control message to the terminal device.

After receiving the measurement control message, the terminal device performs measurement and generates a measurement report.

802. The first access network device receives the measurement report sent by the terminal device. The measurement report includes signal quality of a neighboring cell.

803. The first access network device sends a handover request to the second access network device when determining, based on the measurement report, that the terminal device satisfies a handover condition.

The handover request includes a transmit frequency and a size of a data packet.

804. After receiving the handover request, the second access network device may determine, based on the transmit frequency and the size of the data packet, the capability information of the second RAN in which the second access network device is located.

805. The second access network device sends the capability information of the second RAN, an IP address of the second access network device, and an IP address of the UPF network element to the deterministic coordinator.

The IP address of the second access network device and the IP address of the UPF network element are used to identify a backhaul network between the second access network device and the UPF network element. After receiving the IP address of the second access network device and the IP address of the UPF network element, the deterministic coordinator may determine the backhaul network between the second access network device and the UPF network element, to obtain, locally or from a data management network element, capability information of the backhaul network.

Optionally, in step 805, the second access network device may further send the transmit frequency and the size of the data packet to the deterministic coordinator. After receiving the transmit frequency and the size of the data packet, the deterministic coordinator may send the transmit frequency and the size of the data packet to the UPF network element based on the IP address of the UPF network element, to request to obtain capability information of the UPF network element. In another embodiment, the second access network device may alternatively locally obtain previously stored capability information of the UPF network element. In this case, the transmit frequency and the size of the data packet may not be sent in step 805.

806. The deterministic coordinator re-divides the QoS parameter for each network domain based on the capability information of the second RAN, the capability information of the backhaul network between the second access network device and the UPF network element, and the capability information of the UPF network element.

The QoS parameter may alternatively be re-divided in the manner in step 302 in FIG. 3A. Details are not described herein again.

807. The deterministic coordinator delivers information about the QoS parameters obtained after re-division.

The information about the QoS parameters obtained after division may be implemented in a manner similar to that for the first information of the second QoS parameter in FIG. 3A. Details are not described herein again.

Similarly, a transmission stream between the terminal device and the UPF network element changes after the terminal device is handed over from the first access network device to the second access network device. Therefore, to ensure normal running of the deterministic service of the terminal device, the control plane network element may further update a correspondence between a flow identifier and a QoS parameter, and separately deliver an updated correspondence to the second access network device and the UPF network element.

Then, the terminal device is handed over from the first access network device to the second access network device.

With reference to the example in FIG. 8, the communications apparatus, of the first network domain, that performs the method in FIG. 3B may be an access network device (namely, the second access network device) in a RAN (namely, the second RAN) after handover. In a handover phase, after receiving the handover request from the first access network device before handover, the second access network device sends the capability information of the second RAN to the deterministic coordinator such that the deterministic coordinator re-divides the end-to-end QoS parameter between the terminal device and the UPF network element based on the capability information of the second RAN.

In this embodiment of this application, after the terminal device is handed over from the first access network device to the second access network device, the transmission stream between the terminal device and the UPF network element changes. The deterministic coordinator can re-divide corresponding QoS parameters for the second RAN in which the second access network device is located, the UPF network element, and the backhaul network between the second access network device and the UPF network element. Compared with an existing mechanism in which each network domain can be scheduled based on only an end-to-end QoS parameter, in this embodiment of this application, the second access network device and the UPF network element can obtain a dynamically adjusted QoS parameter, and perform precise scheduling based on QoS parameters of respective domains, ensuring deterministic transmission and resource utilization.

It should be noted that, after step 703 in FIG. 7, if the second access network device determines that the second access network device currently does not meet a condition for creating a data radio bearer that satisfies the QoS parameter of the first RAN and the transmit frequency and the size of the data packet, a QoS parameter re-division procedure may alternatively be completed in a manner similar to that of steps 805 to 807 in FIG. 8.

Technical features, such as the capability information of each network domain, the QoS parameter assigned to each network domain, and the correspondence indicating the QoS parameter assigned to each network domain, that are described in the foregoing embodiments are also applicable to the embodiment corresponding to any one of FIG. 9 to FIG. 15 in this application. Subsequent similar content is not described in detail again.

The following separately describes the control plane network element, the communications apparatus, and the session management function network element that are configured to perform the QoS parameter processing method, and the network management network element and the network configuration network element that are configured to perform the network management method.

Figure 9:
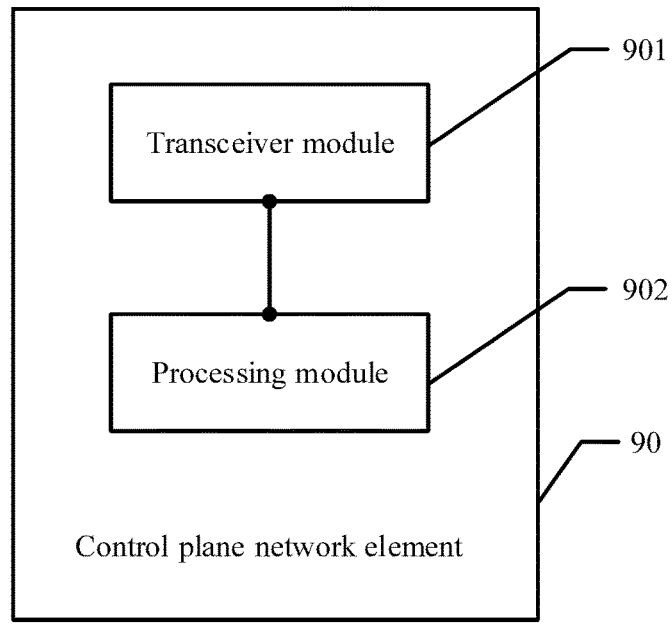
FIG. 9 is a schematic structural diagram of a control plane network element according to an embodiment of this application.

Referring to a control plane network element 90 shown in FIG. 9, the control plane network element 90 may be configured to process a QoS parameter, and the control plane network element 90 can implement a QoS parameter processing step performed by the control plane network element in the embodiment corresponding to any one of FIG. 3A to FIG. 8. A function implemented by the control plane network element 90 may be implemented by hardware, or may be implemented by hardware by executing corresponding software. The hardware or software includes one or more modules corresponding to the function. The module may be software and/or hardware. The control plane network element 90 may be an independently deployed network element, or may be a logical network element integrated in a session management function network element or another 3GPP network element. This is not limited. The control plane network element 90 may include a transceiver module and a processing module. For function implementation of the processing module, refer to operations of determining the QoS parameter of the first network domain, determining whether the second access network device satisfies the requirement of the deterministic service of the terminal device, and dynamically adjusting the QoS parameter of the first network domain by the control plane network element in the embodiment corresponding to any one of FIG. 3A to FIG. 8. Details are not described herein again. For function implementation of the transceiver module, refer to operations of obtaining the capability information of the first network domain, and delivering the first information of the QoS parameter of the first network domain by the control plane network element in the embodiment corresponding to any one of FIG. 3A to FIG. 8. The processing module 902 may be configured to control receiving and sending operations of the transceiver module.

In some implementations, the transceiver module 901 may be configured to obtain a first QoS parameter between a terminal device and a UPF network element, and obtain capability information of a first network domain, the processing module 902 is configured to determine a second QoS parameter of the first network domain based on the capability information of the first network domain and the first QoS parameter that are obtained by the transceiver module, where the first network domain includes at least one of a RAN, a backhaul network, and the UPF network element, and the transceiver module 901 is further configured to send first information of the second QoS parameter to the first network domain.

In this embodiment of this application, the processing module 902 in the control plane network element 90 can determine the second QoS parameter of the first network domain (that is, determines a QoS parameter of at least one network domain) based on the capability information of the first network domain and the first QoS parameter, to be specific, separately assigns a proper QoS parameter to each network domain, and then separately delivers the QoS parameter to each network domain, ensuring that the QoS parameter obtained by each network domain is a QoS parameter of the corresponding network domain. Compared with an existing mechanism in which each network domain can be scheduled based on only an end-to-end indicator, in this embodiment of this application, a communications apparatus in each network domain can perform precise scheduling based on the QoS parameter of the corresponding network domain, improving user experience. In addition, deterministic transmission can be ensured, and resource utilization can be improved.

In some implementations, when the first network domain includes the RAN or the UPF network element, the transceiver module 901 is configured to send a transmit frequency and a size of a data packet to the first network domain, and receive the capability information of the first network domain from the first network domain, where the capability information of the first network domain is associated with the transmit frequency and the size of the data packet.

In some implementations, when the first network domain includes the RAN or the UPF network element, the first information includes a correspondence between a flow identifier and the second QoS parameter, and the flow identifier is used to identify a QoS flow between the terminal device and the UPF network element.

In some implementations, when the first network domain includes the backhaul network, the transceiver module 901 is configured to receive, from a network management network element, capability information of the backhaul network, or obtain, from a data management network element, capability information of the backhaul network.

In some implementations, the capability information of the backhaul network includes a stream identifier of a service flow in the backhaul network, a quantity of available service flows, and a QoS parameter of the service flow.

In some implementations, the first information includes a correspondence between a flow identifier and a stream identifier, the flow identifier is used to identify a QoS flow between the terminal and the UPF network element, and the stream identifier is used to identify a stream that is in the backhaul network and that satisfies the second QoS parameter.

In some implementations, the processing module 902 is further configured to obtain subscription data of the terminal device using the transceiver module 901, and when the subscription data includes second information used to indicate that a service of the terminal device includes a deterministic service, determine the second QoS parameter of the first network domain based on the capability information of the first network domain and the first QoS parameter.

In some implementations, the processing module 902 is configured to determine the second QoS parameter for the first network domain based on the capability information of the first network domain, the first QoS parameter, and a priority of the first network domain.

In addition, the transceiver module 901 and the processing module 902 in the control plane network element 90 may further perform another step performed by the deterministic coordinator or the control plane network element in any one of the embodiments of FIG. 3A to FIG. 8. Details are not described herein again.

Figure 10:
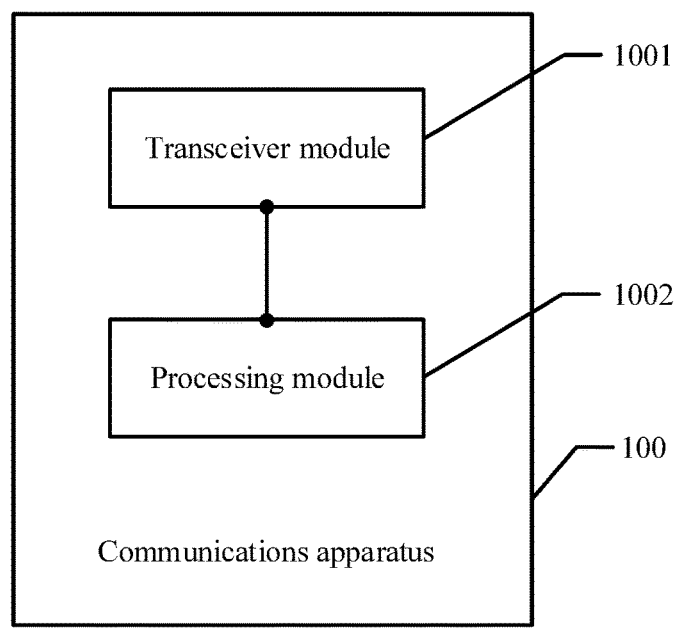
FIG. 10 is a schematic structural diagram of a communications apparatus according to an embodiment of this application.

Referring to a communications apparatus shown in FIG. 10, the communications apparatus can process a QoS parameter, and the communications apparatus 100 can implement a QoS parameter processing step that is performed by the communications apparatus of the first network domain in the embodiment corresponding to any one of FIG. 4 to FIG. 8. A function implemented by the communications apparatus 100 may be implemented by hardware, or may be implemented by hardware by executing corresponding software. The hardware or software includes one or more modules corresponding to the function. The module may be software and/or hardware. The communications apparatus 100 may be a UPF network element, or may be an access network device in a RAN domain. This is not limited. The communications apparatus 100 may include a transceiver module 1001 and a processing module 1002. The processing module 1002 may be configured to control receiving and sending operations of the transceiver module 1001. For function implementation of the transceiver module 1001, refer to operations of sending the QoS parameter of the first network domain, the capability information of the first network domain, and the transmit frequency and the size of the data packet to the control plane network element or the session management function network element by the communications apparatus in the embodiment corresponding to any one of FIG. 4 to FIG. 8. Details are not described herein again.

In some implementations, the transceiver module 1001 is configured to send capability information of the first network domain to a control plane network element, where the capability information of the first network domain is used to determine a QoS parameter of the first network domain, and the first network domain includes a RAN or a UPF network element, and receive, from the control plane network element, first information of the QoS parameter of the first network domain.

In this embodiment of this application, the processing module 1002 in the communications apparatus 100 in the first network domain provides the capability information of the first network domain for the control plane network element such that the control plane network element can accurately determine the QoS parameter of the first network domain, and the communications apparatus of the first network domain obtains, from the control plane network element, the QoS parameter of the first network domain. Therefore, a communications apparatus in a network domain can perform precise scheduling based on a QoS parameter of this network domain, improving user experience. In addition, deterministic transmission can be ensured, and resource utilization can be improved.

In some implementations, the first information includes a correspondence between a flow identifier and the QoS parameter, and the flow identifier is used to identify a QoS flow between the terminal device and the UPF network element.

In some implementations, when the first network domain includes the RAN, the communications apparatus is a first access network device in the RAN, and the transceiver module 1001 is further configured to perform at least one of the following operations receiving a downlink data packet from the UPF network element, where the downlink data packet includes a first flow identifier, and sending the downlink data packet to the terminal device based on a QoS parameter that is in the first information and that corresponds to the first flow identifier, or receiving an uplink data packet from the terminal device, where the uplink data packet includes a second flow identifier, and sending, through a backhaul network, the uplink data packet to the UPF network element based on a QoS parameter that is in the first information and that corresponds to the second flow identifier.

In some implementations, the transceiver module 1001 is configured to receive, from the control plane network element, a correspondence between the second flow identifier and a stream identifier of a first stream, and send the uplink data packet to the UPF network element based on the correspondence between the second flow identifier and the stream identifier of the first stream using the first stream in the backhaul network.

In some implementations, when the first network domain includes the UPF network element, the communications apparatus is the UPF network element, and the transceiver module 1001 is further configured to perform at least one of the following operations receiving a downlink data packet from an application server, where the downlink data packet includes a first flow identifier, and sending, through the backhaul network, the downlink data packet to the first access network device based on a QoS parameter that is in the first information and that corresponds to the first flow identifier, or receiving an uplink data packet from an access network device, where the uplink data packet includes a second flow identifier, and sending the uplink data packet to an application server based on a QoS parameter that is in the first information and that corresponds to the second flow identifier.

In some implementations, the transceiver module 1001 is configured to receive, from the control plane network element, a correspondence between the first flow identifier and a stream identifier of a second stream, and send the downlink data packet to the first access network device based on the correspondence between the first flow identifier and the stream identifier of the second stream using the second stream in the backhaul network.

In addition, the transceiver module 1001 and the processing module 1002 in the communications apparatus 10 may further perform another step performed by the communications apparatus (for example, a communications apparatus in the UPF network element, the first access network device, the second access network device, or the backhaul network) of the first network domain in any one of the embodiments of FIG. 3A to FIG. 8. Details are not described herein again.

Figure 11:
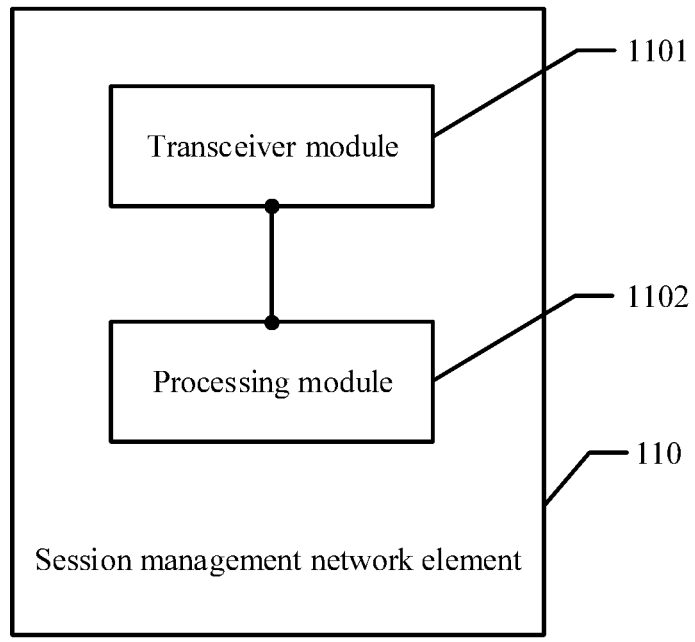
FIG. 11 is a schematic structural diagram of a session management function network element according to an embodiment of this application.

Referring to a session management function network element 110 shown in FIG. 11, the session management function network element 110 may be configured to process a QoS parameter. The session management function network element 110 can implement a QoS parameter processing step performed by the session management function network element in the embodiment corresponding to any one of FIG. 4 to FIG. 8. A function implemented by the session management function network element 110 may be implemented by hardware, or may be implemented by hardware by executing corresponding software. The hardware or software includes one or more modules corresponding to the function. The module may be software and/or hardware. A control plane network element may be deployed in the session management function network element 110, to implement all functions that are the same as or similar to those of the control plane network element 90. This is not limited. The session management function network element 110 may include a transceiver module 1101 and a processing module 1102. For function implementation of the processing module 1102, refer to operations of determining whether the subscription data includes the second information that indicates the deterministic service, determining whether the second access network device satisfies the requirement of the deterministic service of the terminal device, and dynamically adjusting the QoS parameter of the first network domain by the session management function network element 110 in the embodiment corresponding to any one of FIG. 4 to FIG. 8. Details are not described herein. For function implementation of the transceiver module 1101, refer to operations of obtaining the subscription data of the terminal device, obtaining the capability information of the first network domain, and delivering the first information of the QoS parameter of the first network domain in the embodiment corresponding to any one of FIG. 4 to FIG. 8.

In some implementations, the transceiver module 1101 may be configured to obtain the subscription data of the terminal device from a data management network element, and the processing module 1102 may be configured to, when the subscription data includes information used to indicate that a service of the terminal device includes a deterministic service, send a request message to the control plane network element using the transceiver module 1101, where the request message is used to request to determine the QoS parameter of the first network domain, and the first network domain includes at least one of a RAN, a backhaul network, and a UPF network element.

In some implementations, the transceiver module 1101 is further configured to obtain capability information of the backhaul network from the data management network element, or receive capability information of the backhaul network from a network management network element.

In this embodiment of this application, the processing module 1102 in the session management function network element 110 obtains the subscription data from the data management network element, determines, based on the subscription data, whether the terminal device has the deterministic service, and then determines whether to send, to the control plane network element, the request message for determining the QoS parameter of the first network domain. In this way, work load of the control plane network element can be reduced, and a work division mechanism can also be optimized.

In addition, the transceiver module 1101 and the processing module 1102 in the session management function network element 110 may further perform another step performed by the control plane network element in any one of the embodiments of FIG. 3A to FIG. 8. Details are not described herein again.

Figure 12:
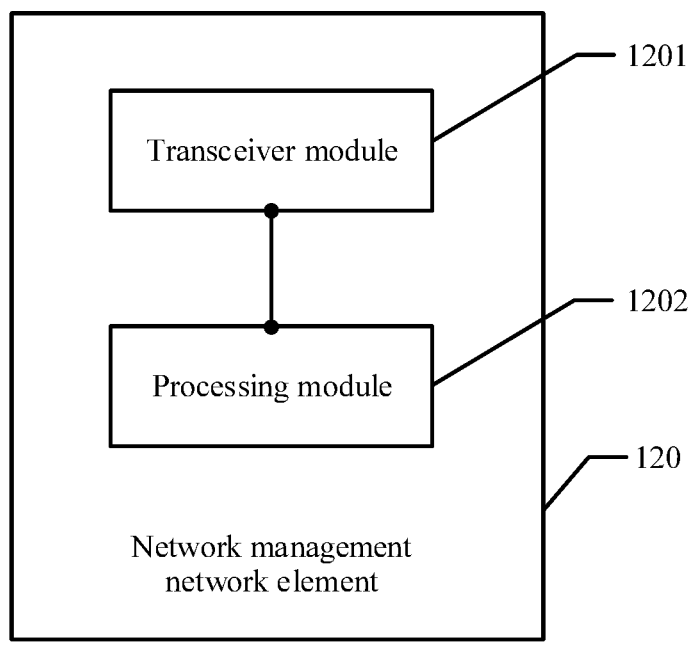
FIG. 12 is a schematic structural diagram of a network management network element according to an embodiment of this application.

Referring to a network management network element 120 shown in FIG. 12, the network management network element 120 can implement a network management step performed by the network management network element in the embodiment corresponding to FIG. 2. A function implemented by the network management network element 120 may be implemented by hardware, or may be implemented by hardware by executing corresponding software. The hardware or software includes one or more modules corresponding to the function. The module may be software and/or hardware. The network management network element 120 may be the network management network element 5 in FIG. 1C, and is configured to manage a backhaul network. The network management network element 120 may include a transceiver module 1201 and a processing module 1202. The processing module 1202 may be configured to control receiving and sending operations of the transceiver module 1201. For function implementation of the transceiver module 1201, refer to operations of sending the configuration request to the backhaul network configuration network element and sending the capability information of the backhaul network to the data management network element by the network management network element in the embodiment corresponding to FIG. 2. Details are not described herein.

The transceiver module 1201 is configured to send the configuration request to the backhaul network configuration network element, where the configuration request is used to request to configure the capability information of the backhaul network, and receive the capability information of the backhaul network from the backhaul network configuration network element, and send the capability information of the backhaul network to the data management network element.

In this embodiment of this application, interaction between a network configuration network element 130 in FIG. 13 and the data management network element ensure that the capability information of the backhaul network can be transmitted to the data management network element, and subsequently the control plane network element uses the capability information of the backhaul network as a basis for determining a QoS parameter of each network domain.

In addition, the transceiver module 1201 and the processing module 1202 in the network management network element 120 may further perform another step performed by the network management network element in the embodiment corresponding to FIG. 2. Details are not described herein again.

Figure 13:
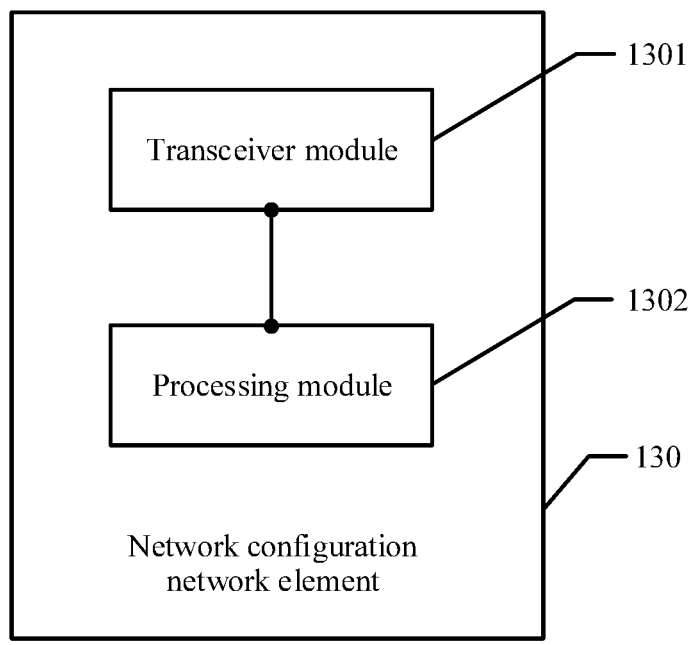
FIG. 13 is a schematic structural diagram of a network configuration network element according to an embodiment of this application.
Figure 14:
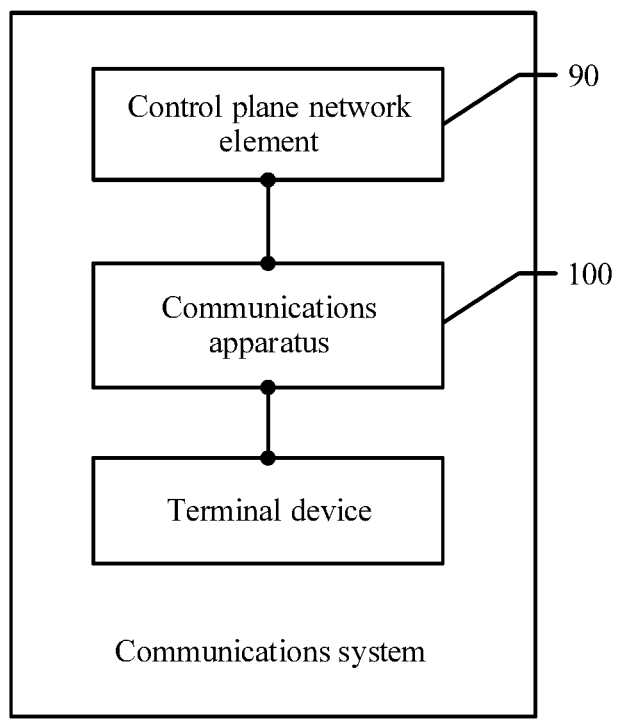
FIG. 14 is a schematic structural diagram of a communications system according to an embodiment of this application.

Referring to a network configuration network element shown in FIG. 13, the network configuration network element 130 can implement a network management step performed by the backhaul network configuration network element in the embodiment corresponding to FIG. 2. A function implemented by the network configuration network element 130 may be implemented by hardware, or may be implemented by hardware by executing corresponding software. The hardware or software includes one or more modules corresponding to the function. The module may be software and/or hardware. The network configuration network element 130 may be the backhaul network configuration network element 6 in FIG. 1C, and is configured to configure the backhaul network. The network management network element 130 may include a transceiver module 1301 and a processing module 1302. The processing module 1302 may be configured to control receiving and sending operations of the transceiver module 1301. For function implementation of the transceiver module, refer to operations of configuring the backhaul network and the capability information of the backhaul network, and sending the capability information of the backhaul network to the network management network element by the backhaul network configuration network element in the embodiment corresponding to FIG. 2. Details are not described herein.

In some implementations, the transceiver module 1301 may be configured to receive a configuration request from the network management network element, and the processing module 1302 may be configured to configure the capability information of the backhaul network based on the configuration request, and send the capability information of the backhaul network to the network management network element using the transceiver module 1301.

In some implementations, the configuration request may include an expected value of a QoS parameter of a first network domain, an IP address of an access network device, and an IP address of a UPF network element.

In this embodiment of this application, after the transceiver module 1301 receives the configuration request from the network management network element, the processing module of the network configuration network element 130 interacts with the network management network element such that the capability information of the backhaul network can be transmitted to the network management network element, and subsequently the control plane network element uses the capability information, of the backhaul network, obtained from the data management network element as a basis for determining the QoS parameter of each network domain.

In addition, the transceiver module 1301 and the processing module 1302 in the network configuration network element 130 may further perform another step performed by the backhaul network configuration network element in the embodiment corresponding to FIG. 2. Details are not described herein again.

Figure 15:
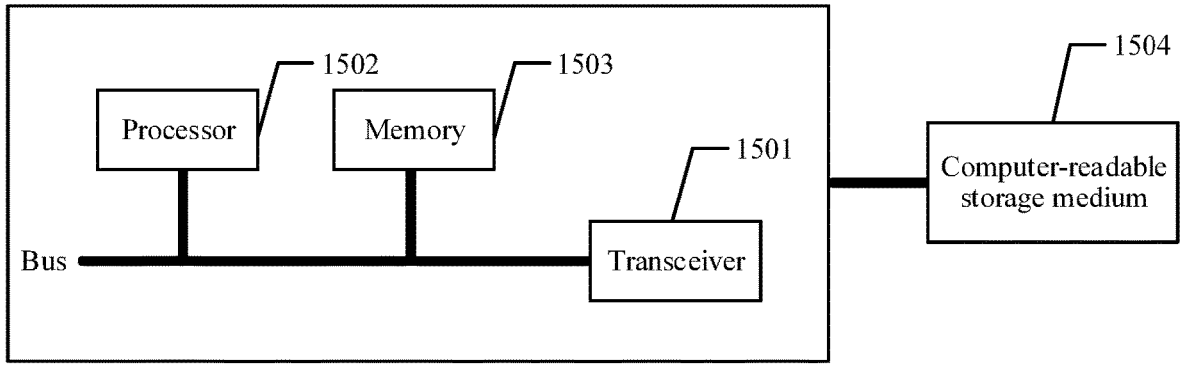
FIG. 15 is a schematic structural diagram of a physical device that performs a QoS parameter processing method or a network management method according to an embodiment of this application.

Referring to a communications system shown in FIG. 15, the communications system may include a terminal device, the control plane network element 90 shown in FIG. 9, and the communications apparatus 100 shown in FIG. 10 in each network domain.

For example, the communications apparatus 100 may be configured to provide the control plane network element 90 with capability information of a first network domain.

The control plane network element 90 is configured to obtain a first QoS parameter between the terminal device and a UPF network element, obtain capability information of each network domain, determine a second QoS parameter of each network domain based on the capability information of each network domain and the first QoS parameter, and send first information of the second QoS parameter to each network domain using the transceiver module. Network domains may include a RAN, a backhaul network, and the UPF network element.

In some implementations, the communications system may further include the network management network element 120 shown in FIG. 12, the network configuration network element 130 shown in FIG. 13, and the data management network element. The data management network element is configured to store the capability information, of the backhaul network, from the network configuration network element 130 shown in FIG. 13.

In some implementations, the communications system may further include the session management function network element 110 shown in FIG. 11.

In the embodiments of this application (including the embodiments shown in FIG. 9 to FIG. 13), entity devices corresponding to the transceiver modules (for example, the transceiver module 901, the transceiver module 1001, the transceiver module 1101, the transceiver module 1201, and the transceiver module 1301) may be the transceiver 1501, and entity devices corresponding to the processing modules (for example, the processing module 902, the processing module 1002, the processing module 1102, the processing module 1202, and the processing module 1302) may be the processor 1502. The apparatuses shown in FIG. 9 to FIG. 13 may each have the structure shown in FIG. 15. When one of the apparatuses has the structure shown in FIG. 15, the processor 1501 and the transceiver 1502 in FIG. 15 implement functions that are the same as or similar to those of the processing module (for example, the processing module 902, the processing module 1002, the processing module 1102, the processing module 1202, or the processing module 1302) and the transceiver module (for example, the transceiver module 901, the transceiver module 1001, the transceiver module 1101, the transceiver module 1201, or the transceiver module 1301) that are provided in the foregoing apparatus embodiment corresponding to the apparatus.

For example, when the control plane network element has the structure shown in FIG. 15, the memory 1503 in FIG. 15 stores program code that needs to be invoked when the processor 1502 performs the foregoing QoS parameter processing method performed by the control plane network element. Alternatively, a computer-readable storage medium 1504 stores program code that needs to be invoked when the control plane network element performs the foregoing QoS parameter processing method. The processor 1502 in FIG. 15 can invoke the program code in the memory 1503 or the computer-readable storage medium 1504 to perform the following operations obtaining a first QoS parameter between a terminal device and a UPF network element using the transceiver 1501, and obtaining capability information of a first network domain, determining a second QoS parameter of the first network domain based on the capability information of the first network domain and the first QoS parameter that are obtained by the transceiver 1501, where the first network domain includes at least one of a RAN, a backhaul network, and the UPF network element, and sending first information of the second QoS parameter to the first network domain using the transceiver 1501.

For another example, when the communications apparatus of the first network domain has the structure shown in FIG. 15, the memory in FIG. 15 stores program code that needs to be invoked when the processor performs the foregoing QoS parameter processing method performed by the communications apparatus of the first network domain in the embodiment corresponding to any one of FIG. 4 to FIG. 8. Further, the processor 1502 in FIG. 15 can invoke the program code in the memory 1503 or the computer-readable storage medium 1504 to perform the following operations sending capability information of the first network domain to a control plane network element using the transceiver 1501, where the capability information of the first network domain is used to determine a QoS parameter of the first network domain, and the first network domain includes a RAN or a UPF network element, and receiving, from the control plane network element, first information of the QoS parameter of the first network domain using the transceiver 1501.

For another example, when the communications apparatus of the first network domain has the structure shown in FIG. 15, the memory in FIG. 15 stores program code that needs to be invoked when the processor performs the foregoing QoS parameter processing method performed by the session management function network element in the embodiment corresponding to any one of FIG. 4 to FIG. 8. Further, the processor 1502 in FIG. 15 can invoke the program code in the memory 1503 or the computer-readable storage medium 1504 to perform the following operations obtaining subscription data of a terminal device from a data management network element using the transceiver 1501, and when the subscription data includes information used to indicate that a service of the terminal device includes a deterministic service, sending a request message to a control plane network element using the transceiver 1501, where the request message is used to request to determine a QoS parameter of the first network domain, and the first network domain includes at least one of a RAN, a backhaul network, and a UPF network element.

Other cases are similar, and details are not described.

In addition, an embodiment of this application further discloses another method for dividing a QoS parameter an end-to-end QoS parameter) between a terminal device and a UPF network element by a control plane network element. The QoS parameter between the terminal device and the UPF network element is divided into a QoS parameter between the terminal device and an access network device and a QoS parameter between the access network device and the UPF network element. An example in which the QoS parameter is a packet delay budget (PDB) is used. In a current QoS model, the PDB is an upper limit of a delay for transmission of a data packet between the terminal device and the UPF network element (a UPF terminating an N6 interface). For example, for a QoS flow, a value of a PDB between UE and a UPF is 5 ms. According to the method in this embodiment of this application, after the PDB value is divided, a PDB between an AN and the UPF is 2 ms, and a PDB between the UE and the AN is 3 ms such that the AN can schedule an air interface resource based on a requirement for a 3 ms PDB. In this way, a URLLC service latency requirement is ensured, and utilization of an air interface resource can also be optimized. Detailed descriptions are provided below.

Figure 16A:
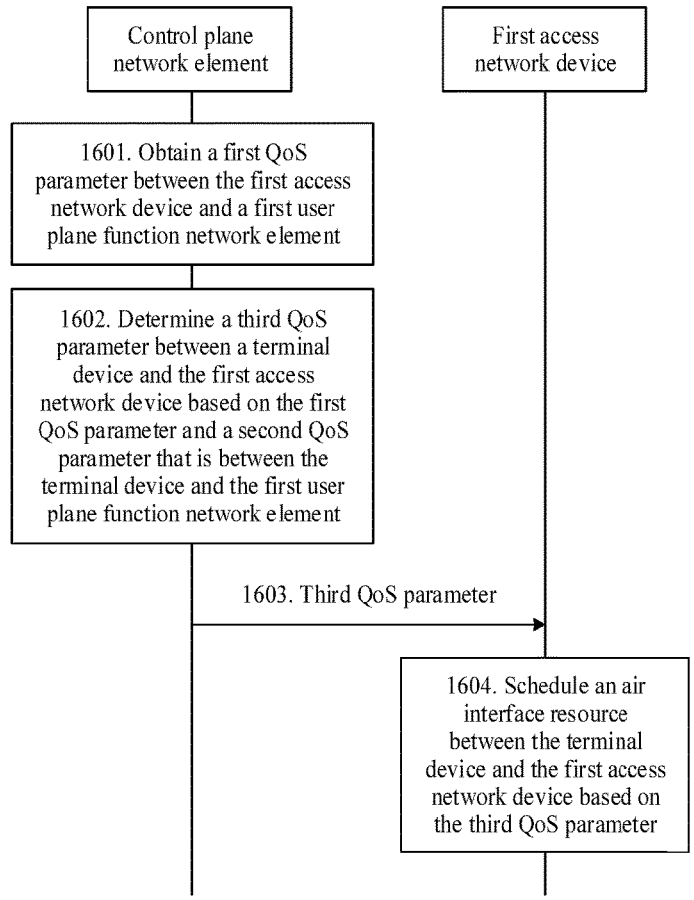
FIG. 16A is a schematic flowchart of a QoS parameter processing method according to an embodiment of this application.

FIG. 16A is a schematic flowchart of a QoS parameter processing method according to an embodiment of this application. As shown in FIG. 16A, this method includes the following steps.

Step 1601: A control plane network element obtains a first QoS parameter between a first access network device and a first UPF network element.

For example, the control plane network element may be the foregoing session management function SMF network element 7 in FIG. 1C. The first access network device may be the access network device 1 in FIG. 1C. The first UPF network element may be the UPF network element 2 in FIG. 1C.

The first QoS parameter between the first access network device and the first UPF network element may also be referred to as a QoS parameter of a core network (CN). For example, the first QoS parameter includes a PDB between the first access network device and the UPF network element, for example, a CN PDB.

The control plane network element may obtain the first QoS parameter between the first access network device and the first UPF network element in any one of the following manners.

Manner 1: The control plane network element obtains the first QoS parameter from the first UPF network element.

For example, the control plane network element sends identifier information of the first access network device to the first UPF network element, and receives the first QoS parameter from the first UPF network element. Optionally, the control plane network element further sends flow information that identifies a first flow to the first UPF network element such that the first QoS parameter indicates a QoS parameter that is between the first access network device and the first UPF network element and that corresponds to the first flow. How the control plane network element obtains the first QoS parameter from the first UPF network element is further described with reference to FIG. 17.

Manner 2: The control plane network element obtains the first QoS parameter from a network element discovery function device.

The network element discovery function device may be a network repository function (NRF) network element. The NRF network element may provide functions such as network function instance registration and discovery.

For example, in a possible implementation, the control plane network element sends identifier information of the first access network device and identifier information of the first UPF network element to the NRF network element, and receives the first QoS parameter from the NRF network element.

In another possible implementation, the control plane network element sends identifier information of the first access network device and service area information of the control plane network element to the NRF network element, and receives, from the NRF network element, identifier information of at least one UPF network element located in an area indicated by the service area information, and a QoS parameter between the first access network device and each of the at least one UPF network element, and the control plane network element determines the first QoS parameter according to the received QoS parameter.

In another possible implementation, the control plane network element sends service area information of the control plane network element to the NRF network element, and receives, from the NRF network element, identifier information of at least one UPF network element located in an area indicated by the service area information, identifier information of an access network device that communicates with each of the at least one UPF network element, and a QoS parameter between each of the at least one UPF network element and the access network device, and the control plane network element determines the first QoS parameter according to the received QoS parameter based on identifier information of the first access network device.

How the control plane network element obtains the first QoS parameter from the network element discovery function device is further described with reference to FIG. 18A and FIG. 18B.

Manner 3: The control plane network element obtains the first QoS parameter from a network management system.

For example, when the control plane network element is powered on, the control plane network element obtains the first QoS parameter from the network management system. For example, when the control plane network element is powered on, the network management system configures the first QoS parameter for the control plane network element. Alternatively, after the control plane network element is powered on, the control plane network element may actively send a request to the network management system, to request to obtain a QoS parameter between each of at least one UPF network element in a service area of the control plane network element and an access network device. The control plane network element determines the first QoS parameter according to the received the QoS parameter based on identifier information of the first access network device.

How the control plane network element obtains the first QoS parameter from the network management system is further described with reference to FIG. 19.

Manner 4: The control plane network element obtains the first QoS parameter from a network data analytics function device.

A network data analytics function device (NWDAF) network element may provide a data analysis result related to a network and a user.

For example, the NWDAF network element may obtain information about a transmission latency between the first access network device and the user plane network element from a collected QoS monitoring result, generate the first QoS parameter after performing a statistical analysis, and provide the first QoS parameter for the control plane network element.

Step 1602: The control plane network element determines a third QoS parameter between the terminal device and the first access network device based on the first QoS parameter and a second QoS parameter that is between a terminal device and the first UPF network element.

The second QoS parameter may also be referred to as an end-to-end QoS parameter between the terminal device and the UPF network element. The second QoS parameter may include an end-to-end PDB between the terminal device and the UPF network element. The third QoS parameter may also be referred to as a QoS parameter of an AN. The third QoS parameter may include a PDB between the terminal device and the first access network device, for example, an AN PDB.

For example, the control plane network element subtracts the first QoS parameter from the second QoS parameter, to obtain the third QoS parameter.

Step 1603: The control plane network element sends the third QoS parameter to the first access network device. Correspondingly, the first access network device receives the third QoS parameter from the control plane network element.

For example, the control plane network element may send the third QoS parameter to the first access network device using N2 session management information (N2 SM info).

Step 1604: The first access network device schedules an air interface resource between the terminal device and the first access network device based on the third QoS parameter.

Therefore, compared with that, in the other approaches, the first access network device performs air interface resource scheduling based on an end-to-end QoS parameter between UE and a UPF, in the method according to this embodiment of this application, the first access network device may perform air interface resource scheduling based on a more precise QoS parameter, namely, a QoS parameter between the UE and an AN, optimizing usage of an air interface resource.

Figure 16B:
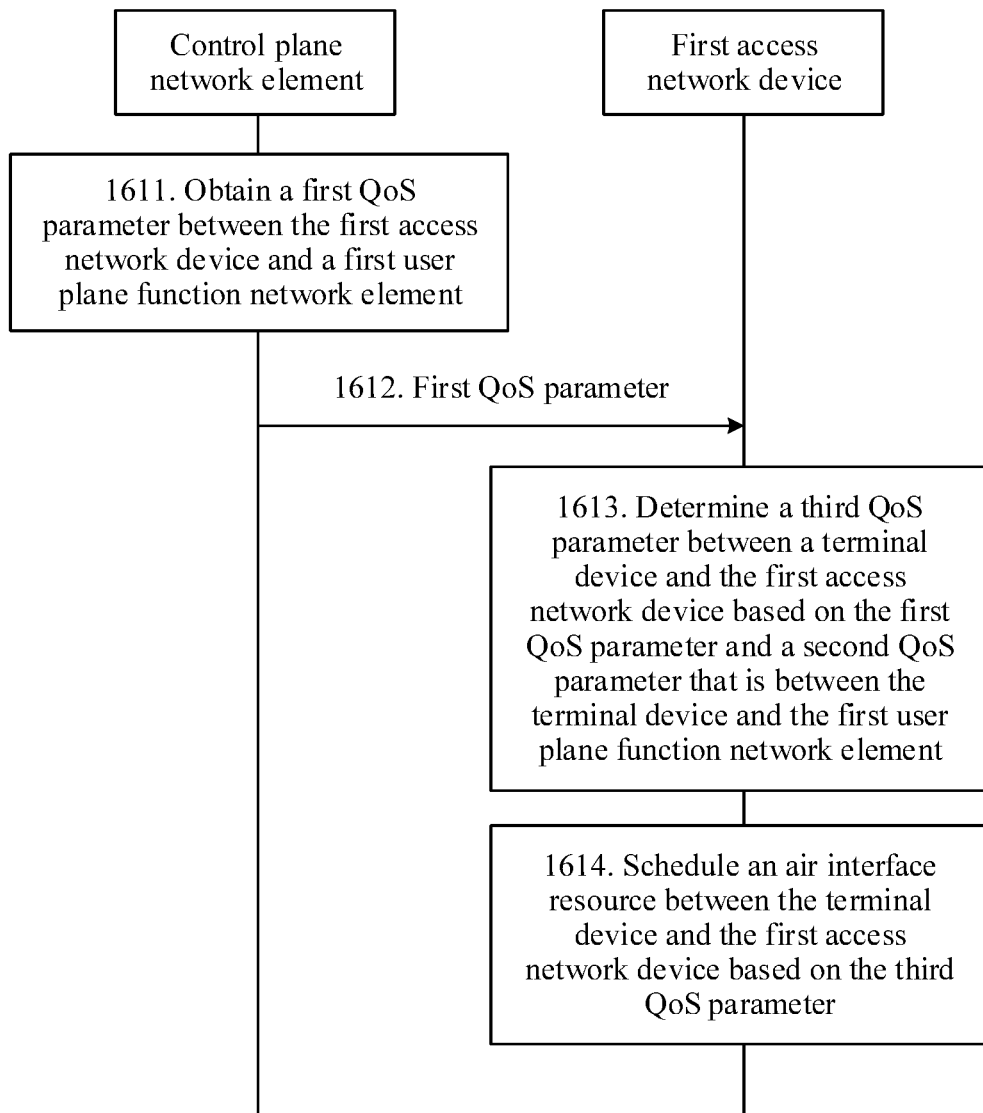
FIG. 16B is a schematic flowchart of another QoS parameter processing method according to an embodiment of this application.

FIG. 16B is a schematic flowchart of a QoS parameter processing method according to an embodiment of this application. A difference between FIG. 16B and FIG. 16A lies in that, in the method shown in FIG. 16A, the control plane network element determines the QoS parameter between the UE and the AN. However, in the method shown in FIG. 16B, a first access network device determines a QoS parameter between UE and an AN. As shown in FIG. 16B, this method includes the following steps.

Step 1611: A control plane network element obtains a first QoS parameter between the first access network device and a first UPF network element.

For step 1611, refer to the description of step 1601. Details are not described herein again.

Step 1612: The control plane network element sends the first QoS parameter to the first access network device, where the first QoS parameter is used to determine a QoS parameter between a terminal device and the first access network device. Correspondingly, the first access network device receives the first QoS parameter from the control plane network element.

Similarly, the control plane network element may send the first QoS parameter to the first access network device using N2 SM info.

Step 1613: The first access network device determines a third QoS parameter between the terminal device and the first access network device based on the first QoS parameter and a second QoS parameter that is between the terminal device and the first UPF network element.

For example, the first access network device subtracts the first QoS parameter from the second QoS parameter, to obtain the third QoS parameter.

Step 1604: The first access network device schedules an air interface resource between the terminal device and the first access network device based on the third QoS parameter.

Similarly, compared with that, in the other approaches, the first access network device performs air interface resource scheduling based on an end-to-end QoS parameter between UE and a UPF, in the method according to this embodiment of this application, the first access network device may perform air interface resource scheduling based on a more precise QoS parameter, namely, a QoS parameter between the UE and an AN, optimizing usage of an air interface resource.

In examples in FIG. 17 to FIG. 23, descriptions are provided using an example in which a QoS parameter is a PDB. That is, the first QoS parameter is a CN PDB, the second QoS parameter is an end-to-end PDB, and the third QoS parameter is an AN PDB.

Figure 17:
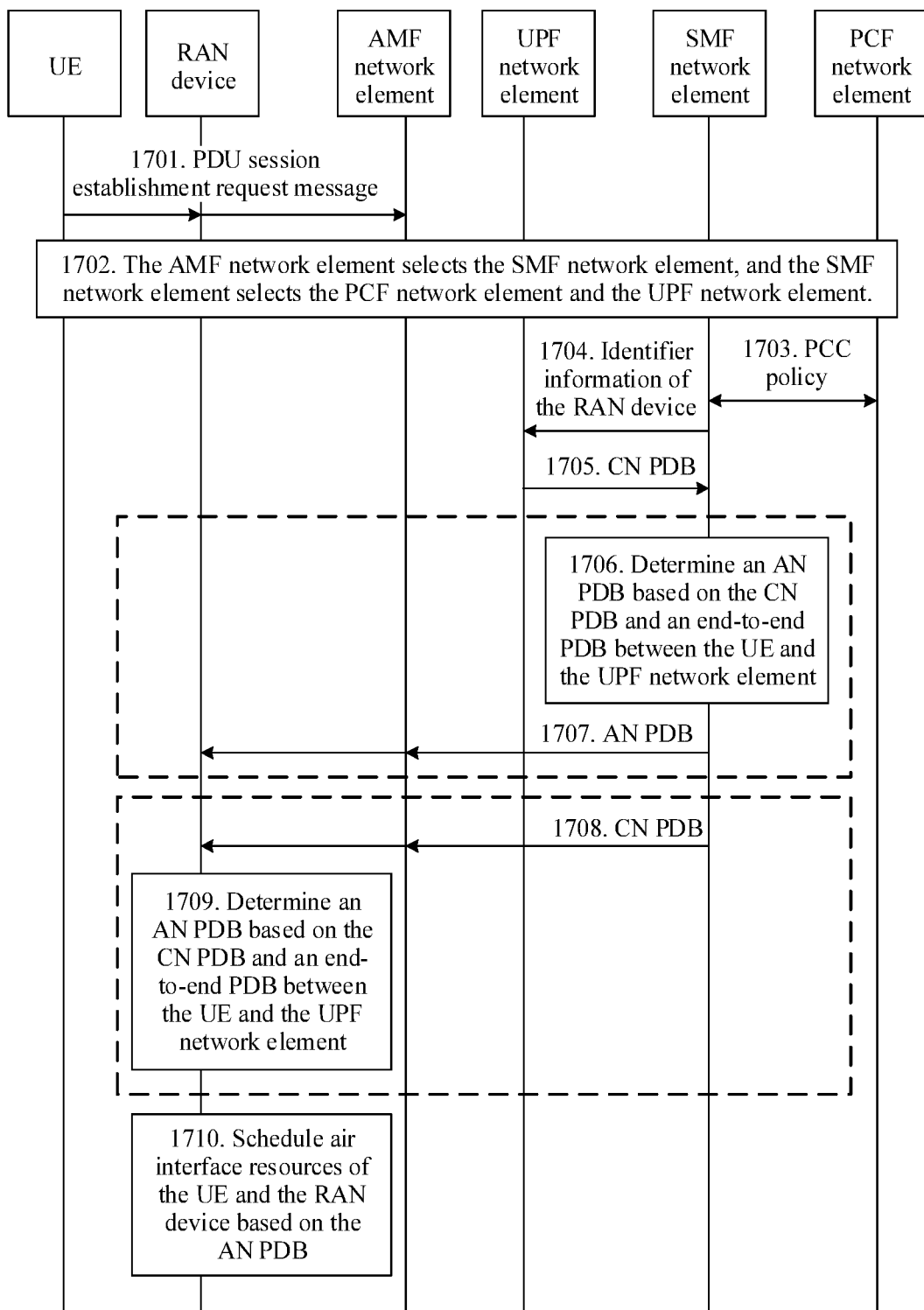
FIG. 17 is a signaling interaction diagram of processing a QoS parameter according to an embodiment of this application.

FIG. 17 is a signaling interaction diagram of processing a QoS parameter according to an embodiment of this application. As shown in FIG. 17, this method includes the following steps.

Step 1701: UE initiates a PDU session establishment procedure. The UE sends a PDU session establishment request message to an access and mobility management function (AMF) network element.

The PDU session establishment request message includes at least a PDU session identifier (ID).

Step 1702: The AMF network element selects an SMF network element, and the SMF network element selects a PCF network element and a UPF network element.

Optionally, the SMF network element obtains subscription data of the UE from a UDM network element.

Step 1703: The SMF network element obtains a policy and charging control (PCC) policy from the PCF network element by interacting with the PCF network element. The PCC policy includes a 5G QoS indicator (5QI), or the SMF may generate a 5G QoS indicator based on the PCC policy.

Step 1704: The SMF network element initiates an N4 session establishment process.

For example, the SMF network element sends an N4 session establishment request message to the UPF network element. The N4 session establishment request message includes identifier information of a RAN device, to request the UPF network element to return a CN PDB between the RAN device and the UPF network element. For example, the identifier information of the RAN device includes an IP address of the RAN device. Optionally, the N4 session establishment request message further includes indication information, and the indication information indicates the UPF network element to return the CN PDB between the RAN device and the UPF network element.

Optionally, the N4 session establishment request message further includes flow information that identifies a first flow. For example, the first flow is a QoS flow, and the flow information that identifies the first flow is a 5QI or a QFI. In this way, using the N4 session establishment request message, the SMF network element requests the UPF network element to return a CN PDB that is between the RAN device and the UPF network element and that corresponds to the first flow.

Optionally, before the SMF network element sends the N4 session establishment request message to the UPF network element, the SMF network element first searches the SMF network for the CN PDB between the RAN device and the UPF network element or the CN PDB that is between the RAN device and the UPF network element and that corresponds to the first flow. The SMF network element sends the N4 session establishment request message including identifier information of a RAN network element to the UPF network element only if the CN PDB does not exist in the SMF network element. If the SMF network element stores the CN PDB, the SMF may directly determine the CN PDB between the RAN device and the UPF network element or the CN PDB that is between the RAN device and the UPF network element and that corresponds to the first flow. The N4 session establishment request message may not carry the identifier information of the RAN device, or steps 1704 and 1705 may be skipped.

Step 1705: After receiving the N4 session establishment request message, the UPF network element returns the CN PDB to the SMF network element using an N4 session establishment response message. Optionally, if the N4 session establishment request message further includes the flow information that identifies the first flow, the returned CN PDB is the CN PDB that is between the RAN device and the UPF network element and that corresponds to the first flow.

For example, a CN PDB between the UPF and each RAN device is pre-configured in the UPF. For example, the network management system may obtain topology information (for example, a transmission distance) between the RAN and the UPF, generate the CN PDN between the RAN device and the UPF network element based on the topology information, and configure the CN PDN for each UPF network element in a power-on phase. Alternatively, the UPF network element may obtain a CN PDB in a QoS monitoring result through QoS monitoring.

After receiving the N4 session establishment request message, the UPF network element determines the CN PDB between the UPF network element and the RAN device based on the identifier information of the RAN device, and sends the CN PDB to the SMF network element.

Optionally, after receiving the CN PDB, the SMF network element may store the received CN PDB. In this way, for different QoS flows that subsequently come from a same RAN device, if the SMF network element selects a same UPF network element, the SMF network element may directly reuse the stored CN PDB without requesting the UPF network element.

After receiving the CN PDB, the SMF network element may perform steps in any one of the following implementations: a first implementation corresponding to steps 1706 and 1707, and a second implementation corresponding to steps 1708 and 1709.

In the first implementation:

Step 1706: The SMF network element determines an AN PDB based on the CN PDB and an end-to-end PDB between the UE and the UPF network element.

For example, the SMF network element obtains the end-to-end PDB between the UE and the UPF network element according to the 5QI. If the 5QI is a standard value, the SMF network element may obtain the PDB between the UE and the UPF network element according to the 5QI. If the 5QI is not a standard value, the SMF network element may obtain the PDB between the UE and the UPF network element from a QoS profile corresponding to the QFI. Then, the SMF network element subtracts the CN PDB from the end-to-end PDB between the UE and the UPF network element, to obtain the AN PDB.

It should be noted that the CN PDB is a PDB between the RAN network element and the UPF network element, and usually may be unrelated to the 5QI. That is, for different 5QIs, there is no difference between CN PDBs. However, because there is a reserved bit in a protocol, the UPF network element may alternatively set a differentiated services code point (DSCP) in an outer IP header of a data packet according to the 5QI, to perform differentiated transmission. This causes a difference between CN PDBs. Therefore, in the present disclosure, a CN PDB may be different based on a different 5QI or QFI, to be specific, in step 1704, the SMF network element requests the UPF network element to return the CN PDB that is between the RAN device and the UPF network element and that corresponds to the first flow.

However, regardless of whether the CN PDB is related to the flow information, the determined AN PDB is associated with (or has a binding relationship to) the 5QI (or the QFI), and different 5QIs (or QFIs) correspond to different AN PDBs.

Step 1707: The SMF network element sends the AN PDB to the RAN device.

For example, the SMF network element sends a PDU session ID and N2 SM information to the AMF network element by invoking a communications service Namf_Communication_N1N2MessageTransfer of the AMF network element or by invoking a session management context update service Nsmf_PDUSession_UpdateSMContext of the SMF network element. The N2 SM information includes the PDU session ID, a QFI, and the AN PDB. For example, the AN PDB is included in a QoS profile corresponding to the QFI. The AMF network element sends the received N2 SM information to the RAN device. Correspondingly, the RAN device receives the AN PDB included in the N2 SM information.

In a second implementation:

Step 1708: The SMF network element sends the CN PDB to the RAN device.

Similarly, the SMF network element sends a PDU session ID and N2 SM information to the AMF network element by invoking a communications service Namf_Communication_N1N2MessageTransfer of the AMF network element or by invoking a session management context update service Nsmf_PDUSession_UpdateSMContext of the SMF network element. The N2 SM information includes the PDU session ID and the CN PDB. For example, the CN PDB is included in a QoS profile corresponding to each QFI. The AMF network element sends the received N2 SM information to the RAN device. Correspondingly, the RAN device receives the CN PDB included in the N2 SM information.

It should be noted that the QoS profile itself includes the 5QI. Herein, if the CN PDB is on a device granularity, that is, the CN PDB is unrelated to the 5QI, the 5QI may not need to be associated when the CN PDB is sent. If the CN PDB is on a flow granularity, that is, the CN PDB is related to the 5QI, different 5QIs have different CN PDBs, and a 5QI needs to be provided at the same time when a CN PDB is provided. In this application, if the CN PDB is included in the QoS profile, because the QoS profile includes the 5QI, a relationship between the CN PDB and the 5QI does not need to be additionally bound. If the CN PDB is included in a part that is not the QoS profile in the N2 SM information, a 5QI associated with the CN PDB needs to be provided.

Step 1709: The RAN device determines an AN PDB based on the CN PDB and an end-to-end PDB between the UE and the UPF network element.

For example, the RAN device obtains the end-to-end PDB between the UE and the UPF network element according to the 5QI. If the 5QI is a standard value, the RAN device may obtain the PDB between the UE and the UPF network element according to the 5QI. If the 5QI is not a standard value, the RAN device may obtain the PDB between the UE and the UPF network element from a QoS profile that corresponds to the QFI and that is delivered by a core network. Then, the RAN device subtracts the CN PDB from the end-to-end PDB between the UE and the UPF network element, to obtain the AN PDB.

For any one of the foregoing implementations, after an AN obtains the AN PDB, step 1710 is performed.

Step 1710: The RAN device schedules an air interface resource of the UE and the RAN device based on the AN PDB.

As described above, because the AN PDB is associated with the 5QI (or the QFI), the RAN device schedules, based on the AN PDB associated with the 5QI (or the QFI), the air interface resource for a QoS flow corresponding to the 5QI (or the QFI).

After step 1710, remaining steps of the PDU session establishment procedure may continue to be performed, and include but are not limited to the following. The RAN device interacts with the UE to complete air interface configuration, and the RAN device interacts with the AMF network element, and the AMF network element interacts with the SMF network element to complete updating of a PDU session management context, and complete the session establishment procedure.

Figure 18A:
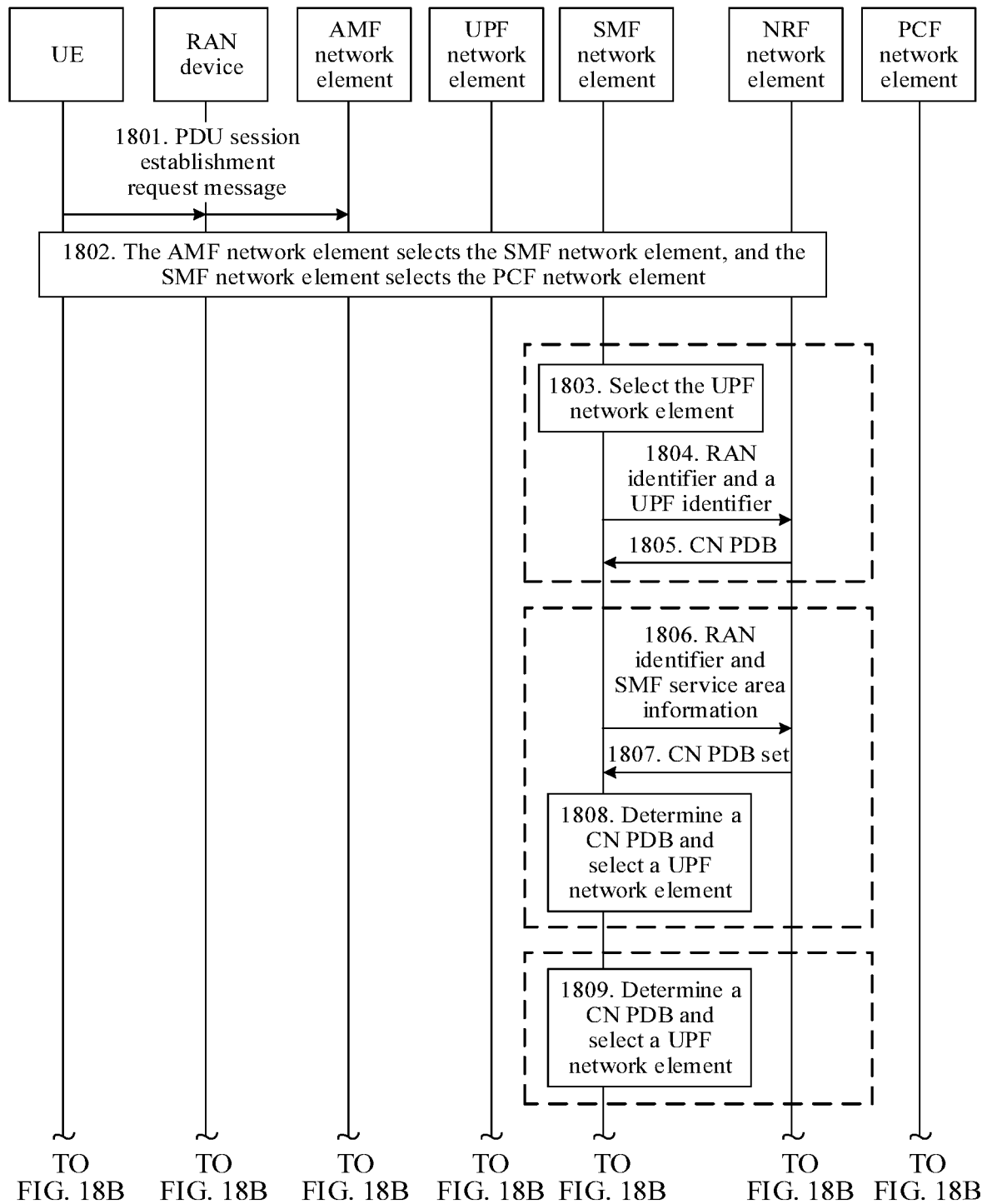
FIG. 18A and FIG. 18B are another signaling interaction diagram of processing a QoS parameter according to an embodiment of this application.
Figure 18B:
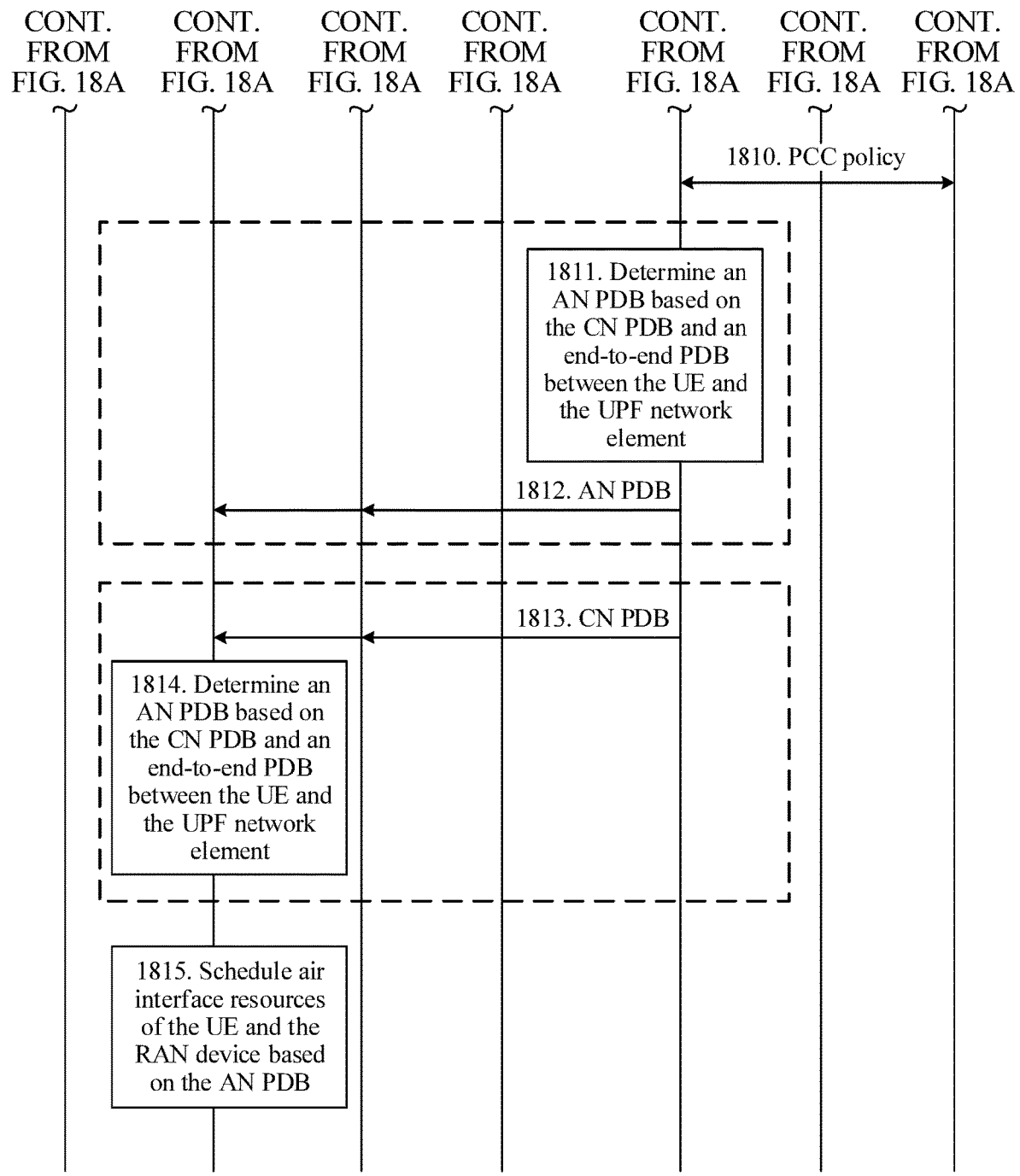

FIG. 18A and FIG. 18B are another signaling interaction diagram of processing a QoS parameter according to an embodiment of this application. FIG. 18A and FIG. 18B are described with reference to FIG. 17. As shown in FIG. 18A and FIG. 18B, this method includes the following steps.

Step 1801: UE initiates a PDU session establishment procedure. The UE sends a PDU session establishment request message to an AMF network element.

For example, the UE sends a non-access stratum (NAS) message to the AMF network element. The NAS message includes single-network slice selection assistance information (S-NSSAI) and the PDU session establishment request message. The PDU session establishment request message includes at least an ID of a PDU session.

Step 1802: The AMF network element selects an SMF network element, and the SMF network element selects a PCF network element.

Then, a step in any one of the following implementations may be performed a first implementation corresponding to steps 1803 to 1805, a second implementation corresponding to steps 1806 to 1808, and a third implementation corresponding to 1809.

In the first implementation:

Step 1803: The SMF network element selects a UPF network element.

Step 1804: The SMF network element sends identifier information of the UPF network element and identifier information of a RAN device to an NRF network element, to request the NRF network element to return a CN PDB between the RAN device and the UPF network element.

For example, the SMF network element may invoke a network function discovery (Nnrf_NFDiscovery) service of the NRF network element, to send a network function discovery request (Nnrf_NFDiscovery Request) message that includes the identifier information of the UPF network element and the identifier information of the RAN device to the NRF network element.

Optionally, the SMF network element may first determine, based on the S-NSSAI carried in step 1801, that the session corresponds to a URLLC service, and then request, from the NRF network element, the CN PDB between the RAN device and the UPF network element.

Step 1805: The NRF network element sends the CN PDB between the UPF network element and the RAN device to the SMF network element.

In a second implementation:

Step 1806: The SMF network element sends the identifier information of the RAN device and service area information of the SMF network element to the NRF network element, to request the NRF network element to return identifier information of at least one UPF network element located in an area indicated by the service area information, and a CN PDB between each of the at least one UPF network element and the RAN device.

Similarly, for example, the SMF network element may invoke the network function discovery service of the NRF network element, to send, to the NRF network element, a network function discovery request message that includes the identifier information of the RAN device and the service area information of the SMF network element.

Similarly, optionally, the SMF network element may first determine, based on the S-NSSAI carried in step 1801, that the session corresponds to the URLLC service, and then send the identifier information of the RAN device and the service area information of the SMF to the NRF network element.

Step 1807: The SMF network element receives, from the NRF network element, the identifier information of the at least one UPF network element located in the area indicated by the service area information, and a set of the CN PDB between each of the at least one UPF network element and the RAN device.

Step 1808: The SMF network element determines a CN PDB from the received CN PDB set, and selects a UPF network element.

Optionally, the SMF network element selects a CN PDB with a smallest value from the received CN PDB set as the CN PDB, and selects a corresponding UPF network element. Therefore, as many resources as possible may be reserved for a RAN side, to reduce pressure on an air interface resource.

For example, the service area of the SMF network element includes a UPF 1 and a UPF 2. In step 1807, the CN PDB set received by the SMF network element includes a CN PDB 1 of (UPF 1, RAN 1) and a CN PDB 2 of (UPF 2, RAN 1). A value of the CN PDB 1 is less than a value of the CN PDB 2. In this case, the SMF selects the CN PDB 1 from the CN PDB set as the determined CN PDB, and correspondingly selects the UPF 1 network element.

In a third implementation:

The SMF network element stores a set of a CN PDB between each UPF network element and each RAN device that are in the SMF service area.

For example, when the SMF network element is powered on, the SMF network element sends the service area information of the SMF network element to the NRF network element. After receiving the service area information of the SMF network element, the NRF network element returns, to the SMF network element, identifier information of each UPF network element located in the SMF service area, identifier information of each RAN device located in the SMF service area, and a respective CN PDB between the UPF network element and the RAN device. Therefore, the SMF network element stores the set of the CN PDB between each UPF network element and each RAN device that are in the SMF service area.

Step 1809: The SMF network element determines a CN PDB from the stored CN PDB set based on the identifier information of the RAN device, and selects a UPF network element.

Optionally, the SMF network element selects a CN PDB with a smallest value from the stored CN PDB set as the CN PDB based on the identifier information of the RAN device, and selects a corresponding UPF network element. Therefore, as many resources as possible may be reserved for a RAN side, to reduce pressure on an air interface resource.

For example, in step 1809, the CN PDB set stored in the SMF network element includes a CN PDB 1 of (UPF 1, RAN 1), a CN PDB 2 of (UPF 1, RAN 2), a CN PDB 3 of (UPF 2, RAN 1), and a CN PDB 4 of (UPF 2, RAN 3). A value of the CN PDB 1 is less than a value of the CN PDB 3. In a session establishment process, it is assumed that the identifier information of the RAN device corresponds to the RAN 1. The SMF network element selects the CN PDB 1 with a smaller CN PDB value based on values of the CN PDB 1 and the CN PDB 3, and selects the corresponding UPF 1.

In any one of the foregoing implementations, the identifier information of the UPF network element may include an IP address of the UPF network element. The identifier information of the RAN device may include an IP address of the RAN device.

For any one of the foregoing implementations, after the SMF network element obtains the CN PDB, step 1810 is performed.

Step 1810: The SMF network element obtains a PCC policy from the PCF network element by interacting with the PCF network element. The PCC policy includes a 5QI.

Optionally, the SMF network element further initiates an N4 session establishment process (not shown in the figure) to the UPF network element.

Then, steps 1811 and 1812 or steps 1813 and 1814 may be performed. Then, step 1815 may be performed.

For steps 1811 to 1815, refer to the descriptions of steps 1706 to 1710 in FIG. 17. Details are not described herein again.

Figure 19:
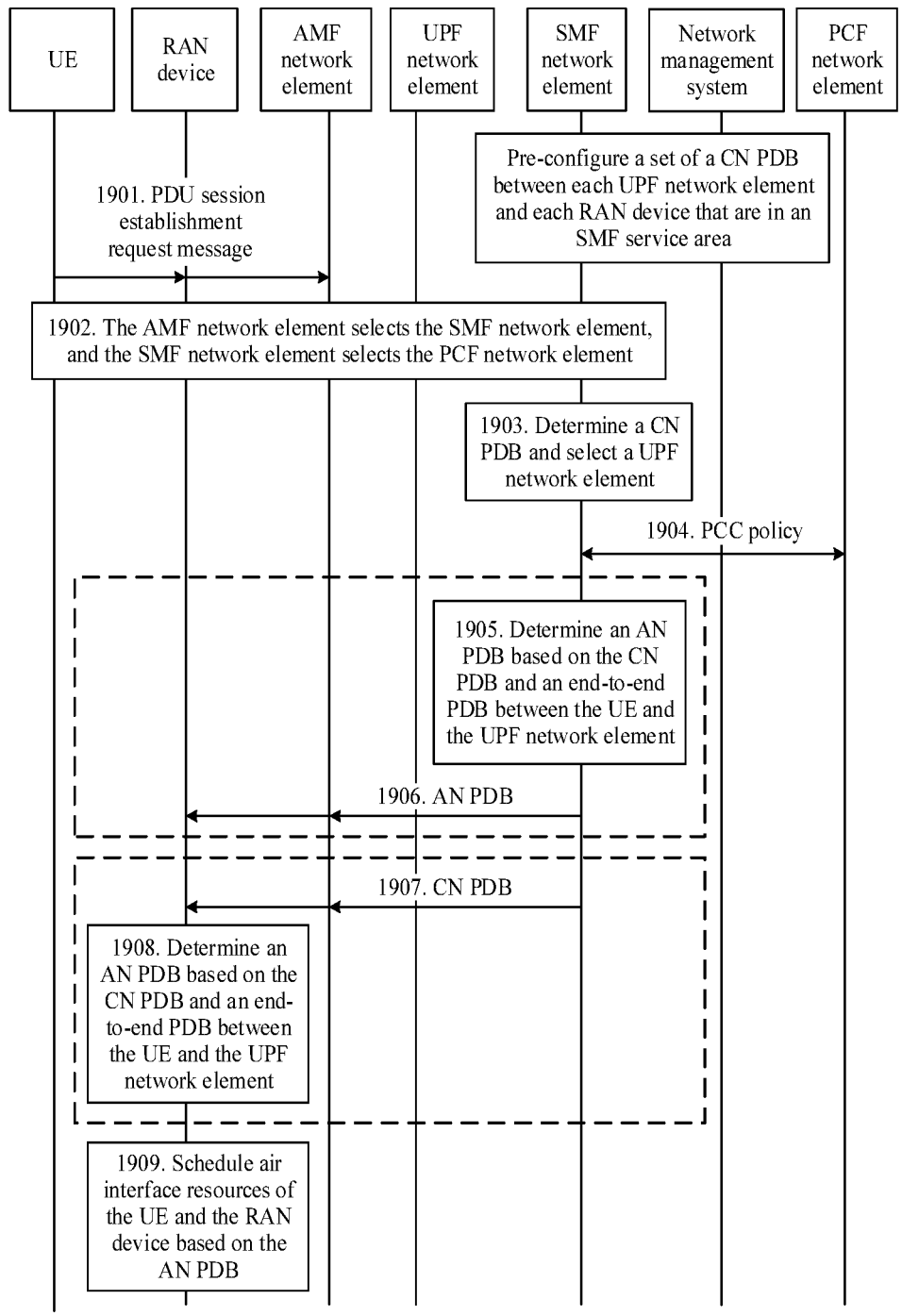
FIG. 19 is still another signaling interaction diagram of processing a QoS parameter according to an embodiment of this application.

FIG. 19 is still another signaling interaction diagram of processing a QoS parameter according to an embodiment of this application. FIG. 19 is described with reference to FIG. 17 and FIG. 18A and FIG. 18B.

In an example in FIG. 19, a network management system pre-configures, on an SMF network element, a set of a CN PDB between each UPF network element and each RAN device that are in an SMF service area.

For example, when the SMF network element is powered on, the network management system configures, for the SMF network element, identifier information of each UPF network element located in the SMF service area, identifier information of each RAN device located in the SMF service area, and a respective CN PDB between the UPF network element and the RAN device. Alternatively, after the SMF network element is powered on, the SMF network element actively sends a request to the network management system, to request to obtain the identifier information of each UPF network element located in the SMF service area, the identifier information of each RAN device located in the SMF service area, and the respective CN PDB between the UPF network element and the RAN device.

As shown in FIG. 19, this method includes the following steps.

For steps 1901 and 1902, refer to the descriptions of steps 1801 and 1802 in FIG. 18A and FIG. 18B. Details are not described herein again.

For step 1903, refer to the description of step 1809 in FIG. 18A and FIG. 18B. A difference lies in that: in the example of FIG. 18A and FIG. 18B, the CN PDB set is configured for the SMF network element by the NRF network element. In the example in FIG. 19, the CN PDB set is configured for the SMF network element by the network management system.

For step 1904, refer to the description of step 1810 in FIG. 18A and FIG. 18B. Details are not described herein again.

Optionally, the SMF network element further initiates an N4 session establishment process (not shown in the figure) to the UPF network element.

Then, steps 1905 and 1906 or steps 1907 and 1908 may be performed. Then, step 1909 may be performed.

For steps 1905 to 1909, refer to the descriptions of steps 1706 to 1710 in FIG. 17. Details are not described herein again.

A QoS parameter may be divided in a session establishment process, or a QoS parameter may be divided in a session modification process, or a QoS parameter may be divided in a service request process. Details are not described herein.

In addition, a QoS parameter may alternatively be divided in a handover process. The following provides descriptions using an example in which an SMF network element obtains a CN PDB from a UPF network element. However, a QoS parameter may alternatively be divided in a handover process in a manner of obtaining the CN PDB from the NRF network element in FIG. 18A and FIG. 18B, or configuring the CN PDB in the SMF network element by the network management system in FIG. 19.

Figure 20:
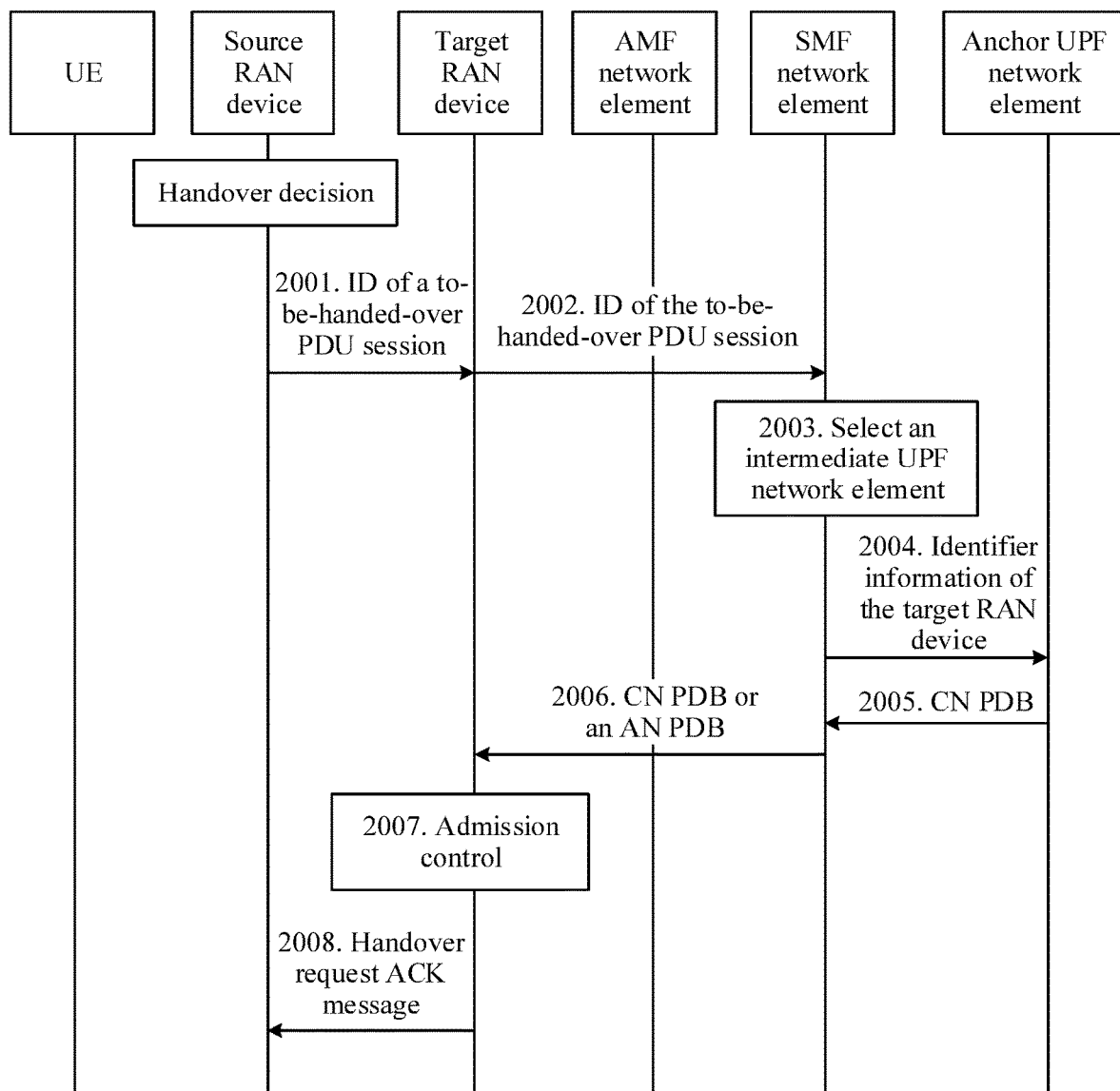
FIG. 20 is a signaling interaction diagram of a QoS parameter processing method performed in a handover preparation phase based on Xn handover according to an embodiment of this application.
Figure 21:
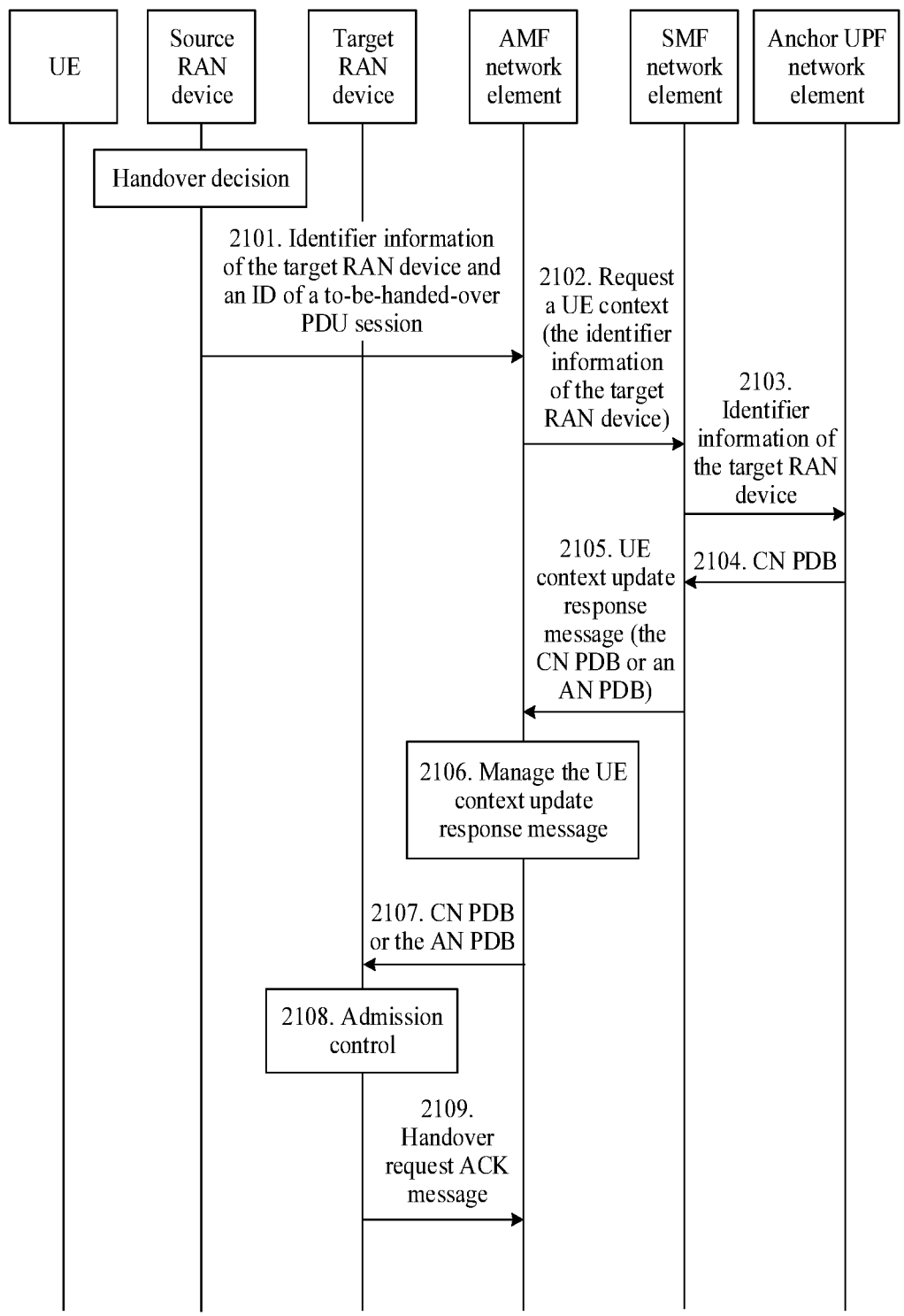
FIG. 21 is a signaling interaction diagram of a QoS parameter processing method performed in a handover preparation phase based on N2 handover according to an embodiment of this application.

For example, a QoS parameter may be divided and delivered in a handover preparation phase. FIG. 20 is a signaling interaction diagram of a QoS parameter processing method performed based on Xn handover. FIG. 21 is a signaling interaction diagram of a QoS parameter processing method performed based on N2 handover. The Xn handover means that UE handover is performed based on an Xn interface between a source RAN device and a target RAN device. The N2 handover means that UE handover is performed based on an N2 interface between an AMF network element and a RAN device (for example, when there is no Xn interface between the source RAN device and the target RAN device).

As shown in FIG. 20, this method includes the following steps.

Step 2001: After making a handover decision, the source RAN device sends a handover request message to the target RAN device. The handover request message includes an ID of a to-be-handed-over PDU session.

Step 2002: The target RAN device sends a request message to an SMF network element. For example, the handover request message is a handover required message. The request message includes the ID of the to-be-handed-over PDU session.

Step 2003: The SMF network element selects an intermediate UPF network element.

This step is an optional step.

Step 2004: The SMF network element initiates an N4 session modification process.

For example, the SMF network element sends an N4 session modification request message to an anchor UPF network element. The N4 session modification request message includes identifier information of the target RAN device, to request the UPF network element to return a CN PDB between the target RAN device and the anchor UPF network element. Optionally, the N4 session modification request message further includes indication information, and the indication information indicates the UPF network element to return the CN PDB between the target RAN device and the anchor UPF network element.

Optionally, the N4 session modification request message further includes flow information that identifies a first flow. For example, the first flow is a QoS flow, and the flow information is a 5QI or a QFI. In this way, using the N4 session modification request message, the SMF network element requests the UPF network element to return a CN PDB that is between the target RAN device and the anchor UPF network element and that corresponds to the first flow.

Optionally, before the SMF network element sends the N4 session modification request message to the UPF network element, the SMF network element first searches the SMF network element for the CN PDB between the target RAN device and the anchor UPF network element. The SMF network element sends the N4 session modification request message including the identifier information of the target RAN device to the UPF network element only if no CN PDB between the target RAN device and the anchor UPF network element exists in the SMF network element. If the SMF network element stores the CN PDB between the target RAN device and the anchor UPF network element, the SMF may directly determine the CN PDB between the target RAN device and the anchor UPF network element. The N4 session modification request message may not carry the identifier information of the target RAN device, or steps 2004 and 2005 may be skipped.

Step 2005: After receiving the N4 session modification request message, the UPF network element returns the CN PDB to the SMF network element using an N4 session modification answer message. Optionally, if the N4 session establishment request message further includes the flow information that identifies the first flow, the returned CN PDB is the CN PDB that is between the target RAN device and the anchor UPF network element and that corresponds to the first flow.

Step 2006: The SMF network element sends a handover response message to the target RAN device. In an implementation, the SMF network element determines an AN PDB based on the CN PDB and the 5QI, and sends, via the AMF network element, the handover response message including the AN PDB to the target RAN device. For how the SMF network element determines the AN PDB based on the CN PDB and the 5QI, refer to the description of step 1706. Details are not described herein again. In addition, the handover response message further includes the ID of the to-be-handed-over PDU session and flow information (a QFI or a 5QI) corresponding to the AN PDB.

In another implementation, the SMF network element sends, via the AMF network element, a handover response message including the CN PDB to the target RAN device. In addition, the handover response message further includes the ID of the to-be-handed-over PDU session. Optionally, the handover response message further includes flow information (a QFI or a 5QI) corresponding to the AN PDB. After receiving the handover response message, the target RAN device determines the AN PDB based on the CN PDB and the 5QI. For how the target RAN device determines the AN PDB based on the CN PDB and the 5QI, refer to the description of step 1709. Details are not described herein again.

Step 2007: The target RAN device performs admission control.

For example, the target RAN device determines, based on the AN PDB and the 5QI, whether to allow a QoS flow corresponding to the QFI to be switched, to determine an accepted QoS flow list. For example, the target RAN device obtains a corresponding QoS requirement (a packet loss rate requirement) based on the 5QI, obtains a corresponding latency requirement based on the AN PDB, and may further determine, based on parameters in a QoS profile, such as a guaranteed flow bit rate (GFBR), a maximum flow bit rate (MFBR), and a priority, a PDU session that is allowed to be handed over and that can satisfy the foregoing latency, bandwidth, and packet loss rate requirements, and a QoS flow that is allowed to be switched in the PDU session that is allowed to be handed over.

Step 2008: The target RAN device sends a handover request acknowledgement (ACK) message to the source RAN device.

Then, a remaining handover procedure, such as respective steps of a handover execution phase and a handover complete phase, may be performed.

After the handover is completed, the target RAN device schedules an air interface resource based on the AN PDB.

That is, the target RAN device allocates a radio resource to a corresponding QoS flow based on an AN PDB corresponding to the QFI.

In step 2004 and step 2005 in this embodiment, the manner 1 in which "the control plane network element obtains the first QoS parameter from the first UPF network element" in steps 1601 to 1611 is used as an example, and the method for obtaining the first QoS parameter by the SMF described in the manner 2, the manner 3, or the manner 4 in steps 1601 to 1611 may also be supported. Details are not described herein again.

The method shown in FIG. 21 includes the following steps.

Step 2101: After determining to trigger handover, the source RAN device sends a handover request (handover required) message to an AMF network element, where the handover request message includes identifier information of the target RAN device and an identifier of a to-be-handed-over PDU session.

Step 2102: The AMF network element requests an SMF network element corresponding to the to-be-handed-over PDU session to update a context of the UE.

For example, the AMF network element may invoke an SM context update (Nsmf_PDUSession_UpdateSMContext) service of the SMF network element, to send a UE context update request message to the SMF network element. The UE context update request message includes identifier information of the target RAN device.

Step 2103: The SMF network element initiates an N4 session modification procedure, and sends an N4 session modification request message including the identifier information of the target RAN device to an anchor UPF network element, to request the UPF network element to return a CN PDB between the target RAN device and the anchor UPF network element.

Step 2104: After receiving the N4 session modification request message, the UPF network element returns the CN PDB to the SMF network element using an N4 session modification answer message.

For steps 2103 and 2104, refer to the descriptions of steps 2004 and 2005. Details are not described herein again.

Step 2105: The SMF network element returns a UE context update response message to the AMF network element.

In an implementation, the SMF network element determines an AN PDB based on the CN PDB and a 5QI, and sends a context update response message including the AN PDB to the AMF network element. For how the SMF network element determines the AN PDB based on the CN PDB and the 5QI, refer to the description of step 1706. Details are not described herein again. In addition, the context update response message further includes the ID of the to-be-handed-over PDU session and flow information (a QFI or a 5QI) corresponding to the AN PDB.

In another implementation, the SMF network element sends a context update response message including the CN PDB to the AMF network element. In addition, the context update response message further includes the ID of the to-be-handed-over PDU session. Optionally, the context update response message further includes flow information (a QFI or a 5QI) corresponding to an AN PDB.

Step 2106: The AMF network element manages a UE context update response message from each SMF network element corresponding to the to-be-handed-over PDU session.

Step 2107: The AMF network element sends the received AN PDB or CN PDB to the target RAN device using a handover request message.

If receiving the CN PDB, the target RAN device determines the AN PDB based on the CN PDB and a 5QI. For how the target RAN device determines the AN PDB based on the CN PDB and the 5QI, refer to the description of step 1709. Details are not described herein again.

Step 2108: The target RAN device performs admission control.

For step 2108, refer to the description of step 2007. Details are not described herein again.

Step 2109: The target RAN device sends a handover request ACK message to the AMF network element.

Then, a remaining handover procedure, such as respective steps of a handover execution phase and a handover complete phase, may be performed.

After the handover is completed, the target RAN device schedules an air interface resource based on the AN PDB.

Similarly, in step 2103 and step 2104 in this embodiment, the manner 1 in which "the control plane network element obtains the first QoS parameter from the first UPF network element" in steps 1601 to 1611 is used as an example, and the method for obtaining the first QoS parameter by the SMF described in the manner 2, the manner 3, or the manner 4 in steps 1601 to 1611 may also be supported. Details are not described herein again.

Figure 22:
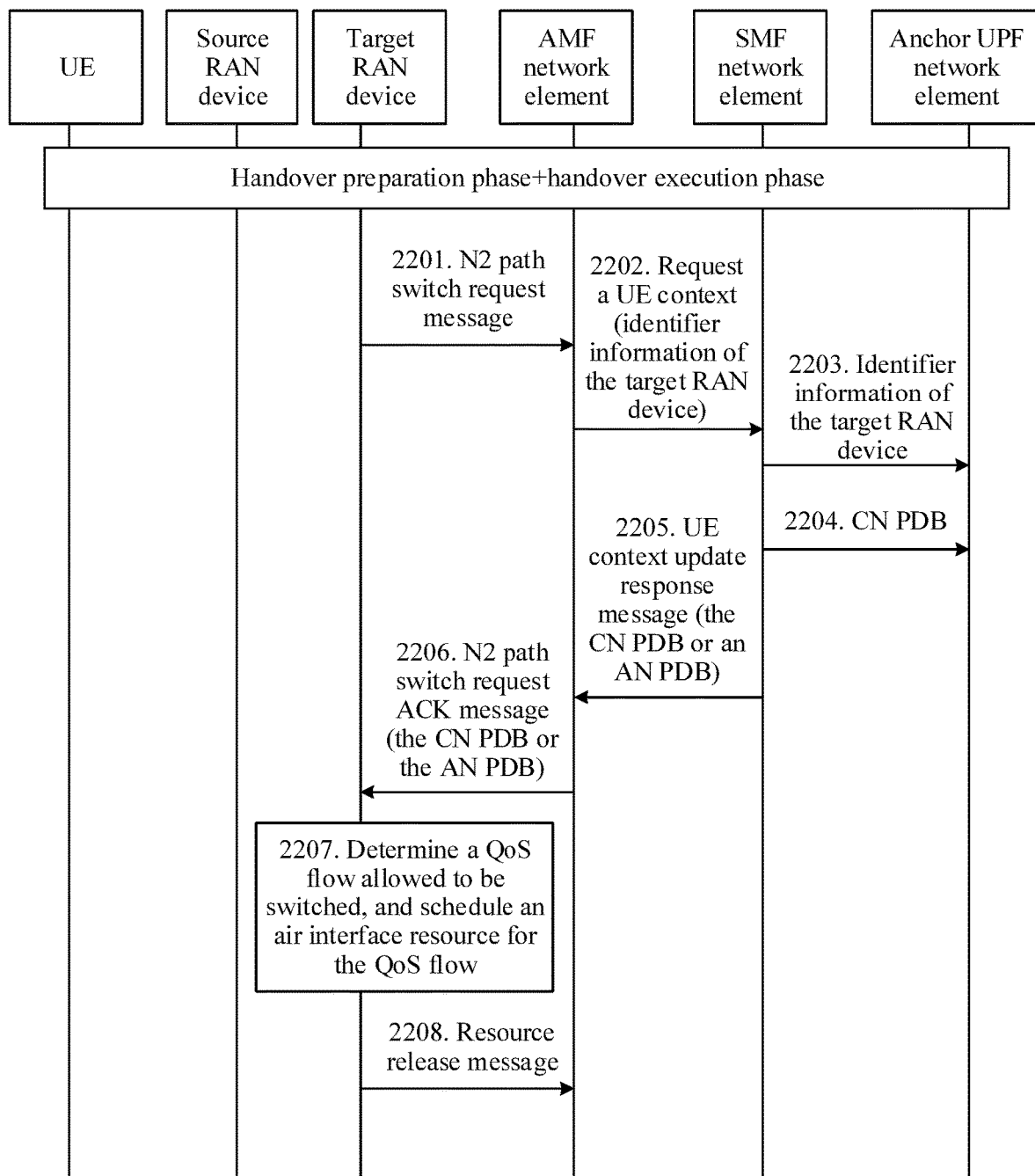
FIG. 22 is a signaling interaction diagram of a QoS parameter processing method performed in a handover complete phase based on Xn handover according to an embodiment of this application.

In addition to a handover preparation phase, a QoS parameter may be divided and delivered in a handover completion phase. Processing performed in the handover completion phase applies to both Xn and N2 handovers. FIG. 22 is described using Xn handover as an example.

The method shown in FIG. 22 includes the following steps.

After air interface handover is completed, that is, after handover execution is completed, a handover completion phase is entered. In the handover completion phase, a source RAN device forwards received downlink data to a target RAN device, and finally sends the downlink data to UE.

Step 2201: The target RAN device sends an N2 path switch request message to an AMF network element.

It should be noted that, in an N2 handover scenario, in step 2201, the target RAN device sends a handover notify message to the AMF network element.

Step 2202: The AMF network element requests an SMF network element corresponding to a to-be-handed-over PDU session to update a context of the UE.

For example, the AMF network element may invoke an SM context update (Nsmf_PDUSession_UpdateSMContext) service of the SMF network element, to send a UE context update request message to the SMF network element. The UE context update request message includes identifier information of the target RAN device.

Step 2203: The SMF network element initiates an N4 session modification procedure, and sends an N4 session modification request message including the identifier information of the target RAN device to an anchor UPF network element, to request the UPF network element to return a CN PDB between the target RAN device and the anchor UPF network element.

Step 2204: After receiving the N4 session modification request message, the UPF network element returns the CN PDB to the SMF network element using an N4 session modification answer message.

For steps 2203 and 2204, refer to the descriptions of steps 2004 and 2005. Details are not described herein again.

Step 2205: The SMF network element returns a UE context update response message to the AMF network element.

In an implementation, the SMF network element determines an AN PDB based on the CN PDB and a 5QI, and sends a context update response message including the AN PDB to the AMF network element. For how the SMF network element determines the AN PDB based on the CN PDB and the 5QI, refer to the description of step 1706. Details are not described herein again. In addition, the context update response message further includes the ID of the to-be-handed-over PDU session and flow information (a QFI or a 5QI) corresponding to the AN PDB.

In another implementation, the SMF network element sends a context update response message including the CN PDB to the AMF network element. In addition, the context update response message further includes the ID of the to-be-handed-over PDU session. Optionally, the context update response message further includes flow information (a QFI or a 5QI) corresponding to the CN PDB.

Step 2206: The AMF network element sends the received AN PDB or CN PDB to the target RAN device using an N2 path switch request ACK message.

If receiving the CN PDB, the target RAN device determines the AN PDB based on the CN PDB and a 5QI. For how the target RAN device determines the AN PDB based on the CN PDB and the 5QI, refer to the description of step 1709. Details are not described herein again.

Step 2207: The target RAN device determines, based on the AN PDB and the 5QI, whether to allow a QoS flow corresponding to the QFI to be switched, to determine an accepted QoS flow list. For example, the target RAN device obtains a corresponding QoS requirement (a packet loss rate requirement) based on the 5QI, obtains a corresponding latency requirement based on the AN PDB, and may further determine, based on parameters in a QoS profile, such as a GFBR, an MFBR, and a priority, a PDU session that is allowed to be handed over and that can satisfy the foregoing latency, bandwidth, and packet loss rate requirements, and a QoS flow that is allowed to be switched in the PDU session that is allowed to be handed over.

Step 2208: The target RAN device sends a resource release message to the source RAN device, to acknowledge that handover succeeds.

After the handover is completed, the target RAN device schedules an air interface resource based on the AN PDB.

That is, the target RAN device allocates a radio resource to a corresponding QoS flow based on an AN PDB corresponding to the QFI.

Similarly, in step 2203 and step 2204 in this embodiment, the manner 1 in which "the control plane network element obtains the first QoS parameter from the first UPF network element" in steps 1601 to 1611 is used as an example, and the method for obtaining the first QoS parameter by the SMF described in the manner 2, the manner 3, or the manner 4 in steps 1601 to 1611 may also be supported. Details are not described herein again.

Therefore, with reference to the foregoing descriptions of FIG. 20 to FIG. 22, the method shown in FIG. 16A or FIG. 16B may alternatively be performed in a handover procedure. In this scenario, a first access network device is the target RAN device that serves the UE after handover. Therefore, performing the foregoing method in the handover procedure enables an AN PDB of a QoS flow in the to-be-handed-over PDU session to be determined such that the target RAN device can perform admission control of the QoS flow based on the AN PDB, and perform air interface resource scheduling after handover based on the AN PDB, thereby optimizing usage of the air interface resource.

Figure 23:
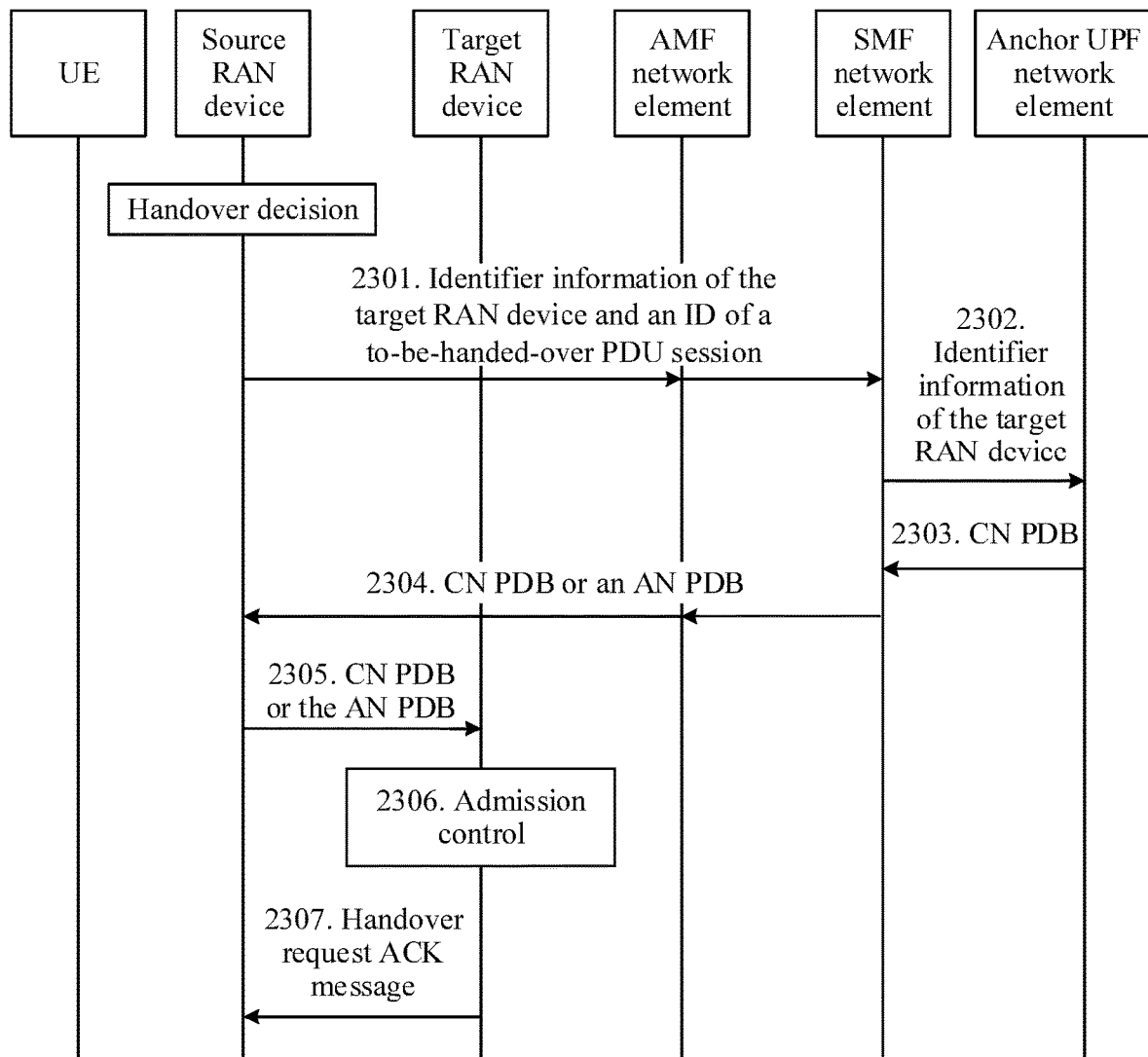
FIG. 23 is a schematic flowchart of a QoS parameter processing method in a handover phase according to an embodiment of this application.

FIG. 23 further provides a schematic flowchart of a QoS parameter processing method in a handover phase. The method is applicable to Xn handover and is performed in a handover preparation phase. FIG. 23 is described with reference to FIG. 20. A difference between the method shown in FIG. 23 and the method shown in FIG. 20 lies in that: in FIG. 20, the target RAN device requests, from the SMF network element, the CN PDB between the target RAN device and the anchor UPF network element, in FIG. 23, a source RAN device requests, from an SMF network element, a CN PDB between a target RAN device and an anchor UPF network element.

The method shown in FIG. 23 includes the following steps.

Step 2301: After making a handover decision, the source RAN device sends identifier information of the target RAN device and an ID of a to-be-handed-over PDU session to the SMF network element via an AMF network element.

Step 2302: The SMF network element initiates an N4 session modification process, and sends an N4 session modification request message including the identifier information of the target RAN device to an anchor UPF network element, to request the UPF network element to return a CN PDB between the target RAN device and the anchor UPF network element.

Step 2303: After receiving the N4 session modification request message, the UPF network element returns the CN PDB to the SMF network element using an N4 session modification answer message.

For steps 2302 and 2303, refer to the descriptions of steps 2004 and 2005. Details are not described herein again.

Step 2304: The SMF network element sends the CN PDB or an AN PDB to the source RAN device via the AMF network element.

For example, in an implementation, the SMF network element determines an AN PDB based on the CN PDB and a 5QI, and sends, via the AMF network element, a message including the AN PDB to the source RAN device. For how the SMF network element determines the AN PDB based on the CN PDB and the 5QI, refer to the description of step 1706. Details are not described herein again. In addition, the message further includes the ID of the to-be-handed-over PDU session and flow information (a QFI or a 5QI) corresponding to the AN PDB.

In another implementation, the SMF network element sends, via the AMF network element, a message including the CN PDB to the source RAN device. In addition, the message further includes the ID of the to-be-handed-over PDU session. Optionally, the message further includes flow information (a QFI or a 5QI) corresponding to the AN PDB.

Step 2305: The source RAN device sends a handover request message to the target RAN device. Based on the message received by the source RAN device from the SMF network element, the handover request message includes the AN PDB or the CN PDB.

For example, the source RAN device updates a QoS profile of a QoS flow related to the to-be-handed over PDU session, and the updated QoS profile includes the AN PDB or the CN PDB. The source RAN device sends the updated QoS profile to the target RAN device.

When the QoS profile includes the AN PDB, the target RAN device may obtain the AN PDB from the QoS profile after receiving the QoS profile. When the QoS profile includes the CN PDB, the target RAN device determines the AN PDB based on the CN PDB and the 5QI. For how the target RAN device determines the AN PDB based on the CN PDB and the 5QI, refer to the description of step 1709. Details are not described herein again.

Step 2306: The target RAN device performs admission control.

For step 2306, refer to the description of step 2007. Details are not described herein again.

Step 2307: The target RAN device sends a handover request ACK message to the source RAN device.

Then, a remaining handover procedure, such as respective steps of a handover execution phase and a handover completion phase, may be performed.

After the handover is completed, the target RAN device schedules an air interface resource based on the AN PDB.

Similarly, in step 2302 and step 2303 in this embodiment, the manner 1 in which "the control plane network element obtains the first QoS parameter from the first UPF network element" in steps 1601 to 1611 is used as an example, and the method for obtaining the first QoS parameter by the SMF described in the manner 2, the manner 3, or the manner 4 in steps 1601 to 1611 may also be supported. Details are not described herein again.

Therefore, based on the description of FIG. 23, in an Xn handover scenario, a first access network device is the target RAN device that serves the UE after handover, and a second access network device is the source RAN device that serves the UE before handover. Steps 1603 and 1604 in FIG. 16A may be replaced with the following. The control plane network element sends a third QoS parameter to the second access network device, the second access network device sends the third QoS parameter to the first access network device, and the first access network device schedules an air interface resource between the terminal device and the first access network device based on the third QoS parameter received from the second access network device. Similarly, steps 1612 to 1614 in FIG. 16B may be replaced with The control plane network element sends the first QoS parameter to the second access network device, the second access network device sends the first QoS parameter to the first access network device, and the first access network device determines a third QoS parameter between the terminal device and the first access network device based on the first QoS parameter received from the second access network device and a second QoS parameter between the terminal device and the first UPF network element, and schedules an air interface resource between the terminal device and the first access network device based on the third QoS parameter.

The following separately describes a control plane network element and an access network device that are configured to process a QoS parameter.

In an embodiment, the control plane network element 90 shown in FIG. 9 may be further configured to implement a step performed by the control plane network element in FIG. 16A or FIG. 16B, or a step performed by the SMF network element in any one of FIG. 17 to FIG. 23.

For example, in an embodiment, the processing module 902 is configured to obtain a first QoS parameter between a first access network device and a first UPF network element, and determine a third QoS parameter between a terminal device and the first access network device based on the first QoS parameter and a second QoS parameter that is between the terminal device and the first UPF network element, and the transceiver module 901 is configured to send the third QoS parameter to the first access network device (or a second access network device in a handover scenario).

In another embodiment, the processing module 902 is configured to obtain a first QoS parameter between a first access network device and a first UPF network element, and the transceiver module 901 is configured to send the first QoS parameter to the first access network device (or a second access network device in a handover scenario). The first QoS parameter is used to determine a QoS parameter between a terminal device and the first access network device.

Therefore, compared with that, in the other approaches, the first access network device performs air interface resource scheduling based on an end-to-end QoS parameter between UE and a UPF, in the method according to this embodiment of this application, the first access network device may perform air interface resource scheduling based on a more precise QoS parameter, namely, a QoS parameter between the UE and an AN, optimizing usage of an air interface resource. Optionally, the processing module 902 is configured to obtain the first QoS parameter from the first UPF network element, obtain the first QoS parameter from a network element discovery function device, obtain the first QoS parameter from a network management system, or obtain the first QoS parameter from a network data analytics function device.

Optionally, the processing module 902 controls the transceiver module 901 to send identifier information of the first access network device to the first UPF network element, and receive, from the first UPF network element, the first QoS parameter between the first access network device and the first UPF network element. Further, in a possible design, the processing module 902 controls the transceiver module 901 to send flow information that identifies a first flow to the first UPF network element. The first QoS parameter indicates a QoS parameter that is between the first access network device and the first UPF network element and that corresponds to the first flow.

In a possible design, the processing module 902 controls the transceiver module 901 to send identifier information of the first access network device and identifier information of the first UPF network element to the network element discovery function device, and receive, from the network element discovery function device, the first QoS parameter between the first access network device and the first UPF network element.

In another possible design, the processing module 902 controls the transceiver module 901 to send identifier information of the first access network device and service area information of the control plane network element to the network element discovery function device, and receive, from the network element discovery function device, identifier information of at least one UPF network element located in an area indicated by the service area information, and a QoS parameter between each of the at least one UPF network element and the first access network device, where the processing module 902 is configured to determine the first QoS parameter in the QoS parameter, or send service area information of the control plane network element to the network element discovery function device, and receive, from the network element discovery function device, identifier information of at least one UPF network element located in an area indicated by the service area information, identifier information of an access network device that communicates with each of the at least one UPF network element, and a QoS parameter between each of the at least one UPF network element and the access network device, where the processing module 902 is configured to determine the first QoS parameter in the QoS parameter based on identifier information of the first access network device.

With reference to the foregoing possible designs, further, the processing module 902 controls the transceiver module 901 to determine the first UPF network element based on the QoS parameter that is between each of the at least one UPF network element and the access network device and that is received from the network element discovery function device.

In addition, the communications apparatus shown in FIG. 10 may be further configured to implement a step performed by the first access network device in FIG. 16A or FIG. 16B, or a step performed by the RAN device in any one of FIG. 17 to FIG. 19, or a step performed by the target RAN device in any one of FIG. 20 to FIG. 23.

For example, the processing module 1002 is configured to obtain a QoS parameter between a terminal device and the first access network device, and schedule an air interface resource between the terminal device and the first access network device based on the QoS parameter.

Therefore, compared with that, in the other approaches, the first access network device performs air interface resource scheduling based on an end-to-end QoS parameter between UE and a UPF, in the method according to this embodiment of this application, the first access network device may perform air interface resource scheduling based on a more precise QoS parameter, namely, a QoS parameter between the UE and an AN, optimizing usage of an air interface resource.

In a possible design, the processing module 1002 is configured to control the transceiver module 1001 to receive, from a control plane network element, a first QoS parameter between the first access network device and a first UPF network element. The processing module 1002 is configured to determine the QoS parameter between the terminal device and the first access network device based on the first QoS parameter and a second QoS parameter that is between the terminal device and the first UPF network element.

In another possible design, the processing module 1002 is configured to control the transceiver module 1001 to receive the QoS parameter from a control plane network element.

In still another possible design, the processing module 1002 is configured to control the transceiver module 1001 to receive the QoS parameter from a second access network device. The first access network device is a target access network device that serves the terminal device after handover, and the second access network device is a source access network device that serves the terminal device before handover. In this case, the processing module 1002 is further configured to perform handover admission control on the terminal device based on the QoS parameter.

In addition, the communications apparatus shown in FIG. 10 may be further configured to implement a step performed by the source RAN device in any one of FIG. 20 to FIG. 23.

For example, in an embodiment, the processing module 1002 is configured to control the transceiver module 1001 to receive, from a control plane network element, a first QoS parameter between the first access network device and a first UPF network element. The processing module 1002 is configured to determine a third QoS parameter between a terminal device and the first access network device based on the first QoS parameter and a second QoS parameter that is between the terminal device and the first UPF network element. The processing module 1002 is configured to control the transceiver module 1001 to send the third QoS parameter to the first access network device.

In another embodiment, the processing module 1002 is configured to control the transceiver module 1001 to receive a third QoS parameter between a terminal device and the first access network device from a control plane network element. The processing module 1002 is configured to control the transceiver module 1001 to send the third QoS parameter to the first access network device.

The first access network device is a target access network device that serves the terminal device after handover, and the second access network device is a source access network device that serves the terminal device before handover.

Therefore, compared with that, in the other approaches, the first access network device performs air interface resource scheduling based on the end-to-end QoS parameter between the UE and the UPF, in the method according to this embodiment of this application, in a handover scenario, the second access network device can receive the first QoS parameter or the third QoS parameter from the control plane network element, and then send the first QoS parameter or the third QoS parameter to the first access network device such that the first access network device may perform air interface resource scheduling based on the more precise QoS parameter, namely, the QoS parameter between the UE and the AN, optimizing the usage of the air interface resource.

In addition, the memory 1503 in FIG. 15 stores program code that needs to be invoked when the processor 1502 performs the foregoing QoS parameter processing method performed by the control plane network element. Alternatively, a computer-readable storage medium 1504 stores program code that needs to be invoked when the control plane network element performs the foregoing QoS parameter processing method. The processor 1502 in FIG. 15 can invoke the program code in the memory 1503 or the computer-readable storage medium 1504, to perform an operation performed by the control plane network element, the first access network device, or the second access network device.

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

In addition, functional modules in this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, and or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disk (DVD)), a semiconductor medium (for example, a solid-state drive (SSD)), or the like.

The technical solutions provided in this application are described in detail above. The principle and implementation of this application are described herein through specific examples. The description about the embodiments is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A quality of service (QoS) parameter processing method comprising:
sending, by a target access network device, an N2 path switch request message to an access and mobility management function device, wherein the N2 path switch request message comprises an identifier of a protocol data unit session to be switched for a terminal device;
receiving, by the target access network device from the access and mobility management function device, an N2 path switch request acknowledgement message comprising a core network (CN) packet delay budget (PDB) between the target access network device and a user plane function device for a QoS flow that is accepted by the target access network device and that is in the protocol data unit session to be switched;

determining, by the target access network device, an access network (AN) PDB between the terminal device and the target access network device based on the CN PDB and an end-to-end PDB between the terminal device and the user plane function device; and scheduling, by the target access network device, an air interface resource between the terminal device and the target access network device based on the AN PDB for the QoS flow.

2. The QoS parameter processing method of claim 1, wherein determining the AN PDB comprises subtracting, by the target access network device, the CN PDB from the end-to-end PDB to obtain the AN PDB.

3. The QoS parameter processing method of claim 1, wherein the CN PDB in the N2 path switch request acknowledgement message is obtained from a context update response message from a session management function device.

4. The QoS parameter processing method of claim 3, wherein the context update response message further comprises flow information corresponding to the CN PDB.

5. The QoS parameter processing method of claim 4, wherein the flow information comprises a QoS flow identifier (QFI) for the QoS flow.

6. An apparatus for processing a quality of service (QoS) parameter comprising:
an interface; and
one or more processors in communication with the interface and configured to:
send, using the interface, an N2 path switch request message to an access and and mobility management function device, wherein the N2 path switch request message comprises an identifier of a protocol data unit session to be switched for a terminal device;
receive, using the interface from the access and mobility management function device, an N2 path switch request acknowledgement message comprising a core network (CN) packet delay budget (PDB) between a target access network device and a user plane function device for a QoS flow that is accepted by the target access network device and that is in the protocol data unit session to be switched;
determine an access network (AN) PDB between the terminal device and the target access network device based on the CN PDB and an end-to-end PDB between the terminal device and the user plane function device; and
schedule an air interface resource between the terminal device and the target access network device based on the AN PDB for the QoS flow.

7. The apparatus of claim 6, wherein the is one or more processors are configured to subtract the CN PDB from the end-to-end PDB to obtain the AN PDB.

8. The apparatus of claim 6, wherein the CN PDB is obtained from a context update response message from a session management function device, and wherein the context update response message further comprises flow information corresponding to the CN PDB.

9. The apparatus of claim 8, wherein the flow information comprises a QoS flow identifier (QFI) for the QoS flow.

10. A non-transitory computer-readable medium storing computer instructions for execution by one or more processors of a target access network device, wherein the computer instructions cause the one or more processors to:
send an N2 path switch request message to an access and mobility management function device, wherein the N2 path switch request message comprises an identifier of a protocol data unit session to be switched for a terminal device;
receive, from the access and mobility management function device, an N2 path switch request acknowledgement message comprising a core network (CN) packet delay budget (PDB) between the target access network device and a user plane function device for a QoS flow that is accepted by the target access network device and that is in the protocol data unit session to be switched;
determine an access network (AN) PDB between the terminal device and the target access network device based on the CN PDB and an end-to-end PDB between the terminal device and the user plane function device; and
schedule an air interface resource between the terminal device and the target access network device based on the AN PDB for the QoS flow.

11. The non-transitory computer-readable medium of claim 10, wherein the computer instructions further cause the one or more processors to subtract the CN PDB from the end-to-end PDB to obtain the AN PDB.

12. The non-transitory computer-readable medium of claim 10, wherein the CN PDB is obtained from a context update response message.

13. The non-transitory computer-readable medium of claim 12, wherein the context update response message is received from a session management function device.

14. The non-transitory computer-readable medium of claim 13, wherein the context update response message further comprises flow information corresponding to the CN PDB.

15. The non-transitory computer-readable medium of claim 14, wherein the flow information comprises a QoS flow identifier (QFI) for the QoS flow.

16. The non-transitory computer-readable medium of claim 14, wherein the flow information comprises a $5^{th}$ generation (5G) QoS indicator (5QI) for the QoS flow.

17. The QoS parameter processing method of claim 4, wherein the flow information comprises a $5^{th}$ generation (5G) QoS indicator (5QI) for the QoS flow.

18. The apparatus of claim 8, wherein the flow information comprises a $5^{th}$ generation (5G) QoS indicator (5QI) for the QoS flow.

19. The apparatus of claim 18, wherein the flow information further comprises at least one of a latency parameter, a jitter parameter, or a reliability parameter corresponding to the QoS data flow.

* * * * *